(12) United States Patent
Leung et al.

(10) Patent No.: US 12,450,554 B2
(45) Date of Patent: *Oct. 21, 2025

(54) ITEM TRACKING SYSTEM WITH ELECTRONIC TRACKING LABELS CONTAINING SENSORS

(71) Applicant: Ferret Systems Inc., San Diego, CA (US)

(72) Inventors: Gary Leung, San Jose, CA (US); Venu Gutlapalli, San Diego, CA (US); Joseph Reddy, San Diego, CA (US)

(73) Assignee: Ferret Systems Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/225,960

(22) Filed: Jun. 2, 2025

(65) Prior Publication Data

US 2025/0292192 A1    Sep. 18, 2025

Related U.S. Application Data

(63) Continuation of application No. 18/667,874, filed on May 17, 2024, which is a continuation-in-part of
(Continued)

(51) Int. Cl.
*G06Q 10/0833* (2023.01)
*G06Q 10/083* (2023.01)

(52) U.S. Cl.
CPC ..... *G06Q 10/0833* (2013.01); *G06Q 10/0838* (2013.01)

(58) Field of Classification Search
CPC ............. G06Q 10/0833; G06Q 10/838
(Continued)

(56) References Cited

U.S. PATENT DOCUMENTS 10,108,898 B1   10/2018  Ballam et al.
11,232,390 B1 *  1/2022  Leung ............... G06K 19/0723
(Continued)

OTHER PUBLICATIONS

International Preliminary Report on Patentability issued in PCT/US2022/035605 on Jan. 11, 2024.
International Search Report issued in PCT/US23/85251 on Apr. 29, 2024.
International Search Report and Written Opinion issued in PCT/US2022/035605 on Jul. 26, 2022 (7 pages).
International Preliminary Report on Patentability issued in PCT/US23/85251 on Jul. 3, 2025.
(Continued)

*Primary Examiner* — Ahshik Kim
(74) *Attorney, Agent, or Firm* — ARC IP Law, PC; Joseph J. Mayo

(57) ABSTRACT

A tracking and monitoring system that uses "smart" tracking labels with printed label information on the top and electronics and sensors embedded in thin, flexible layers underneath. Labels may be used to track the location of items, and to monitor item parameters such as temperature, shock, weight, or tampering. Tracking labels may have communications interfaces to transmit label location and sensor data to a centralized server for monitoring and analysis; interfaces may include for example Bluetooth, Wi-Fi, cellular, or Amazon Sidewalk. Label location may be determined from an integrated GPS, by triangulation using received signals from cellular or other networks, or from the location of nearby connected devices. Labels may be battery powered and may use energy harvesting to obtain power from the environment. To conserve battery life, manufactured labels may be put into a hibernation state, and activated when they are placed on an item.

20 Claims, 38 Drawing Sheets

Related U.S. Application Data application No. 18/172,589, filed on Feb. 22, 2023, which is a continuation-in-part of application No. 18/068,966, filed on Dec. 20, 2022, now Pat. No. 12,245,121, which is a continuation-in-part of application No. PCT/US2022/035605, filed on Jun. 29, 2022, which is a continuation-in-part of application No. 17/507,767, filed on Oct. 21, 2021, now Pat. No. 11,392,885, which is a continuation-in-part of application No. 17/362,840, filed on Jun. 29, 2021, now Pat. No. 11,232,390.

(58) Field of Classification Search
USPC ........................................................ 705/333
See application file for complete search history.

(56) References Cited

U.S. PATENT DOCUMENTS

| | | |
|---|---|---|
| 2014/0083895 A1 | 3/2014 | Raming |
| 2020/0111343 A1 | 4/2020 | Krejcarek |
| 2020/0151655 A1 | 5/2020 | Khoche |
| 2021/0216958 A1 | 7/2021 | Pacheco et al. |
| 2021/0266711 A1 | 8/2021 | Loken |
| 2021/0295247 A1 | 9/2021 | Volkerink et al. |
| 2022/0027698 A1 | 1/2022 | Volkerink |

OTHER PUBLICATIONS

European Search Report issued in EP22834177.2 on Apr. 15, 2025.
International Search Report and Written Opinion issued in PCT/US/2025/030063 on Jul. 10, 2025.

* cited by examiner

ITEM TRACKING SYSTEM WITH ELECTRONIC TRACKING LABELS CONTAINING SENSORS

This application is a continuation of U.S. Utility patent application Ser. No. 18/667,874, filed 17 May 2024, which is a continuation-in-part of U.S. Utility patent application Ser. No. 18/172,589, filed 22 Feb. 2023, which is a continuation-in-part of U.S. Utility patent application Ser. No. 18/068,966, filed 20 Dec. 2022, which is a continuation-in-part of PCT Patent Application PCT/US22/35605, filed 29 Jun. 2022, which is a continuation-in-part of U.S. Utility patent application Ser. No. 17/507,767, filed 21 Oct. 2021, which is a continuation-in-part of U.S. Utility patent application Ser. No. 17/362,840, filed 29 Jun. 2021, the specifications of which are hereby incorporated herein by reference.

BACKGROUND OF THE INVENTION

Field of the Invention

One or more embodiments of the invention are related to the fields of electronic tracking devices and information systems. More particularly, but not by way of limitation, one or more embodiments of the invention enable an item tracking system with electronic tracking labels containing sensors.

Description of the Related Art

Electronic tags for identifying and tracking items are widely used for supply chain management. Examples include RFID tags, and Bluetooth-enabled tags. These devices provide limited functionality. RFID tags for example provide a small amount of memory that can be read (or written) with a compatible reader; this functionality is useful to identify an item and to retrieve simple information. Bluetooth tags with some additional features are becoming available; for example some of these tags include certain sensors. Both RFID and Bluetooth tags require that compatible readers be located very close to the tags. These tags also can only "locate" an item by alerting when a tag is within or out of range of a compatible reader.

There are no known tracking systems that provide electronic tracking labels with a wide range of sensors in a single label, with multiple communications interfaces including short-range options like Bluetooth and long-range options such as cellular networks, and with integrated location tracking. There are also no known tracking systems that switch automatically between short-range tracking (using Bluetooth signals for example) and long-range tracking (using GPS signals for example).

Systems exist for tracking hierarchical aggregation relationships between packages and the items they contain, but these existing systems typically use simple tags and scanners to manually construct the containment relationships. There are no known systems that use electronic tracking labels with sensors to manage and track hierarchical aggregation.

Existing electronic tracking systems also use tracking tags with limited lifespans because the tags consume battery power continuously. There are no known tracking systems that use tags that can be maintained in a low-power hibernation state until they are needed, and that then activate these tags automatically as they are printed for use.

Electronic tracking tags typically require a battery to power the electronic components such as the sensors and wireless communication interfaces. Existing circuits couple batteries to the circuit boards using bulky, rigid structures such as battery holders or metal tabs. These components add considerable thickness to a label that incorporates an electronic tracking circuit, and they may prohibit feeding the label through a printer because the battery holder cannot withstand the stress exerted by the printer. There are no known systems that couple a battery to an electronic tracking circuit without the use of a rigid structure such as a battery holder.

For a typical manufacturing customer, products arrive from multiple production sites to multiple fulfilment centers, and from these fulfilment centers the products are shipped via multiple carriers (such as truck operators) to their destinations. Shipments are often less-than-truckload (LTL) shipments that may be combined with other shipments during transit. This complex logistical network may generate many potential errors during shipment. For example, shipments may be split when there are operational errors while loading pallets or packets of shipment into a truck at a loading dock. As a result, some pallets from a shipment may get carried and delivered to a different destination, and only a partial shipment may arrive at the correct destination. Pallets may also go missing at any time in transit, particular as the load is unloaded and loaded multiple times at a carrier's partner logistics hubs along the route; during this unloading and loading, one or more pallets may be left behind. Items may also go missing due to theft or accidents. Existing system generally detect shipment errors only when pallets or packages arrive at their destination and are compared to a bill of lading or invoice.

For at least the limitations described above there is a need for an item tracking system with electronic tracking labels containing sensors.

BRIEF SUMMARY OF THE INVENTION

One or more embodiments described in the specification are related to an item tracking system with electronic tracking labels containing sensors. Embodiments of the invention may be applied for example to supply chains to track items from the factory to the consumer, and to monitor the condition of items using sensors integrated into the tracking labels.

In one or more embodiments of the invention, the item tracking system may have multiple tracking labels, each with a label that may be applied to an item, a database of tracking histories for the tracking labels, and a server coupled to the database. The server may receive tracking label update messages that each contain a unique identifier of the tracking label, a time, a location of the tracking label at that time, and one or more sensor values captured by one or more sensors in the tracking label; it may add the contents of the update message to the database. Each tracking label may contain a label (which may show for example printed text or symbols), and a flexible electronic circuit attached to or integrated into the label. The circuit may include a controller, a power source, a wireless communications interface, one or more sensors, and a unique identifier. It may also include an activation mechanism that modifies an activation input when a user or an activation device performs an activation action. The flexible electronic circuit may switch from a hibernation state to an active state when this activation mechanism modifies the activation input.

In one or more embodiments, each tracking label may have multiple layers, including a liner layer, an adhesive layer above the liner layer, a label bottom layer above the adhesive layer, a conductive traces layer above the label bottom layer, an electronic components layer above the conductive traces layer, and a label top layer above the electronic components layer. In one or more embodiments the maximum thickness of a tracking label may be less than or equal to 1.5 millimeters.

In one or more embodiments, the activation mechanism may include an electrical path coupling the power source to the activation input, and the activation action may break this electrical path, changing the activation input. For example, the tracking label may have a portion that the electrical path passes through, and removal of this portion of the tracking label may break the electrical path. This portion to be removed may be for example a tab that is torn off or cut off to activate the label, or a conductive sheet that is peeled off to activate the label. In one or more embodiments the activation mechanism may have an electrical path coupling a near-field communication receiver to the activation input, and the activation action may include transmission of electromagnetic energy to this receiver.

In one or more embodiments, the power source may include one or both of a battery and an energy harvesting circuit that receives power from the tracking label environment.

In one or more embodiments, the sensor(s) of the tracking label may include one or more of: a temperature sensor, a humidity sensor, a light sensor, a motion sensor; a pressure sensor, a shock sensor, a sensor that measures peeling or bending, and a sensor that detects opening of a container or breaking of a seal.

In one or more embodiments, the flexible electronic circuit of a tracking label may include one or more indicators. Indicators may be for example LEDs or displays.

In one or more embodiments, the wireless communications interface of a tracking label may include one or more of: a Bluetooth interface, a Wi-Fi interface, a cellular network interface, and a sub-Gigahertz wireless interface.

One or more embodiments with a cellular network interface may determine the location of the tracking label via triangulation via the cellular network.

In one or more embodiments, the flexible electronic circuit of a tracking label may have a GPS receiver, and the controller of the tracking label may obtain the label's location from the GPS receiver. If the tracking label also has a cellular network interface, then triangulation using the cellular network may be used to determine the location if the GPS receiver does not provide the location.

In one or more embodiments, the wireless communications interface of the tracking label may connect to a local device in the vicinity of the tracking label. The local device may be coupled to the server via a network connection. The local device may transmit the tracking label update message to the server. The location of the local device may be used as the location in the update message.

In one or more embodiments, the server may transmit a settings update message to one or more tracking labels. This message may include one or more sensor data collection rules. The rules may for example include one or more of an interval at which a sensor should collect data, and a range of sensor data values that trigger an alert.

One or more embodiments of the invention may enable a hierarchical aggregation system with electronic tracking labels attached to items, where some of the items are packages that contain other items. The tracking label on each package may be configured to communicate with the labels on the items contained in the package. Package labels may send update messages that are received by a server coupled to a database. The database may include tracking histories for item labels, and a containment association between package labels and the labels of items contained in a package. The update messages sent from package labels may have a time, a location of the package label at that time, the unique identifier of the package label, one or more values captured by one or more sensors of the package label, and one or more item data values associated with the contained labels in the package. The server may add contents of the update message to the tracking history associated with the package label and with one or more of the contained labels in the package.

In one or more embodiments, a package may contain another package, which in turn contains items.

In one or more embodiments, a package label may accept a package configuration message with the unique identifiers of contained tracking labels. The package label may store these unique identifiers and may communication with the contained tracking labels.

In one or more embodiments, a package label may have a short-range communications interface and a longer-range communications interface, and the contained tracking labels may have only a short-range interface and may not have a longer-range communications interface. The short-range communications interface may be for example a Bluetooth interface; the longer-range interface may be for example a cellular network interface.

In one or more embodiments, the package tracking label may obtain item data values from the contained tracking labels at times when the tracking label is not connected to the server via a communications interface.

In one or more embodiments, the package tracking label may attempt to establish a connection with each of the contained tracking labels, and may transmit an alert message to the server when one or more of the contained labels does not respond.

In one or more embodiments, the package label may determine the unique identifiers of the contained tracking labels and transmit a message to the server with the containment association between the package label identifier and the contained label identifiers. Determining the identities of contained tracking labels may for example include connecting to all tracking labels within a short range, and retrieving their unique identifiers. Identities of the contained labels may be confirmed (or determined) in one or more embodiments by applying a physical change to the items in a package, obtaining sensor data from the tracking labels within a short range, and confirming that the sensor data from each tracking label measures the physical change. The physical change may be for example a motion of the package, and the tracking labels may have motion sensor data. The physical change may be a change in the light shining on the contained items, and the tracking labels may have light sensors.

In one or more embodiments, the server may update the tracking history of a first contained tracking label based on a data value associated with a second tracking label. The package label may connect to a proper subset of the contained tracking labels and send data from this subset of contained label to the server; the server may then apply this data to the other contained labels. Different proper subsets may be selected at different times. Each proper subset may have a single contained label in one or more embodiments.

One or more embodiments of the invention may include a printer that is configured to print a barcode representing an organization-assigned identifier onto each tracking label, and a camera configured to capture an image of the tracking label after the barcode printing. The image may be analyzed by a processor to obtain the organization-assigned identifier and the unique identifier of the tracking label. A message may be sent to the server with these two identifiers, and the server may add an association between these two identifiers to the database.

In one or more embodiments of the invention, an item tracking system may switch between short-range and long-range location services. The system may have multiple tracking labels, each of which has: a unique identifier, a long-range wireless communication interface, a short-range wireless communication interface, and a controller coupled to the communication interfaces. The long-range wireless interface may receive navigation signals from multiple long-range transmitters. The short-range wireless interface may receive localization signals from one or more short-range communication devices located in a local area. The controller may disable the long-range wireless communication interface when the short-range wireless communication interface establishes communication with the one or more short-range communication devices, and it may enable the long-range interface when it loses communication with these short-range communication devices. The controller may calculate the location of the tracking label from either or both of the navigation signals and the localization signals at a sequence of times. It may transmit tracking label update messages over either or both of the short-range and long-range interfaces. Each tracking label update message may contain the tracking label's unique identifier, a time, and the location of the tracking label at that time. The system may have a database with a tracking history associated with each tracking label, and a server coupled to the database that receives the tracking label update messages and adds their contents to the tracking history of the label.

The long-range wireless communication interface may include for example one or more of a GPS receiver, a cellular communication interface, and a Wi-Fi communication interface. The short-range wireless communication interface may include for example one or more of a Bluetooth interface and a LoRaWAN interface.

In one or more embodiments the controller may calculate the location of the tracking label from one or more of a received signal strength indicator (RSSI), an angle of arrival (AoA), and a time of flight (ToF) of the (short-range) localization signals or the (long-range) navigation signals.

In one or more embodiments the one or more short-range communication devices may include a Bluetooth gateway. In one or more embodiments they may include a Bluetooth beacon.

In one or more embodiments the controller may repeatedly broadcast an advertising message on the short-range communication interface. When one of the short-range communication devices receives this advertising message, it may transmit a message to the controller to disable the long-range communication interface. In one or more embodiments the short-range communication device may repeatedly transmit a heartbeat message after it receives the controller's advertising message, and the controller may enable the long-range wireless communication interface when it stops receiving the heartbeat message.

In one or more embodiments each tracking label may also include one or more sensors, and the tracking label update message may include one or more sensor values captured by the one or more sensors.

In one or more embodiments, when the short-range wireless communication interface establishes communication with one or more short-range communication device, the controller may modify the frequency at which the sensor values are captured, or the frequency at which tracking label update messages are transmitted.

One or more embodiments of the invention may enable a method for activating an electronic tracking label via label printing. The method may include obtaining an electronic tracking label, obtaining a printer with a label cutter, feeding the tracking label into the printer, cutting the tracking label to activate it, and removing the printed activated label from the printer.

The electronic tracking label may have a label that may be attached to an item, and a flexible electronic circuit attached to or integrated into the label. The flexible electronic circuit may have a controller, a power source, a wireless communications interface, a unique identifier, and an activation mechanism. The activation mechanism may have an activation input, and an electrical path passing through a removable portion of the label and coupled to the activation input. Removal of the removable portion may break the electrical path and modify the activation input. The flexible electronic circuit may switch from a hibernation state to an active state when the removable portion of the label is removed to break the electrical path. When the label cutter of the printer cuts the label, the removable portion is removed and the electrical path is broken, causing the flexible electronic circuit to switch to the active state.

In one or more embodiments of the invention, the label cutter may cut along a line segment that separates the removable portion of the label from the remainder of the label. In one or more embodiments of the invention, the method for activating the label may include transmitting to the printer the distance between an edge of the label and this line segment. The printer may be configured to detect the edge of the label when it is in the printer, and move one or both of the label and the label cutter to position the cutter at the line segment.

In one or more embodiments of the invention, the electrical path coupled to the activation input may also be coupled to a reference voltage provided by the power supply, and it may also be coupled to a resistor coupled to a zero voltage provided by a ground. When the electrical path is not broken, the activation input may receive the reference voltage. When the electrical path is broken, the activation input may receive the zero voltage. The flexible electronic circuit may switch from the hibernation state to the active state when the voltage received by the activation input changes from the reference voltage to the zero voltage.

In one or more embodiments of the invention, the printer may also print label information on a surface of the label. The printer may print a barcode representing an organization-assigned identifier onto the label. The activation method may include capturing an image of the label after the printer has printed the barcode, analyzing the image to obtain the organization-assigned identifier and the label's unique identifier, transmitting an association message to a server with the organization-assigned identifier and the unique identifier, and adding an association between these identifiers to a database.

One or more embodiments of the invention may enable an electronic tracking label with a fold-over battery attachment. The apparatus may include a flexible printed circuit board substrate with a first battery attachment region, a second battery attachment region, and a bendable region coupled to and between the first and second battery attachment regions. One or more electronic components may be coupled to the first battery attachment region. A first conductive battery contact pad may be coupled to the first battery attachment region, and a second conductive battery contact pad may be coupled to the second battery attachment region. A first power supply trace may be coupled to the first conductive battery contact pad and may be coupled electrically to at least one of the electronic components. A second power supply trace may be coupled to the second conductive battery contact pad and may be coupled electrically to at least one of the electronic components. The second power supply trace may extend from the second battery attachment region through the bendable region into the first battery attachment region. The apparatus may include a battery with a first battery side having a first polarity and a second battery side opposite the first side have a second polarity opposite the first polarity. The first side may be coupled electrically to the first conductive battery contact pad, the bendable region may be bent so that the second conductive battery contact pad faces the second battery side, and the second battery side may be coupled electrically to the second conductive battery contact pad.

In one or more embodiments the electronic tracking label with a fold-over battery attachment may not include a battery holder.

In one or more embodiments the bendable region may be bent by approximately 180 degrees.

In one or more embodiments the said first battery side may be coupled electrically to the first conductive battery contact pad with a first portion of an electrically conductive adhesive and the second battery side may be coupled electrically to the second conductive battery contact pad with a second portion of the electrically conductive adhesive.

In one or more embodiments the electrically conductive adhesive may be a pressure sensitive adhesive.

One or more embodiments of the tracking label with a fold-over battery attachment may also include a label that covers the flexible printed circuit board substrate, the battery, and the one or more electronic components. One or more embodiments may include a liner behind the flexible printed circuit board substrate, the battery, and the one or more electronic components.

In one or more embodiments the maximum width of the electronic tracking label between the bottom surface of the liner and the top surface of the label may be less than or equal to 2200 micrometers. The maximum width may be at a location where the battery is installed between the first conductive battery contact pad on the first battery attachment region and the second conductive battery contact pad on the second battery attachment region.

In one or more embodiments of the tracking label with a fold-over battery attachment the electronic components may include a controller, a wireless communications interface, one or more sensors, and a unique identifier. In one or more embodiments the electronic components may also include an activation mechanism with an activation input and an electrical path passing through a removable portion of the electronic tracking label and coupled to the activation input, where removal of the removable portion breaks the electrical path and modifies the activation input. The electronic components may switch from a hibernation state to an active state when the removable portion of the electronic tracking label is removed to break the electrical path.

One or more embodiments of the invention may track items with electronic tracking labels in order to detect shipment faults. The system may include multiple tracking labels, each of which has a label that is configured to be attached to an item that is part of a shipment, and an electronic circuit with a controller, a power source, a wireless communications interface, one or more sensors, and a unique identifier. The system may include a database that includes a tracking history associated with each tracking label, and a shipment description associated with each shipment of multiple shipments. A shipment description may include a shipment identifier, one or more items included in the shipment, and a shipment destination. The system may include a server that is coupled to the database. The server may receive one or more tracking label update messages associated with each tracking label. A tracking label update message may include the tracking label's unique identifier, a time, a location of the tracking label at that time, and one or more sensor values captured by the sensors of the tracking label. The server may add the contents of the tracking label update message to the tracking history associated with the tracking label. The server may determine the status of a shipment based on the shipment description and on the tracking history associated with each item in the shipment. A shipment status may include one or more of: a shipment complete indicator, that indicates whether all items included in the shipment have arrived at the shipment destination; a current location of one or more of the items in the shipment description; and one or more shipment faults. Shipment faults may include for example, without limitation: an incomplete delivery fault that indicates that some items included in the shipment description have arrived at the destination, but other items included in the shipment description have not arrived at the destination; an item lost fault that indicates that the tracking information for one or more items in the shipment description has not been received recently; and a separated shipment fault that indicates that some items in the shipment description are being transported separately from other items in the shipment description.

One or more embodiments of the system may also include multiple tracking gateways, each of which is configured to be placed in or on a shipping vehicle or a shipping container. Each tracking gateway may have a first wireless communications interface configured to communicate with the wireless interfaces of the multiple tracking labels, and a second wireless communication interface configured to communicate with the server. Each tracking gateway may be configured to connect to tracking labels in the shipping vehicle or shipping container via the first wireless interface, obtain data from these tracking labels, and forward the data to the server via the second wireless interface.

In one or more embodiments, the first wireless communications interface of a tracking gateway may be a Bluetooth interface, and the second wireless communication interface may be a cellular network interface.

In one or more embodiments, each tracking gateway may also have or be coupled to a location detection system. Each tracking gateway may be configured to obtain its current location from the location detection system, and to forward this location to the server as the location of each tracking label in the shipping vehicle or shipping container.

In one or more embodiments, at least one shipment description in the database may also include an acceptable range for a sensor value associated with at least one item in the shipment description. The shipment faults may also include an out-of-range sensor value fault that indicates that at least one item had an associated sensor value during shipment that was outside of this acceptable range.

In one or more embodiments, the sensors associated with at least one item may include a temperature sensor; the acceptable range may include an acceptable temperature range; and the out-of-range sensor value fault may include an out of temperature range fault.

In one or more embodiments, the sensors associated with at least one item may include a shock sensor; the acceptable range may include an acceptable shock range; and the out-of-range sensor value fault may include an out of shock range fault.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An item tracking system with electronic tracking labels containing sensors will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
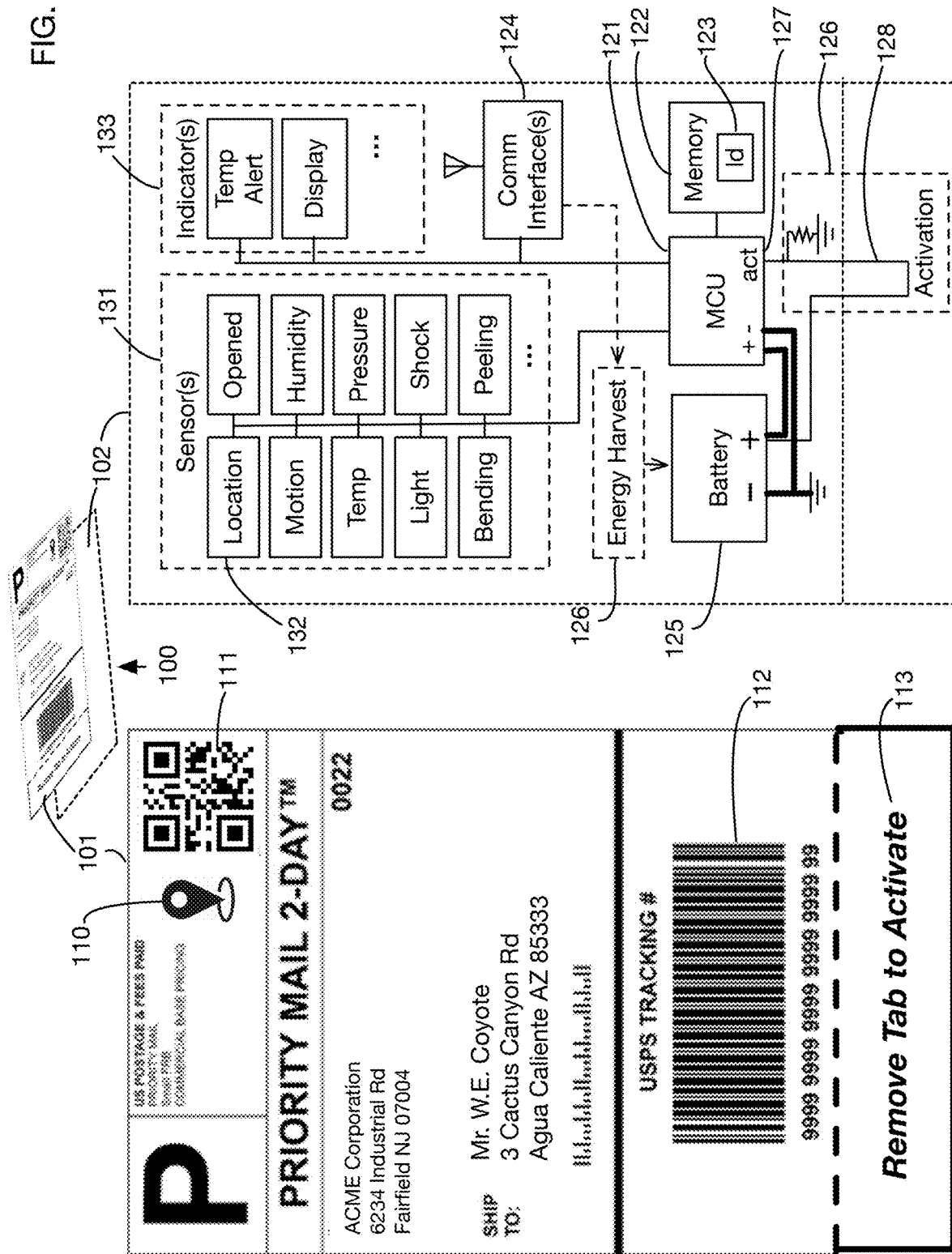
FIG. 1 shows an illustrative tracking label that contains electronic components such as a microcontroller, a communication interface, and one or more sensors.

One or more embodiments of the invention enable tracking of items by combining "smart" electronic tracking labels with a centralized system that collects and analyzes data from these smart labels. FIG. 1 shows an illustrative embodiment of a tracking label 100, which has a top layer 101 that resembles a typical printed layer, and one or more layers 102 below this top layer that contain flexible electronic circuits. Illustrative layers are further described below with respect to FIG. 2. The tracking label 100 may be of any size or shape. It may be configured to be attached to or otherwise coupled to or placed onto or into any type of item, including for example a container that contains other items.

The top layer 101 may have any type of human or machine readable text, images, codes, or symbols. It may serve as a shipping label, as in the example shown in FIG. 1, or as any other type of marking or identifier. The label may contain codes such as a QR code 111 and/or a barcode 112. In one or more embodiments, one or more of these codes may correspond to a unique identifier of the tracking label. The label may contain any symbols that indicate the functionality of the electronic components integrated into the label, such as symbol 110 that indicates that this label provides automatic location tracking.

Layer (or layers) 102 may contain components that provide tracking and monitoring functionality. FIG. 1 shows a block diagram of illustrative components; embodiments may include any or all of these components, as well as additional components not shown in FIG. 1. The components shown in FIG. 1 may be implemented as discrete elements or some or all of them may be integrated into one or more integrated circuits. The tracking label may include a controller 121, which may be any type or type of processor, including for example, without limitation, a microcontroller, a microprocessor, a CPU, a GPU, or an ASIC. It may have one or more communications interfaces 124 coupled to the controller, which may include wireless or wired interfaces. It may have a memory 122 coupled to the controller, which may include either or both of volatile and nonvolatile memory. The memory 122 may contain a stored identifier 123 of the tracking label. This identifier 123 may be unique across a set of tracking labels. In one or more embodiments the identifier may be for example a MAC address, an IP address, or a GUID. The identifier 123 may correspond to a readable code on the top layer of the label, such as QR code 111 or barcode 112. As described below, the centralized tracking label monitoring system may use the identifier 123 (and/or codes such as code 111) to index data collected about the tracking label.

Tracking label 100 may have a power source, such as a battery 125. One or more embodiments of the tracking label may use energy harvesting circuits 126, which may for example obtain electromagnetic energy from a communications interface 124, or may harvest thermal, solar, or motion energy. Energy harvesting component 126 may directly power the other components, or it may be used to charge battery 125.

The tracking label may include one or more sensors 131. Sensors may monitor any state of the label, of the item to which the label is attached, or the of environment surrounding this item. Sensors may include for example, without limitation: a location sensor 132, such as a GPS receiver; a motion sensor such as an accelerometer or gyroscope; a temperature sensor; a light sensor; a humidity sensor; a pressure sensor; a shock sensor, which may include for example a piezoelectric element; a sensor such as printed resistive material that detects bending or peeling; and a sensor that detects when an item or container is opened or a seal is broken, such as a resistance sensor or a continuity sensor. These sensors are illustrative; one or more embodiments may contain any type or types of sensors. Sensors may collect sensor data at any interval, or when triggered by some event. Sensor data may be transferred for example to controller 121, and this data may be stored in memory 122 or transmitted via communications interface 124.

The tracking label may include one or more indicators 133. Indicators may for example indicate whether a sensor has detected an "alert" condition (which may be configurable, as described below). For example, a tracking label with a temperature sensor may be placed on an item that should be kept within a temperature range, and a temperature alert indicator may be illuminated if the temperature sensor detects a temperature outside this range. Indicators may for example be LEDs, such as OLEDs, that are illuminated under specific conditions. In one or more embodiments the indicators 133 may include a display, and alerts or status messages or symbols may be shown on the display.

Illustrative tracking label 100 has a tear-off or clip-off tab 113 at the bottom of the label. A user of the label may remove this tab to activate the electronic components of the tracking label. This feature supports use cases where tracking labels are manufactured and stored in advance of their use. After manufacturing and testing, the tracking labels may be placed into a hibernation state that consumes very little power. When a label is to be used, tab 113 is removed, which switches the label into an active state. Embodiments of the invention may use various mechanisms for activation, including but not limited to a tear off tab 113. These activation mechanisms may modify an activation input 127 into the controller when the user or an activation device performs some activation action to activate the associated tracking label. When the controller 121 receives the change in the activation input, it may switch the label's electronics from the hibernation state to the active state. Illustrative activation mechanisms are described below with respect to FIG. 5.

Label 100 may be flexible so that it can be placed onto a curved or bent surface. The electronic components in layer (s) 102 may be constructed using flexible circuit techniques, which may for example use very thin components and traces, and substrates made of flexible materials.

Figure 2:
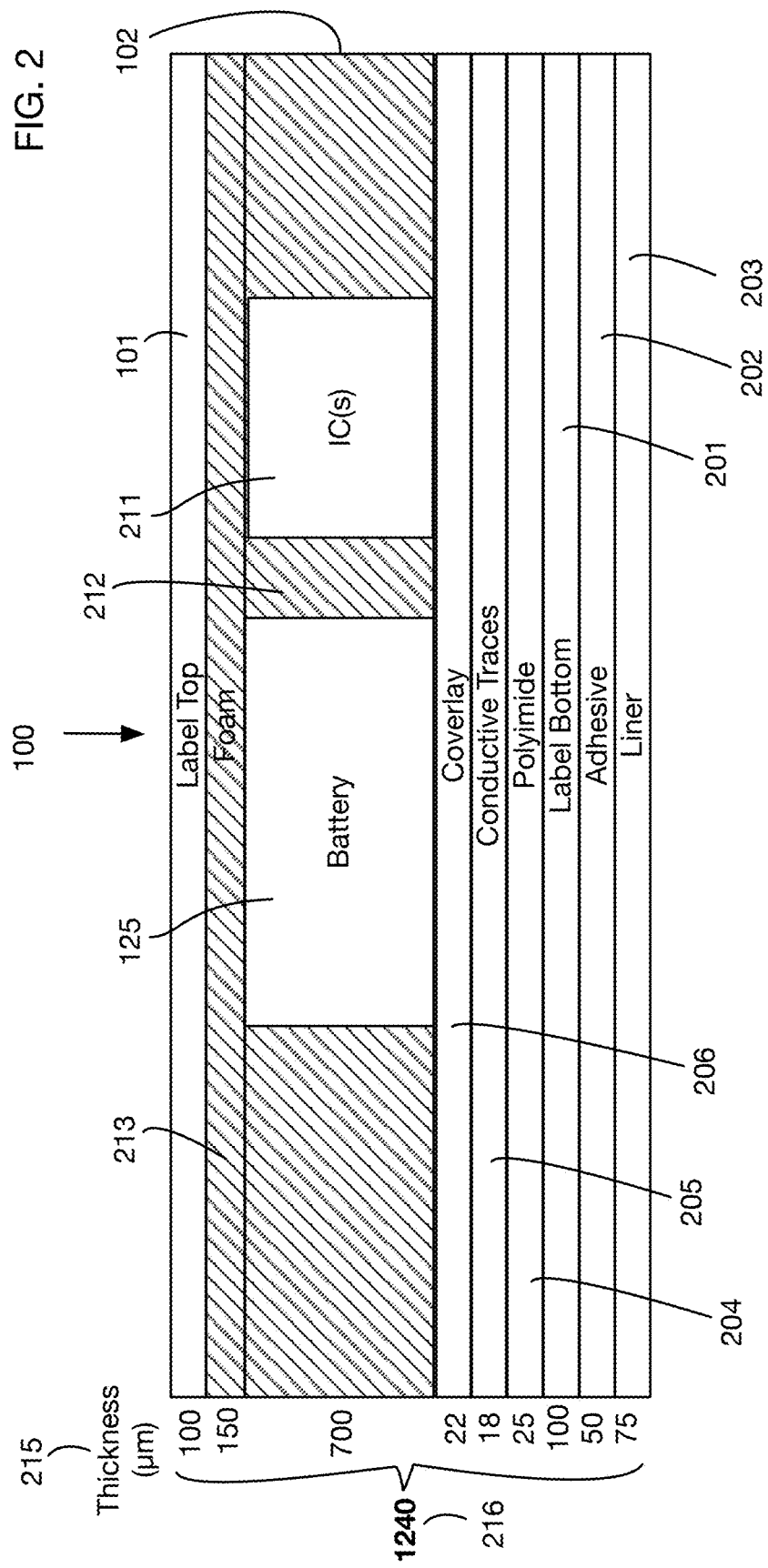
FIG. 2 shows a side cross-section view of the illustrative tracking label of FIG. 1, showing the layers that contain the readable label and the electronics.

FIG. 2 shows a side cross-section view of illustrative layers in one or more embodiments of tracking label 100. Top layer 101 may contain printed text or symbols, as shown for example in FIG. 1; this layer may be a polyester film made of polyethylene terephthalate (PET), for example. The bottom layers of the tracking label may include a label bottom layer 201, which may be made also of PET for example, and an adhesive layer 202 below the layer bottom; the adhesive may be covered by a removable liner 203. Above the label bottom may be a polyimide layer 204 covered by conductive traces 205 (made for example of copper), covered with a coverlay layer 206 with holes for soldering or otherwise connecting electronic components to the conductive traces.

The electronic components 102 may be above the coverlay layer 206; these components may be soldered to conductive traces in layer 205 for interconnections, or attached to conductive traces with a conductive adhesive or other conductive material. In an illustrative embodiment, battery 125 may be a separate component, and other elements such as the MCU, sensors, memory, etc. may be combined into an integrated circuit 211, or into multiple integrated circuits. One or more layers of acrylic, epoxy, or similar materials may be placed around the integrated circuit(s) 211 to protect the integrated circuit(s) and the solder joints or other connections from the circuits to the conductive traces. The components may be separated by foam 212 or air gaps, for example. A foam layer 213 may cover the electronic components layer 102.

FIG. 2 shows illustrative layer thicknesses 215, in micrometers, for each of the layers 101, 213, 102, 206, 205, 204, 201, 202, and 203. The total thickness 216 of this illustrative embodiment is less than 1.5 millimeters. Because embodiments of the invention may have minimal thickness, they may be placed on very small items and on items with non-flat surfaces. They may also be placed inside containers without substantially reducing the volume of the containers.

Figure 3:
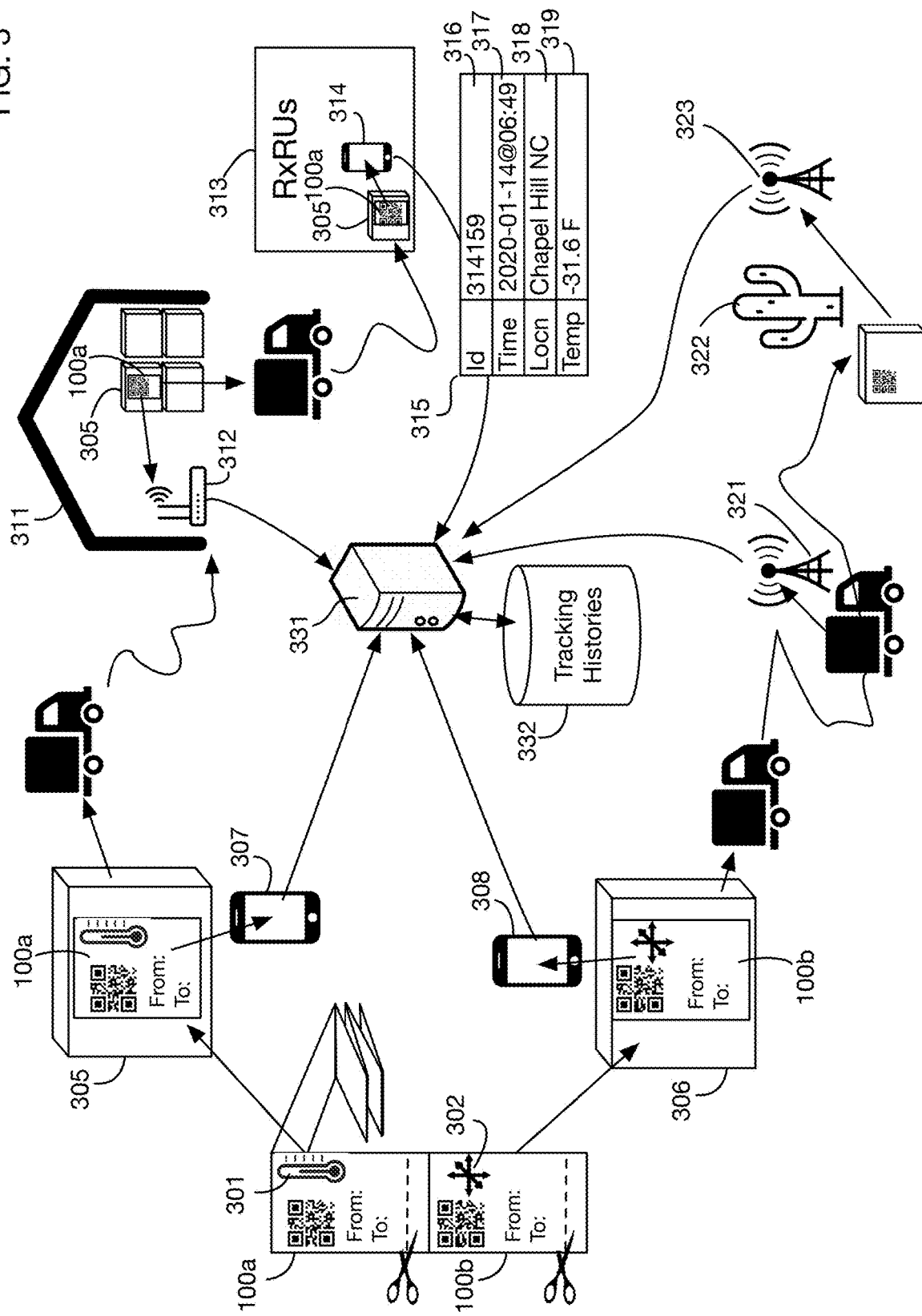
FIG. 3 shows an illustrative item tracking system that uses tracking labels such as the label of FIG. 1 and that receives updates on items' locations and sensor values.

In one or more embodiments of the invention, tracking labels such as illustrative label 100 or similar labels may be integrated into an item tracking system. FIG. 3 shows an illustrative scenario for an item tracking system, which includes tracking labels 100a and 100b, a server 331, and a database 332 that may store data collected from the tracking labels. Only two tracking labels are shown for ease of illustration; one or more embodiments may support simultaneous tracking of thousands or millions of tracking labels. Server 331 may be any type of processor or a network of multiple processors. Similarly database 332 may be include type of storage device or devices, and any type or types of data organization and access software. Database 332 may be for example, without limitation, one or more SQL databases, non-SQL databases, files, tables, spreadsheets, associative memories, or any other data structures. Server 331 may be connected directly or indirectly to tracking labels via any types of network connections, possibly via any intermediate devices, as described below.

Illustrative tracking labels 100a and 100b may be configured for different applications; for example, label 100a may be configured to track an item that is temperature sensitive (such as a pharmaceutical), and label 100b may be configured to track an item that is shock sensitive (such as a fragile item). Tracking label 100a may therefore include a temperature sensor 301, and tracking label 100b may include a shock sensor (such as an accelerometer) 302. In the scenario shown in FIG. 2, label 100a is attached to an item 305, which may be a container containing a temperature-sensitive product, and label 100b is attached to an item 306, which may be a container containing a shock-sensitive product. The activation tabs may be removed from the labels before they are affixed, putting each label into an active tracking state.

Continuing with this scenario, prior to shipping items 305 and 306 with the attached and activated tracking labels 100a and 100b, respectively, the shipper uses devices 307 and 308 (which may be the same device) to obtain initial information from the tracking labels. For example, these devices may connect to each tracking label using a Bluetooth interface. Devices 307 and 308 may be any types of devices, including but not limited to mobile devices such as smartphones. The state of each label may be collected by the devices and then may be transmitted to server 331, for example over an internet connection. The label state may include the label's unique identifier, location, and sensor values of any sensors incorporated into the label. The server 331 may generate a tracking history for each label and store this history in database 332. The tracking history for a tracking label may include the unique id of the label, and a list of state updates that may include for example a timestamp, a location where the label is located at that timestamp, and sensor readings from the label at that timestamp.

Item 305 is then shipped to a warehouse 311, where another update on the state of the attached label 100a is obtained and transmitted to server 331. In this case a Wi-Fi access point 312 in the warehouse connects to a Wi-Fi interface in the tracking label, and the label transmits location and sensor data via this access point 312 to the server. In this example, tracking label 100a includes two different communications interfaces: a Bluetooth interface and a Wi-Fi interface. In one or more embodiments, a tracking label may have any type or types of communications interfaces, as described below with respect to FIG. 7. Updates on the tracking label location and sensor readings may be transmitted to the server using any of these interfaces. Depending on what interfaces are available, the tracking label may out of range of compatible networks for periods of time. For example, label 100a may be out of range while it is being transported to warehouse 311. In one or more embodiments, the label may be configured to collect sensor data at certain intervals, or upon certain events, and to store the collected data in the label's memory, regardless of whether a network connection is currently available. At the next connection, for example when label 100a is in range of access point 312, the label may transmit updates including any stored sensor data. This allows users of the tracking system to monitor the history and trend of the tracked item's state, even when the users may not receive notifications of new data until the next network connection and state update message.

Continuing with the scenario shown in FIG. 3, item 305 is then shipped from warehouse 311 to a retail outlet 313. A mobile device 314 in this outlet connects to the Bluetooth interface of tracking label 100a to obtain another update. FIG. 3 shows contents of an illustrative tracking label update message 315 that may be sent to server 331. This message contains the unique identifier 316 of the tracking label, the time (including date) 317 of the update, the location 318 of the tracking label, and sensor reading 319 from the tracking label (which in this case measures temperature). The server receives this data and updates the tracking history for the associated tracking label.

Item 306 is shipped directly to its final destination 322. Tracking label 100b attached to this item has a cellular network interface, so that update messages may be transmitted from the label to the server 331 whenever there is an available cellular network. For example, when the truck carrying item 306 passes within range of a cell tower 321, the label 100b may transmit an update message to the server with its current location and the recent sensor readings. Similarly when the item arrives at destination 322, if a cell tower 323 is in range, the tracking label can send another status update to server 331, indicating that it is at its final destination.

Figure 4:
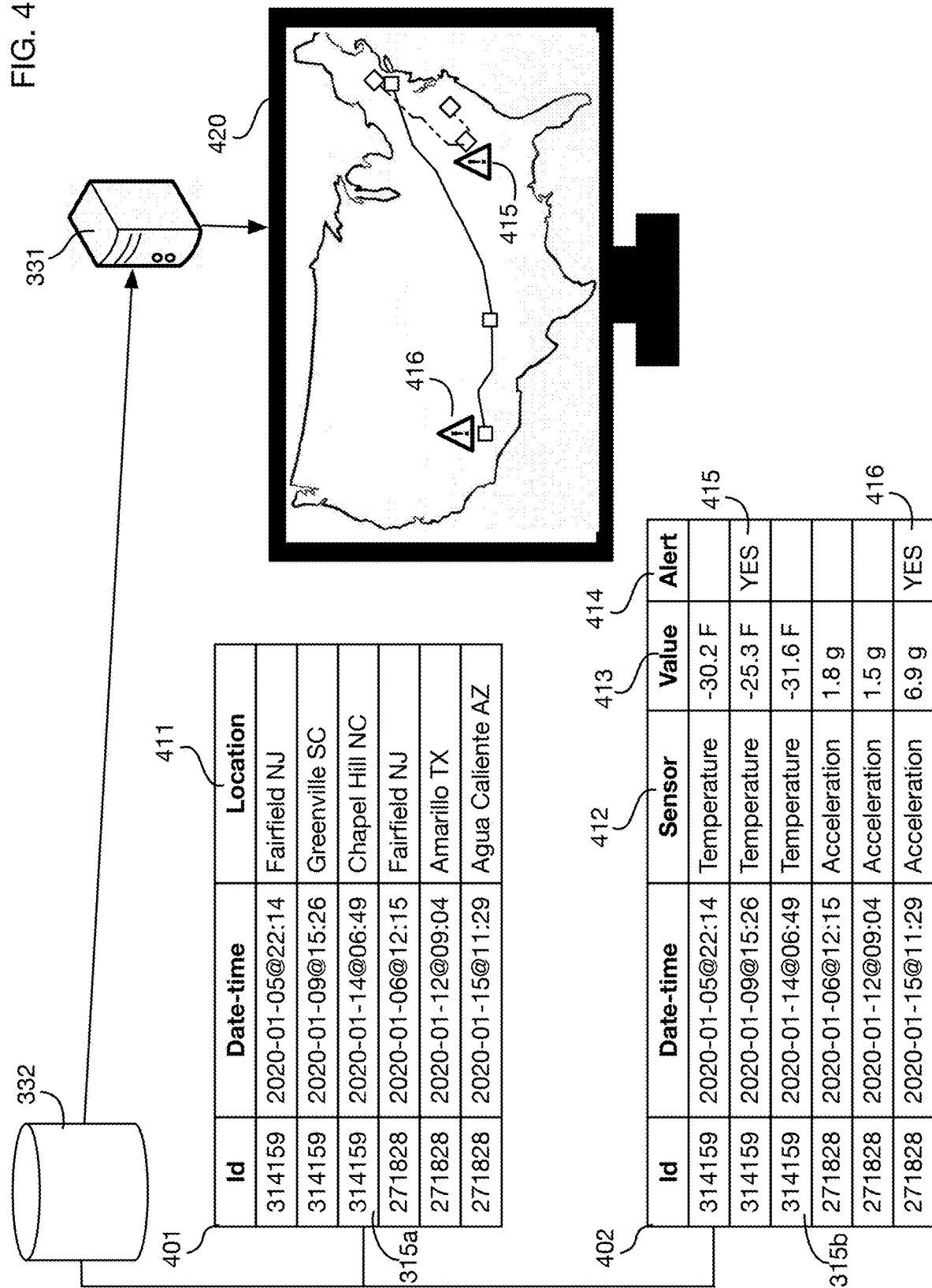
FIG. 4 shows illustrative data collected by the item tracking system of FIG. 3.

FIG. 4 shows illustrative tracking history data that may be stored in database 332 for tracking labels 100a and 100b in the scenario shown in FIG. 3. In this illustrative database, update information is stored in two tables 401 and 402; table 401 contains location information and table 402 contains sensor reading information. Table rows may be indexed by the unique identifier of the tracking label. This table organization is illustrative; one or more embodiments may organize tracking history data in any desired manner. For example, row 315a in table 401 and row 315b in table 402 are derived from tracking label update message 315 transmitted when item 305 arrives at location 313. Location field 411 in table 401 is shown as a city; one or more embodiments may track locations with any desired granularity, including for example, without limitation, at the level of a state, county, city, zip code, or latitude/longitude. Location may be tracked with any degree of accuracy, which may depend for example on the location sensing technology used for the tracking label.

Sensor data table 402 includes an identifier 412 of the specific sensor(s) in each tracking label, a value 413 read from that sensor at the associated date/time, and an alert field 414. Each tracking label may be configured with sensor data ranges or rules that indicate when alerts should be generated. (Server 331 may also analyze data in database 332 to generate other alerts or take any desired actions.) In one or more embodiments, an alert may also trigger a change in an indicator on the sensor, such as an indicator light or a display. Any device that connects to a tracking label may process any received alerts and may for example generate messages or take other actions when alerts occur. In the scenario shown in FIGS. 3 and 4, alert 415 occurs when the temperature of the item in warehouse 311 exceeds the desired temperature range of −30 F or below; alert 416 occurs when the package is delivered and is dropped with excessive shock to the contents.

Server 331 or any other systems may access database 332 and perform any analyses on the data, and may take any actions based on these analyses. In FIG. 4, server 331 presents a map display 420 to users that shows the routes followed by items 305 and 306, and shows where alerts have occurred. Server 331 may for example initiate corrective actions based on the alerts, such as sending replacement items or informing the receivers of the items of potential issues. Analyses may also indicate trends or patterns, such as carriers or locations that tend to generate excessive alerts, or that result in delivery delays. Alerts may also be generated if locations 411 are unexpected, or if an item arrives at a location at a time that is not expected.

Figure 5:
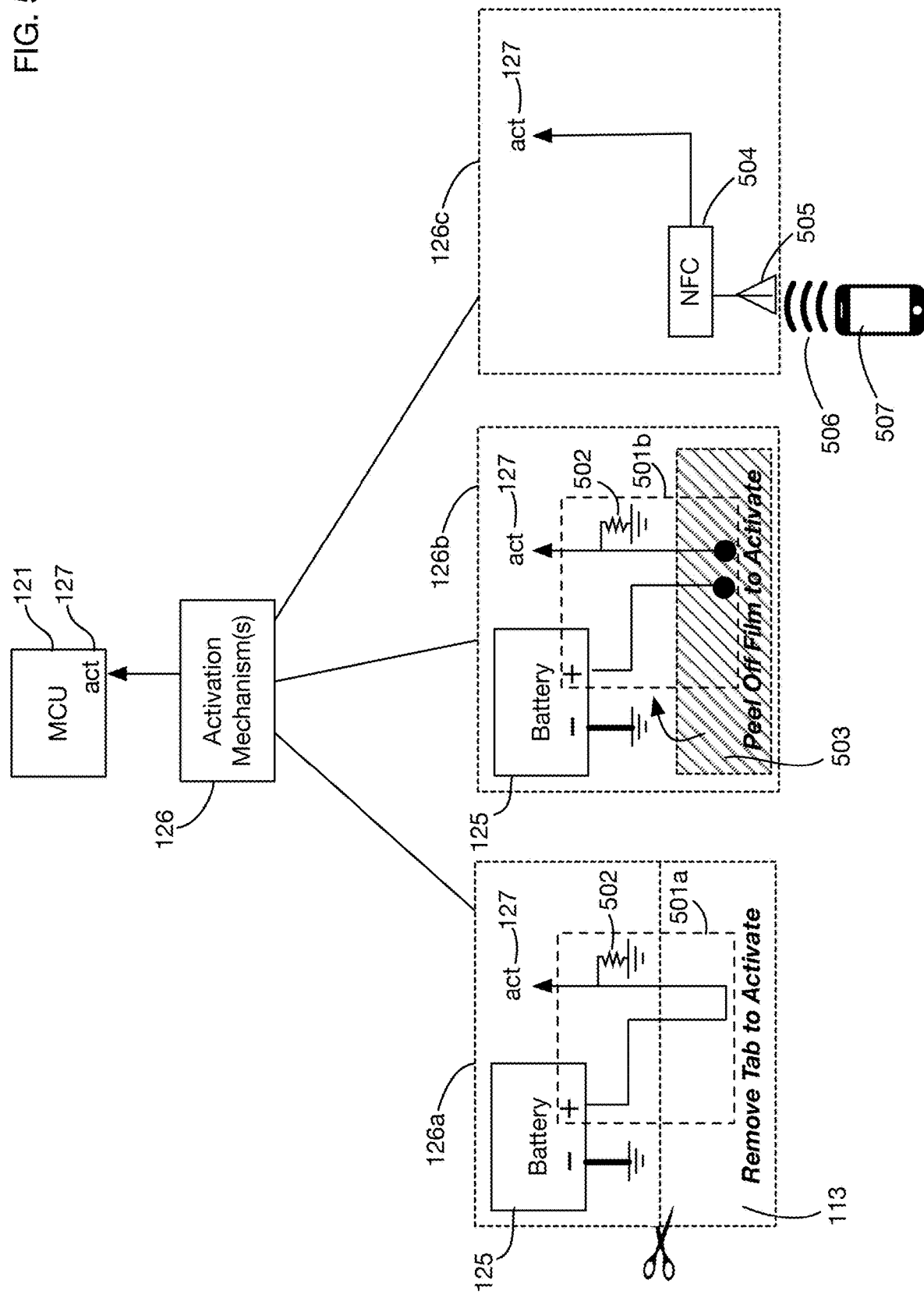
FIG. 5 shows three illustrative label activation mechanisms that may be used in one or more embodiments of the invention.

FIG. 5 shows three illustrative activation mechanisms 126 that may be used in one or more embodiments of the tracking labels. Each of these mechanisms may for example generate a change in an activation input 127, which may be input for example into controller 121. Controller 121 (or other components) may detect a change in this input and activate the label electronic components accordingly. Activation mechanism 126a, which is also shown in FIG. 1, includes a tab or section 113 of the tracking label that is removed to activate the label. Circuit 501a contains a conductive path from the positive terminal of battery 125 to the activation input 127, with a portion of this path passing through the tab 113. When the tab is attached to the label, input 127 is positive (high). When the tab is removed, this path is broken and input 127 is pulled to ground through resistor 502; controller 121 detects this voltage change and activates the tracking label.

Activation mechanism 126b is similar to mechanism 126a, but instead of removing a tab to activate the label, the tracking label has a sheet of conductive film 503 that is peeled off to activate the label. Circuit 501b has a conductive path from the battery to the activation input 127 that passes through the sheet of conductive film; this path is broken when the film is removed.

Activation mechanism 126c activates the tracking label when an external activation device 507 transmits electromagnetic energy 506 to a receiving antenna 505 in the tracking label. For example, an NFC (near-field communication) signal may be used to bootstrap the tracking label. A receiving circuit 504 may for example transform the received signals from the antenna into a voltage change on activation input 127 to activate the tracking label.

These activation mechanisms are illustrative; one or more embodiments may activate a tracking label based on any activation action, which may include physical modification to the label, or any manual inputs or signal inputs into the label.

Figure 6:
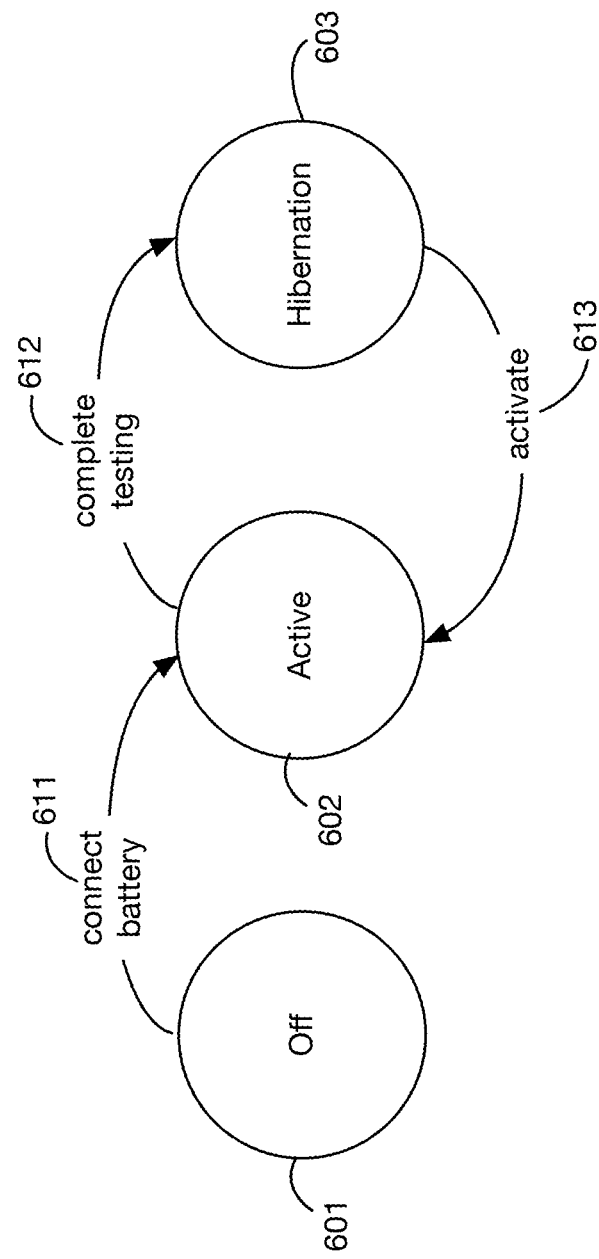
FIG. 6 shows a state transition diagram for testing and activation of a tracking label.

FIG. 6 shows an illustrative state transition diagram for the activation state of a tracking label. One issue addressed by one or more embodiments of the invention is that the tracking label circuitry may need to be tested after assembly, which requires the circuits to be active. However, after testing the circuitry may need to be placed into a low power consumption hibernation state to maintain the battery life until the tracking label is used.

Therefore, as shown in FIG. 6, a newly manufactured tracking label may transition immediately from an "off" state 601 (no power) to an "active" state 602 when the battery connected event 611 occurs. After testing complete event 612 occurs, the label may transition to a "hibernation" state 603 that consumes very little power. Testing completion may occur automatically or in response to a signal from the testing environment. The tracking label circuitry may then await the activate signal 613 to transition back to the active state 602 for use.

Figure 7:
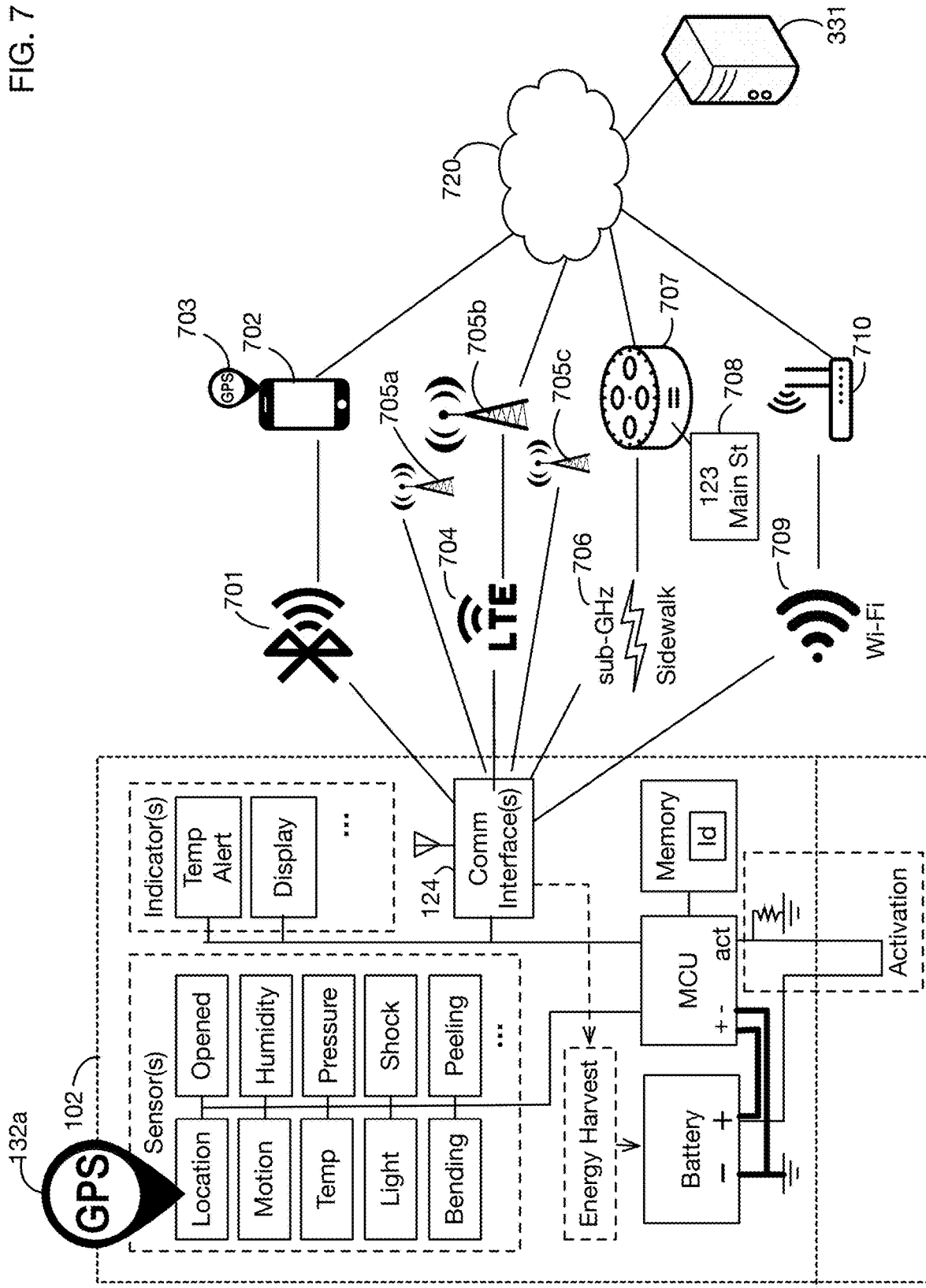
FIG. 7 shows illustrative communications interfaces that may be used in one or more embodiments of a tracking label, and methods for determining the location of a tracking label.

FIG. 7 shows illustrative tracking label communications interfaces 124 that may be used in one or more embodiments of the invention. Some tracking labels may have multiple communications interfaces. The selection of a communications interface or interfaces may depend for example on application connectivity requirements (for example, whether frequent updates of label state are needed even when the item to which the label is attached is in transit), and on desired tradeoffs between cost, connectivity, and power consumption. The choice of communications interfaces may also be related to the methods used to determine the location of a tracking label.

Some communications interfaces may be limited in range to a local area, such as a building or room. Such an interface may therefore be usable only when the tracking label is in the vicinity of a device or access point that is compatible with that interface. A Bluetooth interface 701 for example may communicate with a local device 702, such as a mobile phone. In one or more embodiments, Bluetooth interface 701 may be a Bluetooth Low Energy (BLE) interface. A Wi-Fi interface 709 may communicate with a local Wi-Fi access point or router 710. The local devices, such as mobile device 702 or Wi-Fi access point 710, may then connect to server 331 via network (or networks) 720. Network 720 may be public (such as the Internet) or private (including VPN links through public networks).

Communications interfaces 124 may also include Amazon Sidewalk interfaces 706. Amazon Sidewalk uses sub-Gigahertz frequency transmission and may connect for example to compatible devices 707, such as Amazon Echo™ devices. These devices may be connected to server 331 via Internet connections or via other networks.

Communications interfaces 124 may also include longer-range network interfaces, such as cellular network interfaces 704. Tracking labels with cellular network interfaces may be able to transmit or receive information from any cell towers or cellular antennas within range. This range may be many kilometers in some areas. The cellular network may then provide connectivity to server 331. One or more embodiments of the invention may use any cellular network technology or technologies, such as for example, without limitation, CDMA, GSM, or LTE.

FIG. 7 also illustrates methods that may be used in one or more embodiments to determine the location of a tracking label. A tracking label may contain a location sensor such as a GPS receiver 132a or similar locating component. If such a location sensor is present, the controller may query the sensor to obtain the label's location. If there is no such sensor, or if the sensor is unavailable (for example if GPS receiver 132a cannot access a GPS signal), other methods may be used to determine the label's location. For example, a device in the vicinity of the tracking label, such as mobile device 702, may have a GPS receiver 703 or other mechanism to determine the device's location. When the tracking label is connected to this local device, the local device may obtain sensor data from the tracking label, and may add its own location to this data as the location of the label for the update message that is transmitted to server 331. Because the local device is very near the tracking label, the device's location is almost identical to that of the label. Another scenario is illustrated with local device 707, where the device is configured with an address 708; this address may be used as the label's location when the label is connected via network interface 706 to this device.

For tracking labels with cellular network interfaces 704, location may be determined using triangulation from different cell towers, such as towers 705a, 705b, and 705c. The signal strength from each tower and the known location of the towers may be used to determine the location. This locating method may be used as a backup if other methods are unavailable, for example if a GPS 132a is not responding or if no local devices such as 702 or 707 are within range. Triangulation may be used from any type of signal sources, including but not limited to cellular signals.

Figure 8:
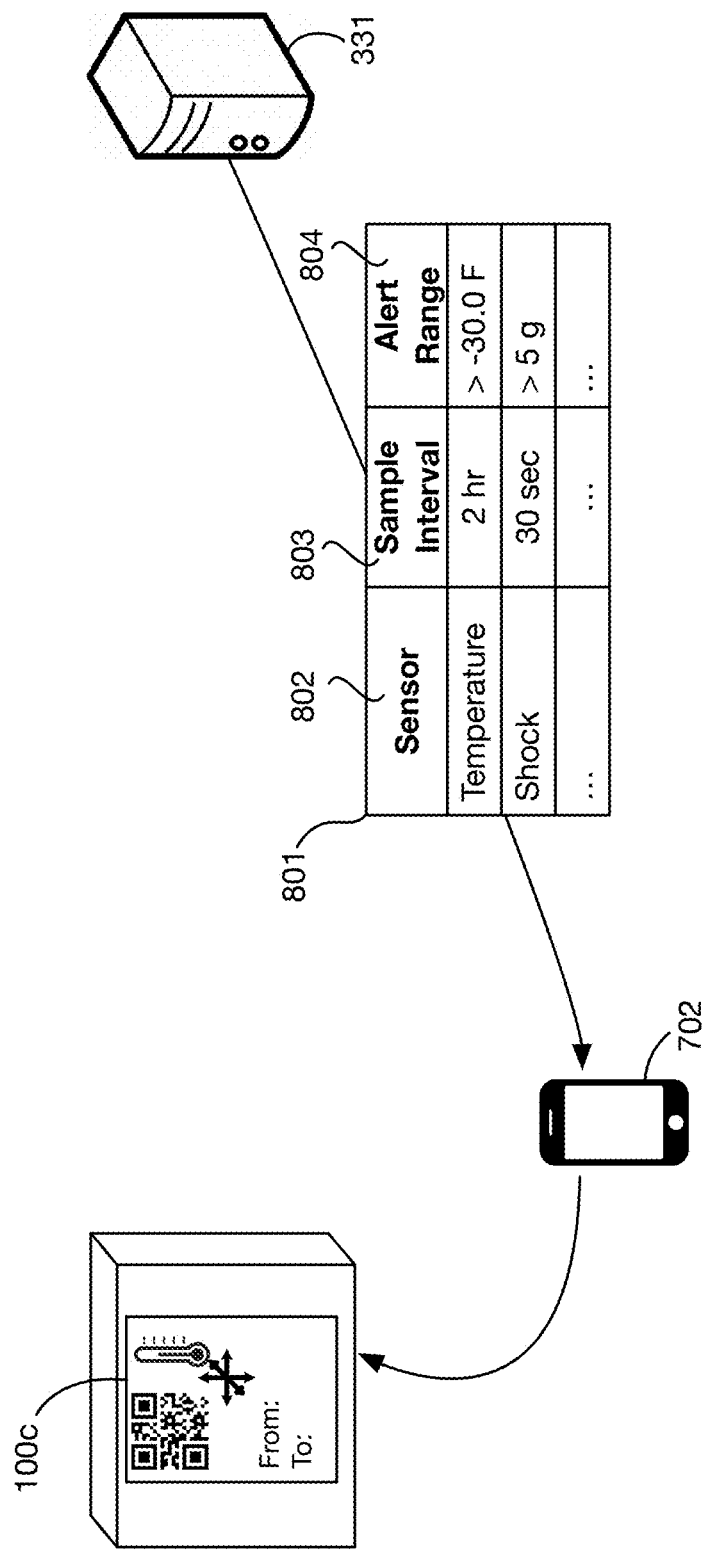
FIG. 8 shows an illustrative settings update message that may be sent to a tracking label.

In one or more embodiments of the invention, tracking labels may have configurable rules that may control data collection or other parameters. For example, these rules or settings may specify how often sensor data is collected and what actions to take based on observed sensor values. FIG. 8 shows an illustrative example of modifying data collection rules for a tracking label 100c with both a temperature sensor and a shock sensor. Server 331 may transmit a message 801 to the tracking label, possibly via another device such as mobile device 702, to set or update the label's data collection rules. Message 801 may contain for example a sample interval 803 for one or more sensors 802, which controls how frequently each sensor will be polled. (This interval may differ for different sensors.) Sensor sampling intervals need not be constant; in one or more embodiments the sensor configuration may contain complex rules that control when data is collected, which may vary over time or vary based on previous readings or other events. Message 801 may also contain ranges 804 for sensor data that trigger a corresponding alert. Message 801 may also contain actions to be performed when certain alerts occur, such as illuminating an indicator, displaying a message, transmitting a message, or modifying the tracking label behavior.

Figure 9:
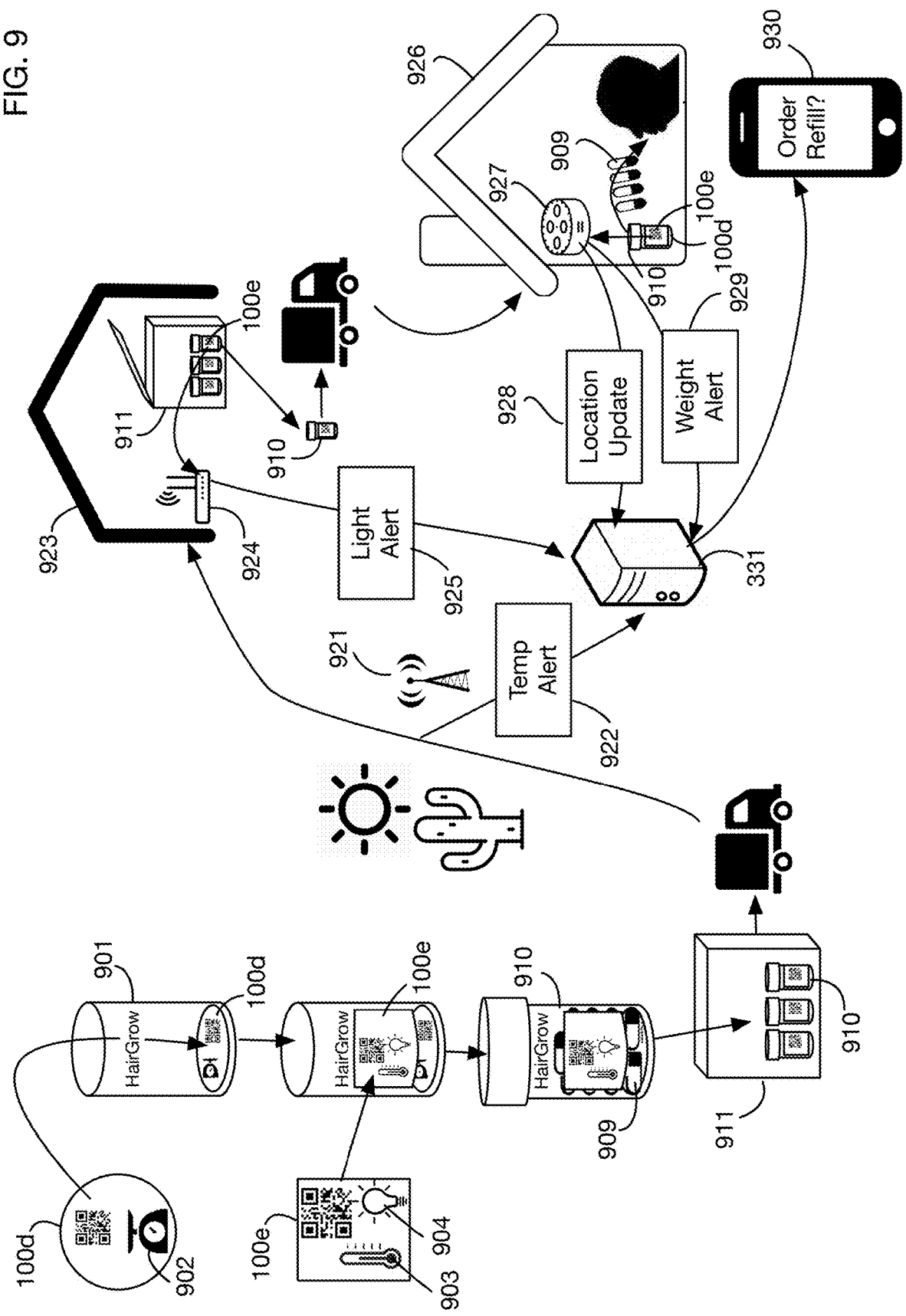
FIG. 9 shows an illustrative application of an item tracking system in a pharmaceutical supply chain.

FIG. 9 shows an illustrative scenario for a pharmaceutical supply chain application of an embodiment of the invention. This embodiment uses tracking labels to track a bottle of pills from the supplier to the end user, including tracking of consumption and management of refills. In the first step a tracking label 100d is activated and placed on the bottom surface of an empty pill bottle 901. This label 100d includes a weight sensor 902. This weight sensor will monitor the number of pills in the bottle. Next another tracking label 100e is activated and placed on the outside of the bottle. This label 100e includes a temperature sensor 903 and a light sensor 904. The temperature sensor is used because the medication that will be placed in the bottle should not be exposed to high temperatures. The bottle is then filled with pills 909 and closed, resulting in a filled and labeled bottle 910 ready to ship. This bottle 910 is placed into a container 911 with other items, and is shipped to warehouse 923. The truck carrying the container 911 passes through a very hot area, and the temperature sensor 903 detects a temperature above the desired range. A temperature alert 922 is therefore generated, and the tracking label 100e connects to a cell tower 921 and transmits this alert to server 331. The manufacturer or distributor may review this alert to determine whether the bottle should be discarded; in this scenario, the temperature alert is deemed not serious.

When container 911 arrives at warehouse 923, Wi-Fi router 924 connects to tracking label 100e. When container 911 is opened, the light sensor 904 in label 100e detects the opening and sends an alert 925 to server 331 via the Wi-Fi router 924. A person or an automated process may review this alert and determine that the opening of the container is expected since the location of the tracking label is warehouse 923; if the location were different, it might be classified instead as tampering with or stealing the contents of the container.

Bottle 910 is then shipped to its final destination, house 926. When the bottle arrives at the house (even if it is outside in a mailbox or in front of the house), tracking label 100e connects to an Amazon Sidewalk enabled device (such as Echo™ 927) and transmits an update 928 to server 331 with the label's location. A manual or automated process may therefore determine that the bottle has arrived at its intended destination. (If the location is different from the intended destination, an alert may be generated that the bottle has been stolen or misdelivered.) Tracking label 100d at the bottom of the bottle may also connect to device 927 and report the weight of the bottle to confirm that it is still full. As the user consumes pills 909 from the bottle, the weight detected by the weight sensor in label 100d decreases; periodic update messages to the server may be analyzed to determine how many pills the user has consumed at any point in time. This information may be used to monitor the user's compliance with the pill dosage schedule. Reminders may be transmitted to a user device 930 if the user misses a dose, for example. When the number of pills remaining in the bottle falls below a threshold, a weight alert 929 may be sent to server 331, and the server may send a message to the user device 930 suggesting ordering a refill, or it may automatically generate a refill order.

One or more embodiments of the invention may enable tracking and management of hierarchical aggregation of items and packages. Hierarchical aggregation refers to the aggregation of units into packages that contain them; this aggregation may be hierarchical because packages may be contained in or otherwise aggregated into other higher-level packages. Current systems to manage and track hierarchical aggregation in supply chains are typically manual; for example, operators may scan items individually when they are added to a package and may then scan a package label to indicate that the scanned items are in the package. Manual updates may also be required when items are removed from packages or split into different packages. The electronic tracking labels of the invention enable more automated and complete tracking of hierarchical aggregation relationships throughout the supply chain; sensors in the labels also enable tracking the environments to which items and packages are exposed as they move through the supply chain.

Figure 10:
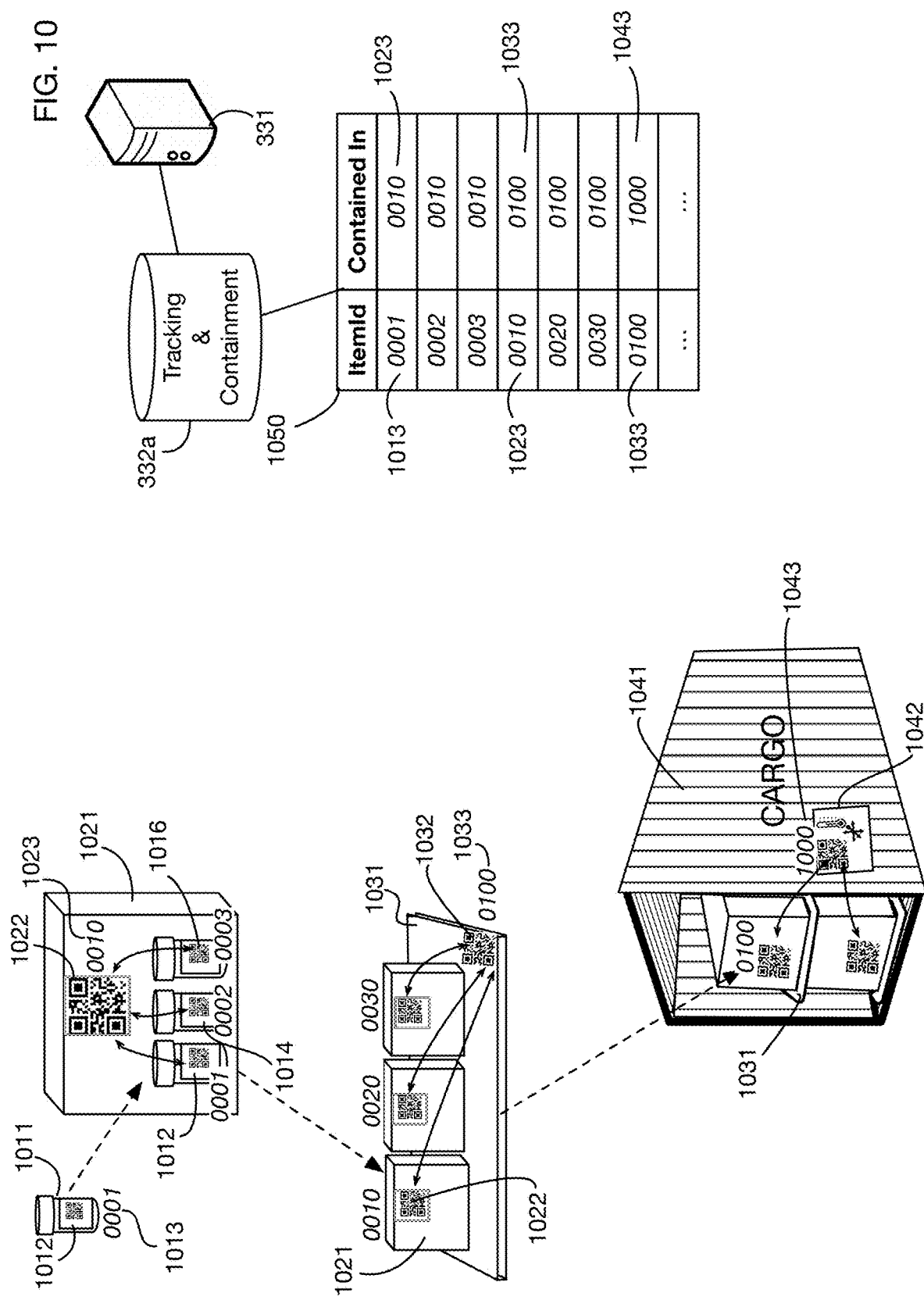
FIG. 10 shows an illustrative system that tracks hierarchical aggregation, with tracking labels placed on items and on packages that contain items; packages may be placed in higher-level packages or containers, and tracking may occur at each level of the hierarchy.

FIG. 10 shows an illustrative example of items and packages that are hierarchically aggregated and tracked using electronic tracking labels. An item 1011, which may represent a unit of sale, for example, is placed into a package 1021, possibly with other items. (In some cases, a package may contain only a single item.) Electronic tracking label 1012 is placed on item 1011, and similar electronic tracking labels 1014 and 1016 are placed on other items that are packed into package 1021. Package 1021 also has an electronic tracking label 1022. The electronic tracking labels on the items and package may have any of the features described above, including any set of sensors and communication interfaces. Item labels for items within a package may not all have the same features; for example, a package may contain some temperature-sensitive items, equipped with labels having thermometers, and some shock-sensitive items, equipped with labels having accelerometers. The package label 1022 may also have different features compared to the item labels, such as different sensors, different communications interfaces, different memory capacities, different power supplies or battery capacities for example.

Associated with each electronic tracking label is a unique identifier, as described above. For example, the unique identifier of label 1012 is identifier 1013 ("0001"), and the unique identifier of label 1022 (on the package 1021) is identifier 1023 ("0010"). The other item labels 1014 and 1016 have unique identifiers "0002" and "0003", respectively. In this (and subsequent) examples, label identifiers are shown as 4-digit codes for simplicity; in practice identifiers may be of any length and format. The label unique identifiers may be stored in the internal memory of the label circuitry, as described above. These identifiers may also be associated with or linked to visible, scannable icons (such as QR codes or barcodes) printed on the labels.

Package label 1022 may communicate with the labels 1012, 1014, and 1016 of the items contained in the package. For example, the item labels may transmit their status and sensor data to the package label, as described below. The package label may also configure the item labels, for example to set their data collection methods or schedules. Package labels and contained item labels may communicate over any desired communications interfaces.

In the example shown in FIG. 10, packages such as package 1021 are further aggregated into higher-level packages. Package 1021 is placed on pallet 1031, with two other packages. The pallet serves as a higher-level package. It may also have an electronic tracking label 1032, with unique identifier 1033. The pallet-level tracking label may communicate with the tracking label of each of the package labels on the pallet (and these package labels may in turn communicate with the labels of their contained items). In this situation the pallet 1031 is a package that contains items that are themselves packages. A package may be any type of item that may contain one or more other items, where the contained items may also be other packages. Containment may be any type of inclusion or association; for example, the pallet 1031 "contains" package 1021 even though the package is not "inside" the pallet but is rather on the pallet (and likely secured to the pallet with wrap or straps). Containment may represent any association between an aggregating device and its aggregated unit(s).

FIG. 10 also shows a third level of "packaging" where pallet 1031 is placed into a cargo container 1041, along with other items, including potentially other pallets or packages. Container 1041 has an electronic tracking label 1042, with unique identifier 1043; the container label 1042 communicates with electronic tracking labels of the packages, pallets, or other items in the container. Packaging and aggregation may continue to include any number of levels; for example, container 1041 may be placed onto a ship or truck, and the vessel or vehicle may be considered as a "package".

In the example shown in FIG. 10, each package label communicates with its directly contained labels. For example, pallet electronic label 1032 communicates with package electronic label 1022. In one or more embodiments, labels may also communicate directly with the indirect contents, rather than communicating strictly hierarchically. For example, pallet label 1032 may communicate directly with item labels 1012, 1014, and 1016 in package 1021, without necessarily passing through the package label 1022.

The containment relationship between packages and their contained items (which may in turn be other packages) may be represented in the tracking database(s) 332a maintained by or accessible to central server(s) 331. FIG. 10 shows an illustrative containment table 1050 that maps item label identifiers to the identifiers of the labels of their containing package. For example, the hierarchy of packaging in FIG. 10 is represented in table 1050 with item identifier 1013 contained in package identifier 1023, which is contained in package (pallet) identifier 1033, which is contained in package (container) identifier 1043. This table schema is illustrative; one or more embodiments may represent containment relationships using any type or types of database tables or other storage structures.

Figure 11:
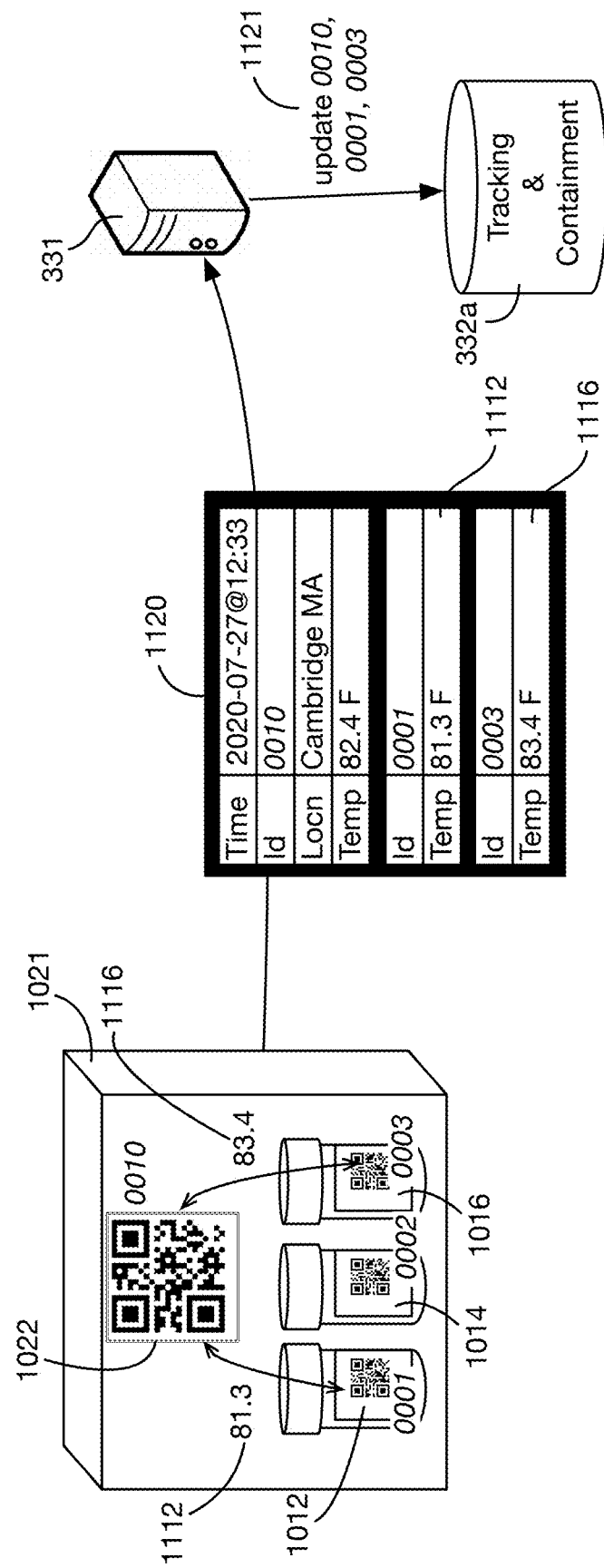
FIG. 11 shows illustrative communication between a package-level label and an item-level label; the package label collects data from the item labels for the items in the package and forwards this data to the server.

FIG. 11 shows an illustrative data collection cycle for the items in package 1021. In this scenario, package label 1022 connects via one of its communication interfaces to contained item labels 1012 and 1016. Sensor data collected by the item labels may be transmitted to the package label for storage or for forwarding to the server. For example, temperature reading 1112 from label 1012 and temperature reading 1116 from label 1016 are transmitted to label 1022. (This example assumes that the labels 1012 and 1016 include temperature sensors; in one or more embodiments any data from any sensors may be transmitted from item labels to package labels.) The package label 1022 may transmit message 1120 to server 331, with the updated data values 1112 and 1116 for the contained items; this message may also include data from sensors on the package label itself. The server may then perform updates 1121 to update the tracking histories of the package and item labels associated with message 1120. In some situations, the package label 1022 may store the data from the item labels and transmit message 1120 at a later time, for example when a connection to the server is available. Storing sensor data in the package label memory rather than in memory of the item labels may be more cost-effective, for example, since the item labels may be configured with less memory and may therefore be less expensive.

In some situations, the item labels may transmit data directly to the server, instead of via the package label. One or more embodiments may use a combination of methods, where some item labels or some types of messages are transmitted directly by the item labels, and other information is transmitted first from item labels to the package label, and then to the server. For example, alert messages may in some cases be transmitted directly from item labels to the server, instead of or in addition to being transmitted to the package label.

Figure 12:
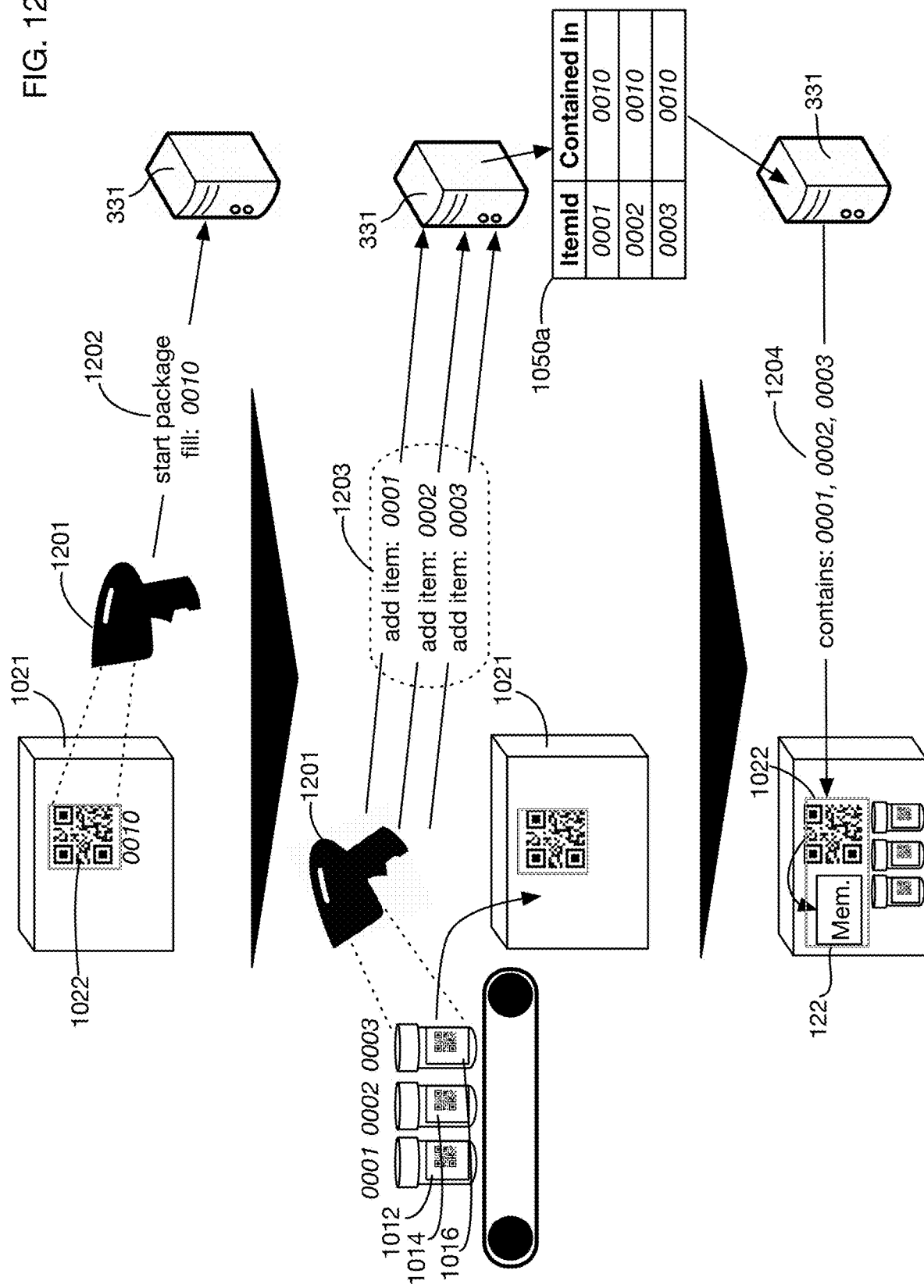
FIG. 12 shows an illustrative scenario of filling a package and scanning labels to determine the association between package labels and the contained item labels.

In one or more embodiments, the containment relationship table (or similar data structures) 1050 may be generated as items are placed into packages, using either manual or automated procedures (or a mix of both). FIG. 12 shows an illustrative method that may be used in one or more embodiments. The method is illustrated only for the first level of packaging (placing items into package 1021), but it can be extended to any number of levels of packaging. As a first step, electronic tracking label 1022 is placed on package 1021, and it is scanned with a scanner 1201. The scanner may be used by an operator, or it may be part of an automated filling line. The scanner may for example read a QR code or barcode on the label; these visual codes may be associated with the unique identifier of the electronic label. For example, the visual label codes may correspond to the unique identifier, or there may be an external data structure that maps the visual codes to the electronic label unique identifiers. The scanner or another system may transmit a message 1202 to server 331 (which may be local or remote) indicating the package with the retrieved identifier will be filled with items. Scanner 1201 (or another scanner) then reads the item labels 1012, 1014, and 1016 as they are placed into package 1021, resulting in messages 1203 to server 331. As these messages 1203 are received, server 331 constructs containment data 1050a. Another message may indicate that the package filling is complete, so the server will not associate subsequently scanned items with this package.

In one or more embodiments, the containment data 1050a for package label 1022 may be transmitted from the server to the package label in a package configuration message 1204. This data may be stored for example in memory 122 of the package label. Because the package label is configured with the information of the item labels the package contains, the package label may communicate with these item labels, as shown for example in FIG. 11. The server or package label may also transmit the package label identifier to the contained item labels, so that item labels can also initiate communication with their containing package label.

Figure 13:
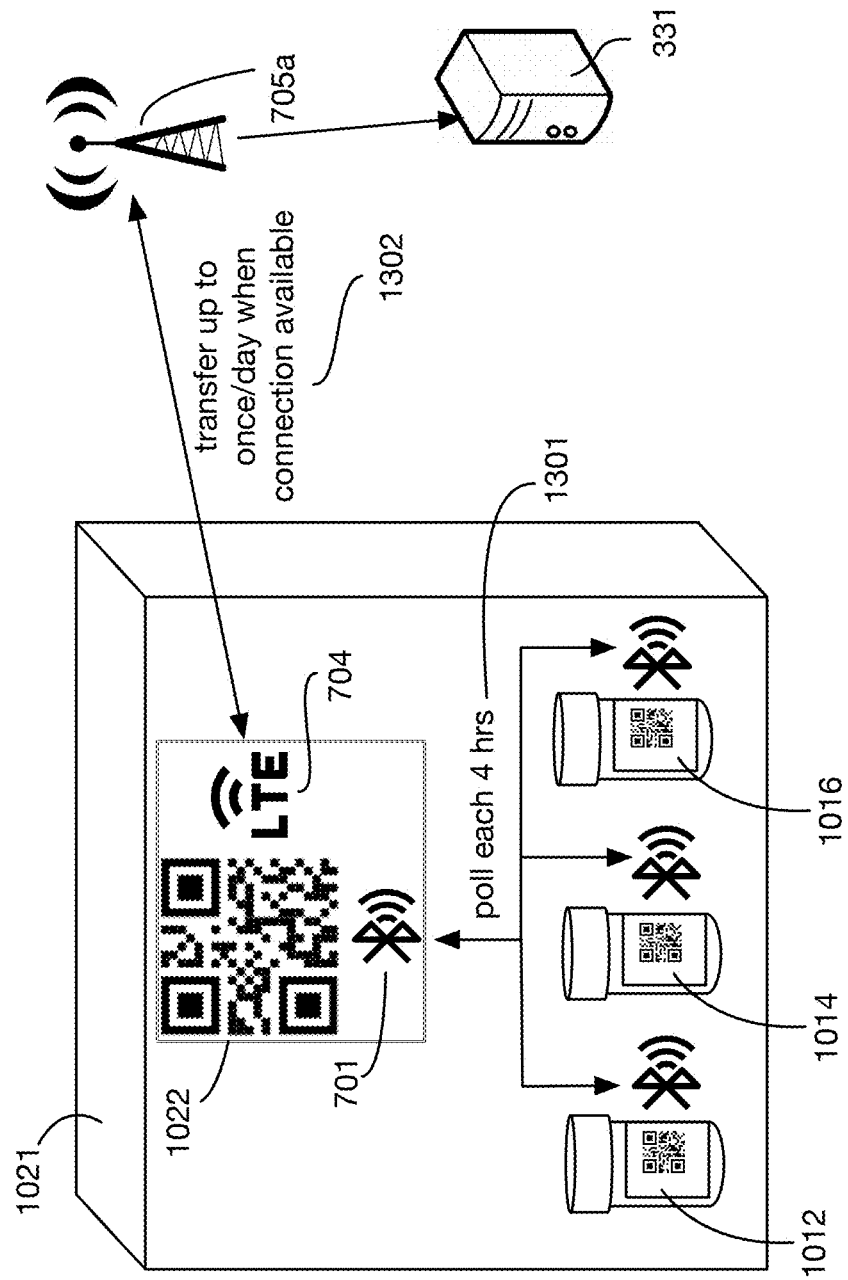
FIG. 13 shows an illustrative embodiment with a package label that has two communications interfaces: a short-range interface to communicate with the item labels in the package, and a long-range interface to communicate with the server.

In one or more embodiments of the invention, a package label may have additional capabilities beyond those of the item labels contained in the package. Placing these capabilities in only the package label may allow the item labels to be less expensive or smaller. Since packages may contain many items, the overall expense of the tracking system may be reduced by combining fully featured package labels with scaled-down item labels. FIG. 13 shows an illustrative embodiment where the ability to communicate over a long-range network with the server is placed only in the package label. In this embodiment, package label 1022 has two (or more) network interfaces: a short-range interface 701 (which may be Bluetooth, for example), and a longer-range interface 704 (which may be a cellular network interface, for example). A long-range interface may be expensive and may also consume much more power than a shorter-range interface; therefore, the expensive interface and a larger battery capacity (or power harvesting source) may be placed in the package label, which may then serve as the long-range gateway for the item labels.

In the embodiment of FIG. 13, the item labels 1012, 1014, and 1016 have only a short-range interface (Bluetooth, for example). An illustrative data collection protocol may be for the package label 1022 to send polling messages 1301 to each of the item labels at some interval (such as every 4 hours); these messages may be sent over the short-range communications interface. The package label may collect and store the data received from the item labels. At a longer interval (such as daily), and when a connection is available, the package label may then transmit the collected data 1302 over the long-range interface, for example to a cell tower 705a in range that then forwards the data to server 331.

Figure 14:
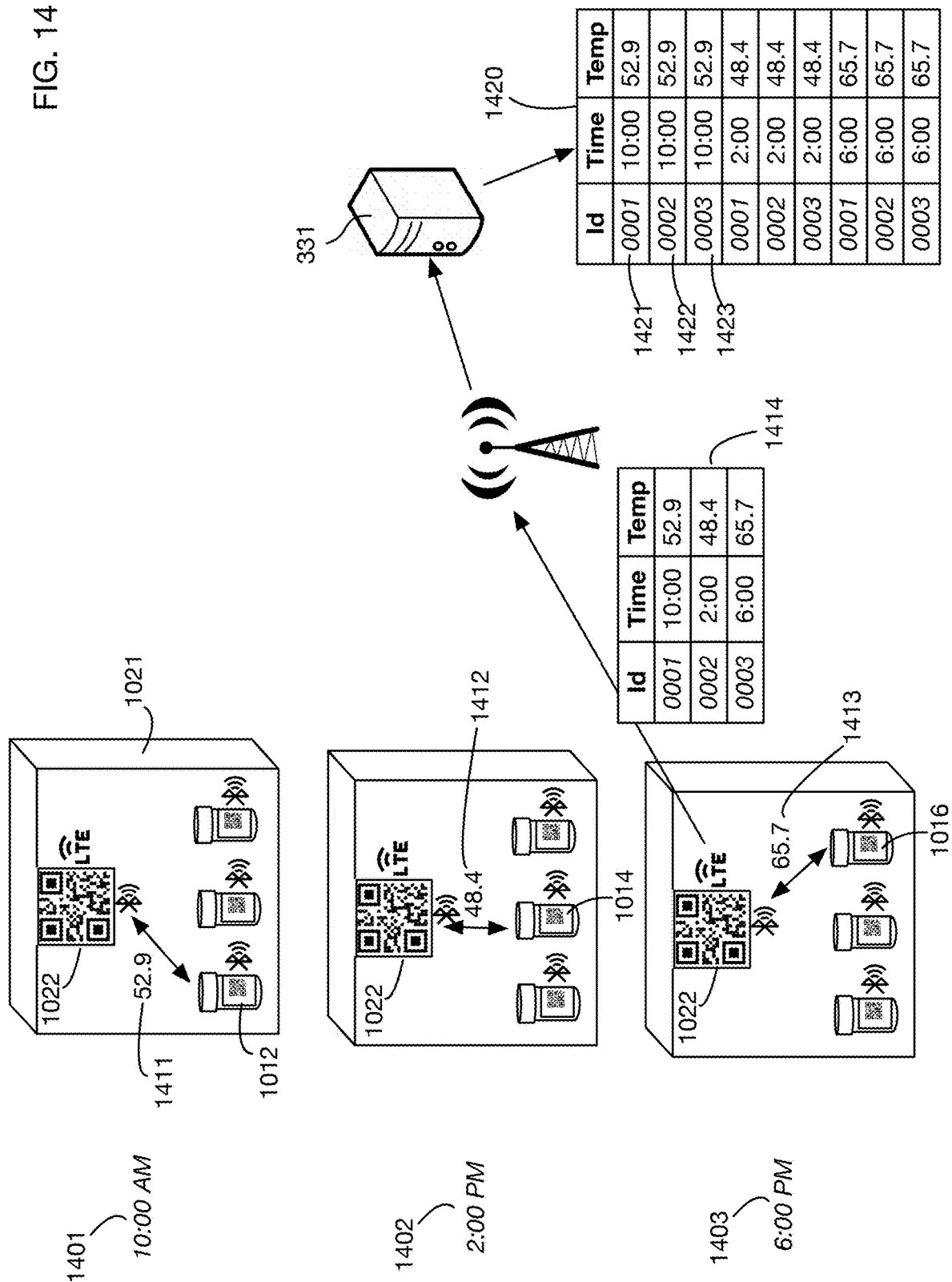
FIG. 14 shows an embodiment where a package label connects to different item labels at different times, for example to conserve the battery life of the item labels.

FIG. 14 illustrates a further optimization to the data collection protocol that may be used in one or more embodiments of the invention. Instead of polling each item label at each data collection phase, the package label may communicate with a proper subset of the item labels at any given time. For example, the item labels may be partitioned into subsets that are polled in a round-robin protocol. These subsets may in some cases contain only a single item label, so that only one item label is polled at each cycle. A potential benefit of this optimization is that battery life of the item labels and of the package label may be extended since fewer network connections are made in each data collection cycle. In the example shown in FIG. 14, the three item labels 1012, 1014, and 1016 contained in package 1021 are queried in a round-robin protocol, with each cycle querying only one of the item labels. At time 1401, package label 1022 connects to item label 1012 and retrieves data value 1411; at time 1402, package label 1022 connects to item label 1014 and retrieves data value 1412; and at time 1403, package label 1022 connects to item label 1016 and retrieves data value 1413. At time 1403, the data collected from each of the item labels is transferred in message 1414 to server 331. In this example, the server infers values for each item label at each time, by assuming that the environment around all item labels is similar at all times that they are all in the same package. Therefore, for example server 331 applies value 1411 to all item labels in package 1021 for the tracking data 1420 at time 1401, resulting in three table entries 1421, 1422, and 1423. This allows for a complete record of the state of each item label. If items are later separated so that they are no longer in the same package, the tracking data record for each item will still be complete. This method of filling in data for certain item labels based on assumptions about common environments may be extended in one or more embodiments with other approaches that sample the state of selected items in a package and derive expected values for other items. In one or more embodiments the value of sensor data from the package label itself may be applied to item tracking histories.

Figure 15:
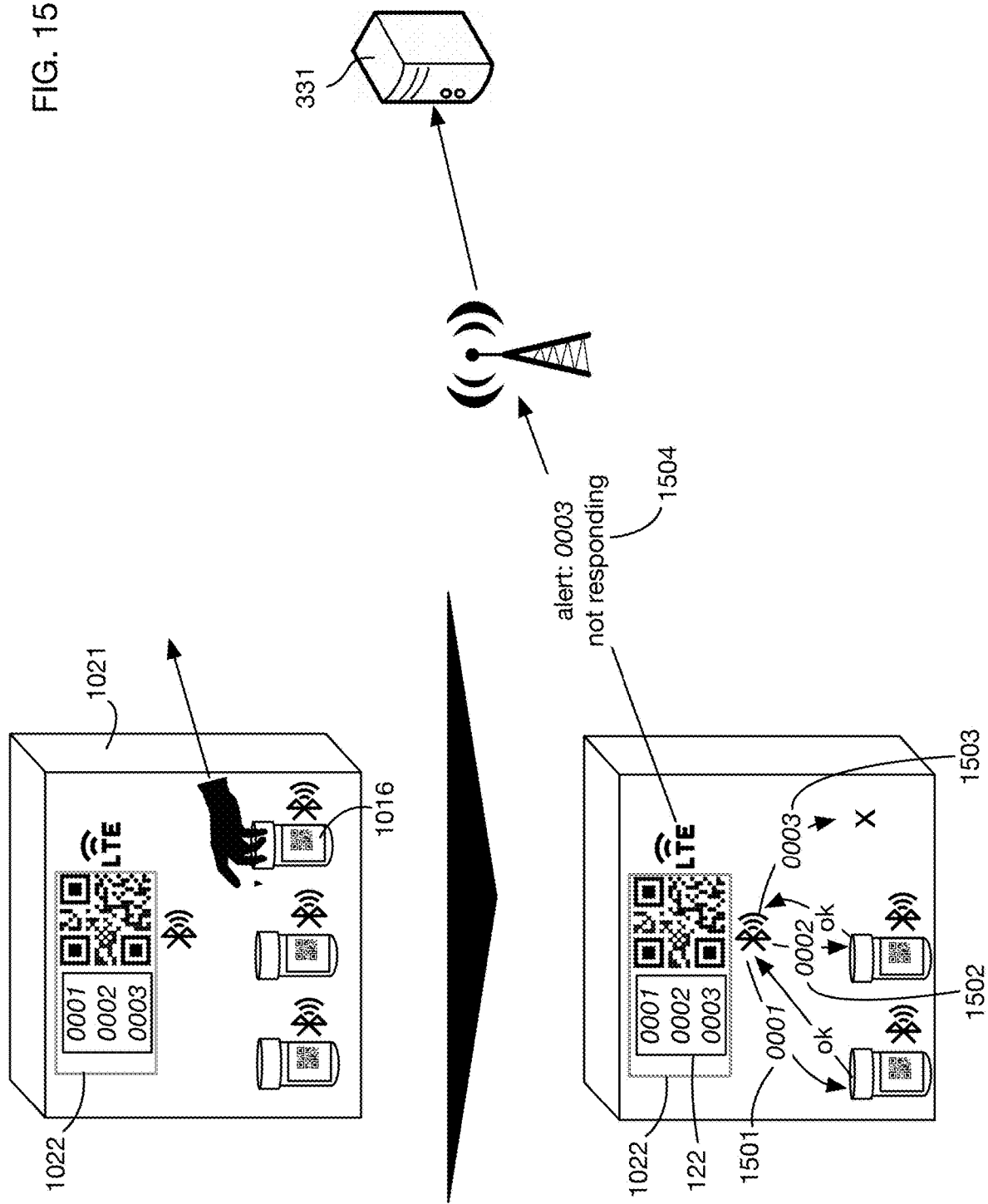
FIG. 15 shows an illustrative embodiment where a package label tries to connect to each item label that is expected to be inside the package; if one or more item labels do not respond, the package label sends an alert to the server.

In one or more embodiments, a package label may verify that the expected items are still in the package by attempting to connect to each item label. If an item label does not respond, then the item may have been removed from the package (or the item label may be defective or out of power). FIG. 15 shows an illustrative scenario where the item with label 1016 is taken from package 1021, possibly by a thief or because an error. Subsequently package label 1022 attempts to connect to the item labels with identifiers stored in memory 122, which are those item labels that are expected to be contained in the package. Connections 1501 and 1502 succeed, but connection attempt 1503 fails with no response from the item label. The package label therefore sends an alert message 1504 to server 331, which indicates that the non-responding item label may be missing or defective. If a connection to the server is not immediately available, the package label may store the information about the time that the missing item was discovered; this may help identify the source of the problem afterwards.

Figure 16:
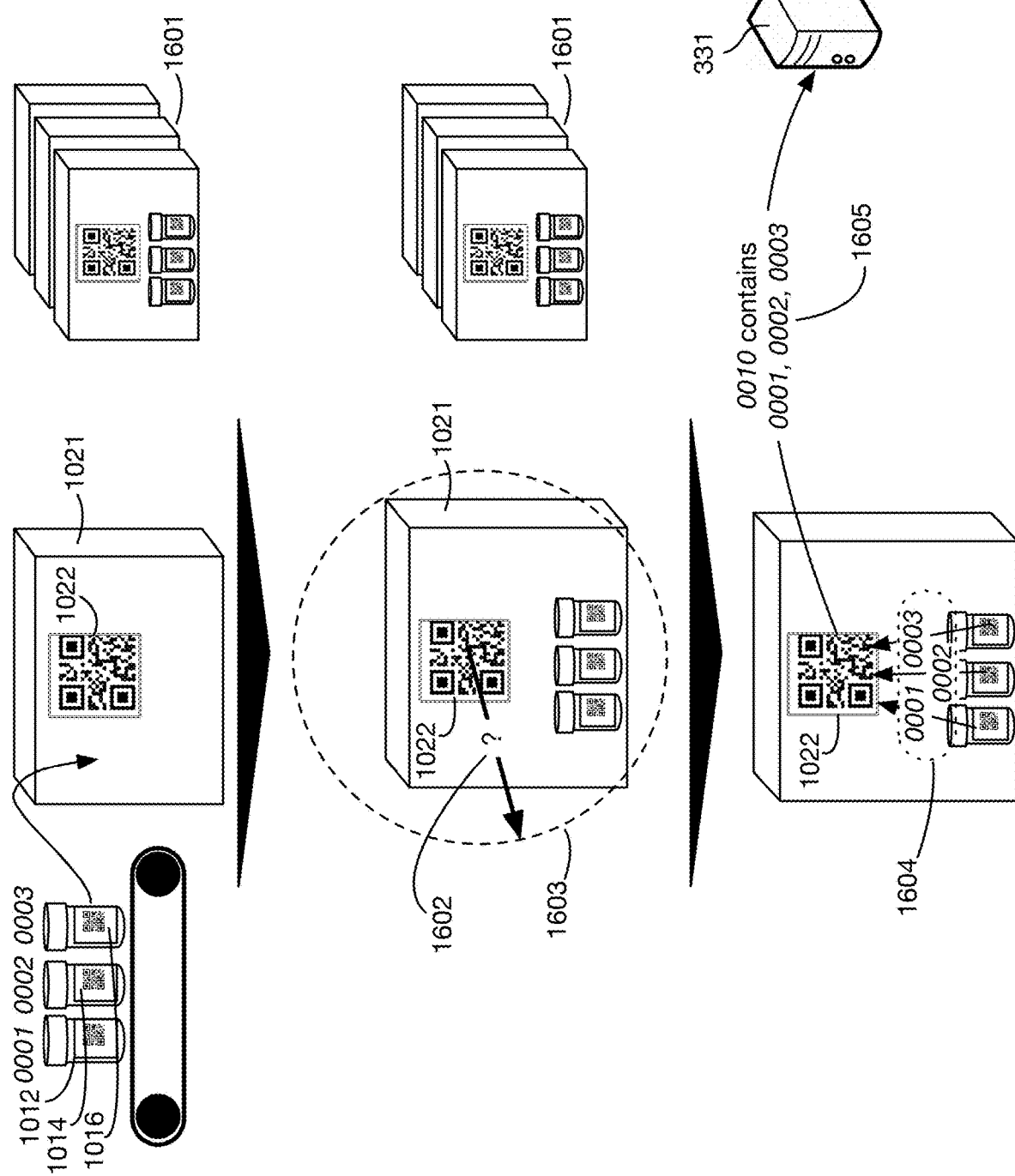
FIG. 16 shows an automated method that may be used in one or more embodiments to determine or confirm the item labels associated with each package label: the package label broadcasts a request with a short range that roughly matches the package size; items that respond to this request may be inside the package.
Figure 17:
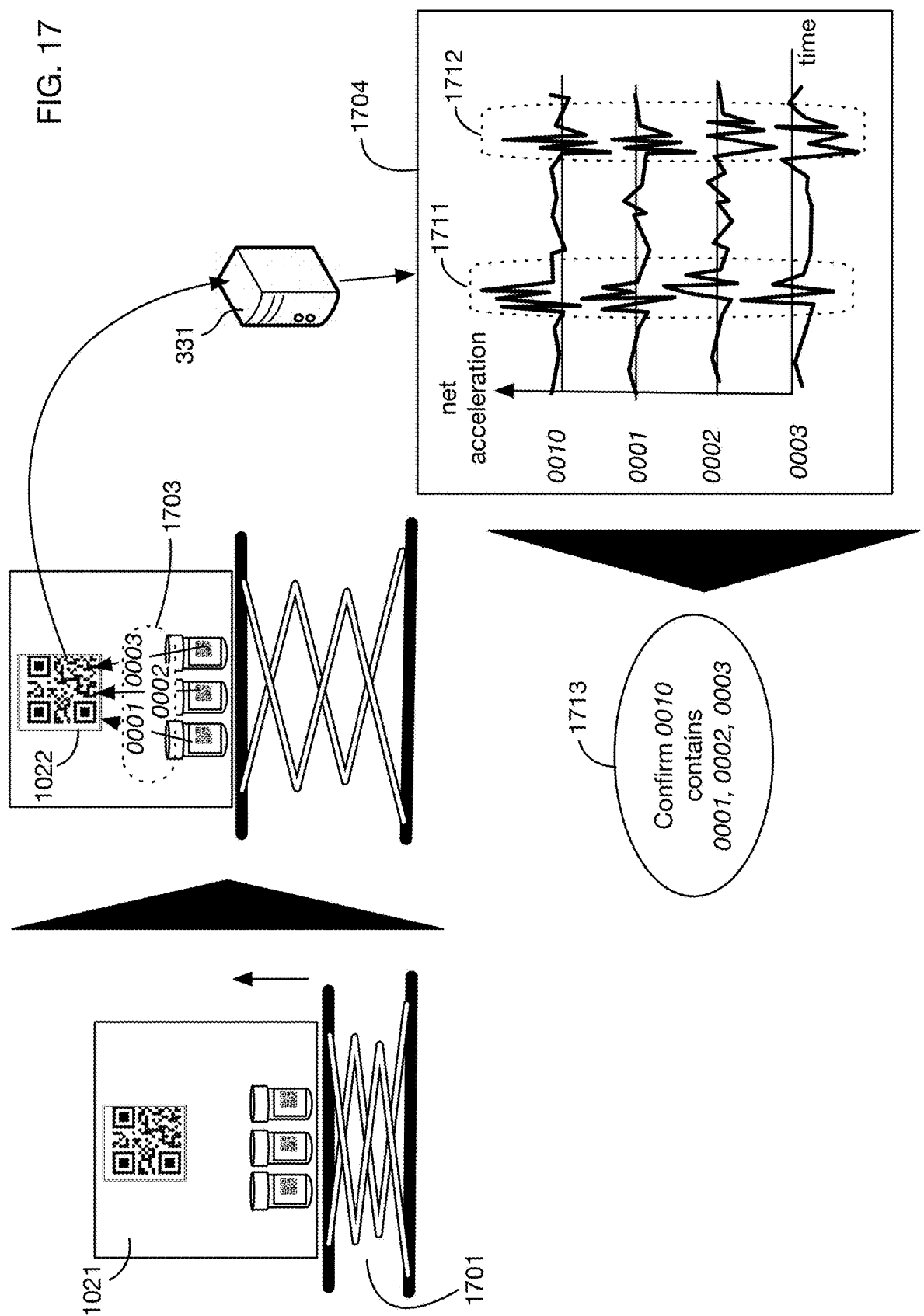
FIG. 17 shows a different automated method that may be used in one or more embodiments to determine or confirm the item labels associated with each package label: a physical change is performed on the package and its contents, and sensors in the package and item labels detect this change to confirm that the items are in the package.

Returning now to the issue of how to construct the containment relationship information that associates item labels with their containing package labels, FIG. 12 illustrates a method of constructing this data via scanning labels as packages are filled. FIGS. 16 and 17 illustrate methods that may be used in one or more embodiments to automatically construct or validate this containment data using communication between the labels or analysis of label sensor data; these methods may eliminate or reduce the need for scanning, and they may increase the accuracy of the containment data. FIG. 16 shows an illustrative method that identifies contained item labels by their proximity to the package label. Package 1021 is filled with items having labels 1012, 1014, and 1016. Other packages 1601 that may be filled with items (or may be in the process of being filled) may exist in the same facility, but they are separated from package 1021. Unlike in FIG. 12, item labels are not scanned as they are placed into package 1021. Instead, package label 1022 broadcasts a query message 1602 using a short-range communications interface (such as Bluetooth). In this example the range 1603 of this message is limited to the area approximately encompassing package 1021; it does not extend to the other packages 1601. The item labels contained in the package then respond to query 1602 with messages 1604; the responses include the identifiers of the package labels. The package label 1022 may then store these item label identifiers and/or transmit them in a message 1605 to server 331.

In one or more embodiments, the item label discovery method shown in FIG. 16 may also be combined with the scanning or similar technique of FIG. 12. Scanning may be used to identify the items added to the package, and then a short-range query may be used to validate that all of those items, and only those items, are in the package.

In one or more embodiments, the package label may estimate the distance between the package label and the responding item label based on the received signal strength. If an item label responds to the query, but the received signal strength is so low that the item appears to be outside the package, the package label may determine that this item is not in the package, or it may flag this item for further investigation. This check on signal strength may be useful for example if another package is inadvertently positioned near the package label, so that the query 1602 may reach some items that are not in package 1021.

FIG. 17 illustrates a method of discovering or confirming the item labels contained in a package that applies a physical change to the package that results in a measurable sensor data change in each item label in the package. In this example, package label 1022 is configured with the identifiers of the contained item labels, and a quality control step is used to confirm that this configuration is correct. Package 1021 is placed on a lift 1701 and the package is raised to a new height. The item labels and the package label contain accelerometers (or other motion sensors) that measure and record vertical acceleration (or other motion data) throughout the maneuver. After lifting is complete, the item labels transmit the acceleration data in messages 1703 to the package label 1022, which forwards the data to server 331 for analysis. The server analyzes the time sequences 1704 of acceleration (calculated as the accelerometer data less gravity) for each of the item labels and the package label. This data shows distinct peaks in acceleration 1711 occurring at the same time, which correspond to the beginning of lifting, and corresponding negative peaks 1712 at another time, which correspond to the end of lifting. These correlations imply that all of the items and the package are moving together, which leads the server to conclusion 1713 that the expected items are in the package. A similar analysis may be used to discover the items in the package, instead of or in addition to confirming a containment configuration.

The lifting action shown in FIG. 17 is an illustrative physical change that affects all of the items in the package approximately simultaneously. One or more embodiments may use any type of physical change for similar analyses. For example, if all item labels are equipped with light sensors, then the items in the package can be discovered or confirmed by changing the lighting conditions of the items. A specific light may be shined onto these items after filling, for example, or a lid of the package may be closed to block light from the item labels. Changes in temperature, orientation, position, or any other physical variable may be used to discover or confirm the items in a package.

In some situations, it may be beneficial to associate the unique identifier of a tracking label with another identifier associated with the item on which the tracking label is placed. This requirement may arise for example when an organization assigns identifiers to items from a different namespace than the unique identifier namespace of the tracking labels. By linking a tracking label identifier to an organization-assigned identifier, data from the tracking label can be attached to any other information which may be indexed by the organization-assigned identifier. Organization-assigned identifiers may include for example, without limitation, an SKU (stock-keeping unit) identifier, a GTIN (Global Trade Item Number), a GS1 code, a UPC code, an SSCC (Serial Shipping Container Code), a GIAI (Global Individual Asset Identifier), a GRAI (Global Returnable Asset Identifier), or any other code, number, string, or symbol, or combination thereof allocated or administered by any organization, including standards bodies and individual organizations.

Once a tracking label identifier is associated with an organization-assigned identifier, the organization (or another entity) may access any of the data associated with the tracking label (such as sensor data updates, location updates, and alerts) using the organization-assigned identifier as a lookup key.

One or more embodiments of the invention may therefore include an identifier association subsystem that captures an association between tracking label unique identifiers and organization-assigned identifiers. Such a subsystem may be used for example when tracking labels are stocked in advance of the assignment of organization identifiers. An organization may obtain an inventory of tracking labels that are already printed (with their embedded electronics); these tracking labels may for instance have a printed QR code that matches the unique identifier stored within the label's electronics. When an item is manufactured, received, inventoried, or prepared for shipment, it may be assigned an organization identifier, and a tracking label may be placed on the item. The identifier association subsystem may obtain the tracking label identifier and the organization-assigned identifier, and associate them in a database.

Figure 18:
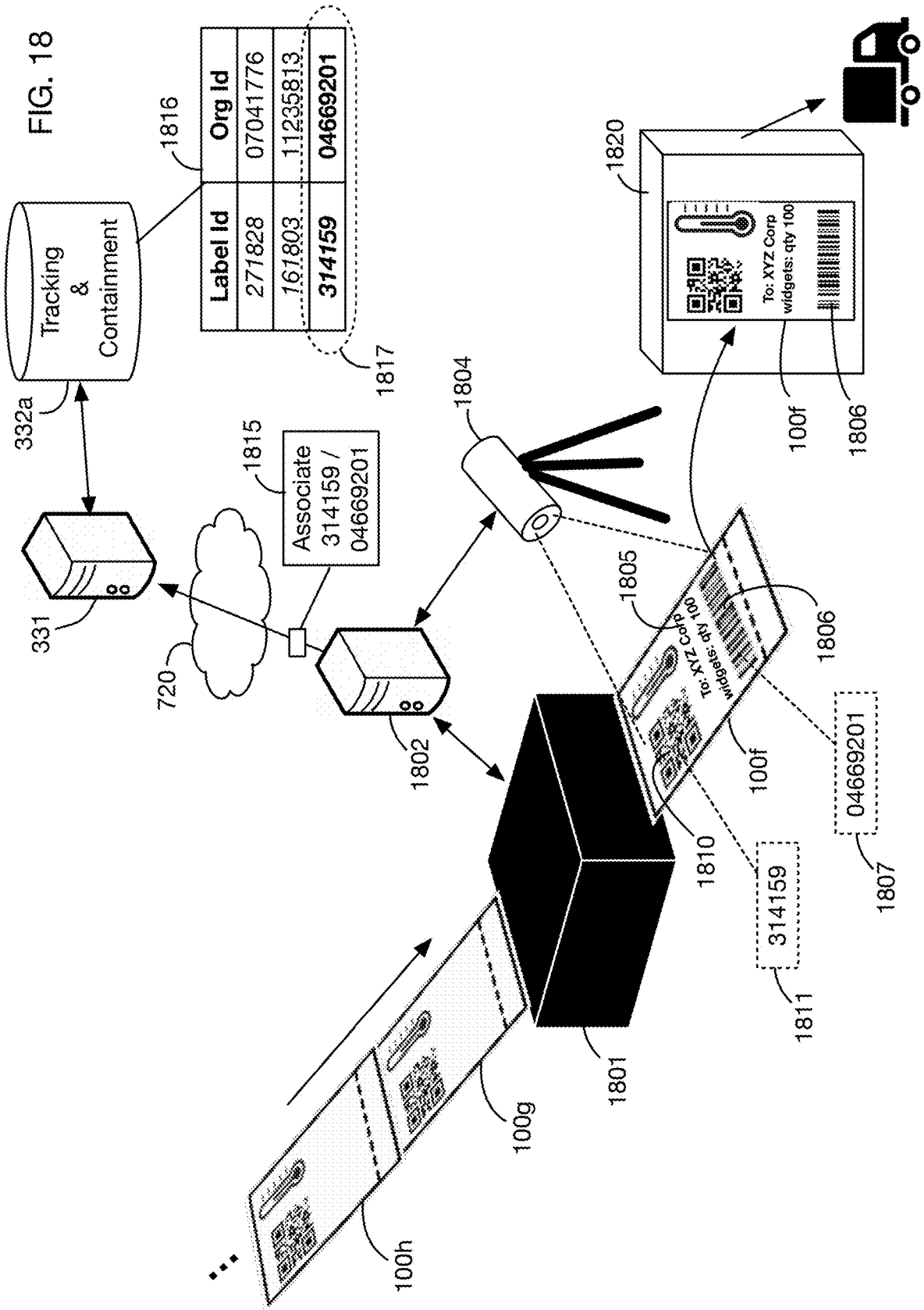
FIG. 18 shows an embodiment of the invention with a subsystem that associates a tracking label unique identifier with an organization-assigned identifier that is printed as a barcode onto the tracking label.

In one or more embodiments, the identifier association subsystem may be integrated with a printing system that prints organization-assigned identifier codes onto tracking labels. FIG. 18 shows an illustrative embodiment of the invention with an identifier association subsystem that includes a printer 1801, a camera or scanner 1804, and an organization processor 1802. In the scenario shown in FIG. 18, a manufacturing or distribution organization has a stock of tracking labels, including labels 100f, 100g, and 100h. Each tracking label has a QR code on the label that encodes the tracking label unique identifier; for example, QR code 1810 on tracking label 100f encodes tracking label identifier 1811. This identifier 1811 matches the stored identifier in the tracking label's electronics. As part of a production process, the organization fills packages with items and places tracking labels on the packages prior to shipment. FIG. 18 shows an illustrative scenario of preparing tracking label 100f for package 1820. Processor 1802 obtains or generates an organization-assigned identifier 1807 for the package 1820. Tracking label 100f is input into printer 1801 that communicates with the organization processor 1802. The processor 1802 transmits commands to the printer 1801 to print a barcode 1806 for the organization-assigned identifier 1807 onto the tracking label 100f. The printer 1801 may also print other information 1805 on the tracking label 100f as needed. After printing, camera 1804 (which may be a barcode/QR code scanner or a general-purpose camera) captures an image of the printed tracking label 100f and transmits this image to processor 1802 (or another processor) for analysis. The processor decodes the QR code 1810 and the barcode 1806 to obtain the tracking label identifier 1811 and the organization-assigned identifier 1807, and it sends a message 1815 with these two identifiers over network 720 to central server 331. Server 331 stores the association between these two identifiers in an identifier association table 1816 in database 332a, in a new row 1817. Lookups of this table 1816 can subsequently obtain the tracking label identifier associated with any organization-assigned identifier (or vice-versa). The association table 1816 may be joined for example with tracking label data tables such as the location data in table 401 and sensor data in table 402, so that data on any item can be tracked by the item's organization-assigned identifier. Subsequent scans of barcode 1806 may not be needed because the tracking label identifier is transmitted automatically along with the tracking label data, and the package's organization-assigned identifier can be obtained from association table 1816. However, because barcode 1806 is printed on tracking label 100f, the organization-assigned identifier 1807 may be obtained directly via a barcode scan if desired or by a user who cannot access database 332a.

The process shown in FIG. 18 is illustrative; one or more embodiments of the invention may modify this process in various ways to obtain association data 1815. For example, scanning of label 100f by camera 1804 may occur after the label is placed on package 1820, rather than immediately after printing. In another embodiment, the printer itself may scan the QR code of a label as it enters the printer and transmit this data to processor 1802, so the processor can determine the association with the organization-assigned identifier.

In one or more embodiments of the invention, tracking labels may have wireless communication interfaces that support location tracking both over short ranges, such as inside a warehouse, and over long ranges, such as regionally or globally. Tracking labels may receive location or navigation signals over any of these communication interfaces and may analyze these signals to determine their location. These location/navigation signals may be specifically configured for this purpose (such as GPS signals), or they may be normal communication signals that can be analyzed to helpe determine the location of the tracking label. These signals may be received from any other long-range or short-range devices or transmitters, such as for example, without limitation, satellites, cellular towers, hubs, routers, or gateways that communicate over Bluetooth or Wi-Fi, and beacons. Some of these signals may for example indicate the identity and location of the transmitting device. The tracking label may calculate its position by analyzing the received signals in any desired manner. For example, this analysis may use the time-of-flight of a signal since it was sent, the received strength of the signal, or the direction of the received signal; the analysis may triangulate using multiple signals received from several devices or from the same device at different times.

Figure 19:
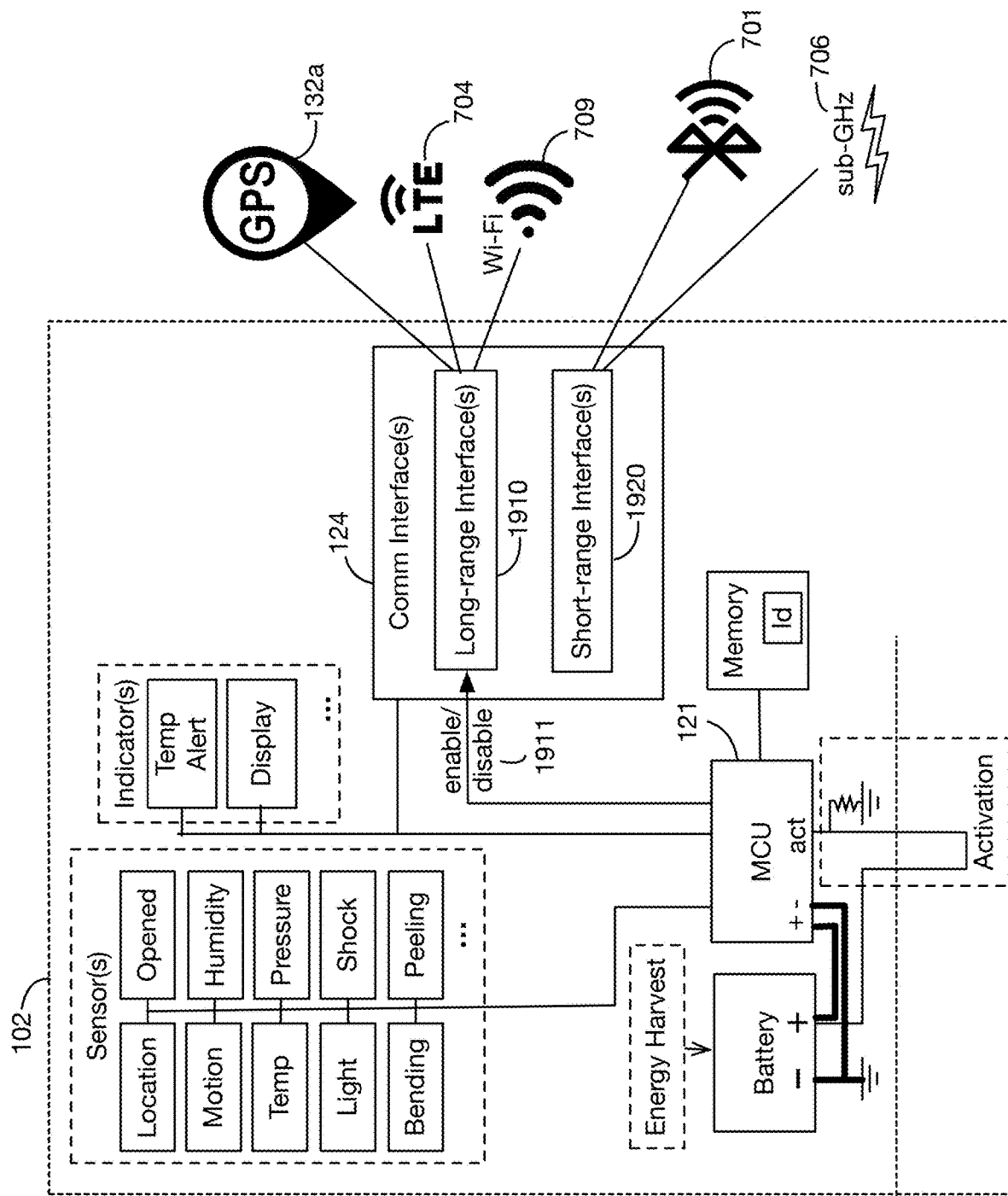
FIG. 19 shows a block diagram of an illustrative tracking label that has both a short-range communication interface, for tracking in a local area such as a warehouse, and a long-range communication interface, for tracking regionally or globally.

FIG. 19 shows an illustrative tracking label 102 with one or more long-range communication interfaces 1910, and one or more short-range communication interfaces 1920. Long range interfaces may include for example, without limitation, any or all of a GPS interface 132a (or a similar satellite communication interface), a cellular interface 704, and a Wi-Fi interface 709. Short-range interfaces may include for example, without limitation, any or all of a Bluetooth interface 701 and sub-Gigahertz interface 706, which may be for example a LoRaWAN interface. These long-range and short-range communication interfaces are illustrative; one or more embodiments may use any types of wireless communications technologies and protocols for either short-range or long-range localization (or for both). A Wi-Fi interface may be used in one or more embodiments as either a long-range or a short-range communication interface.

In one or more embodiments, the location of a tracking label may be determined by the tracking label's controller 121 using signals received by the label, or by a device or devices with which the tracking label communicates using signals received from the label. For example, for long-range tracking a tracking label may have a GPS receiver and it may calculate its global location by analyzing the received GPS signals; for short-range tracking, the tracking label may broadcast a message over Bluetooth and a collection of Bluetooth receivers may receive and analyze this message to determine the label's location in a local area. Any combination of analysis of signals received by the tracking label and analysis of signals transmitted by the tracking label may be used in one or more embodiments to determine the location of the tracking label.

Figure 20:
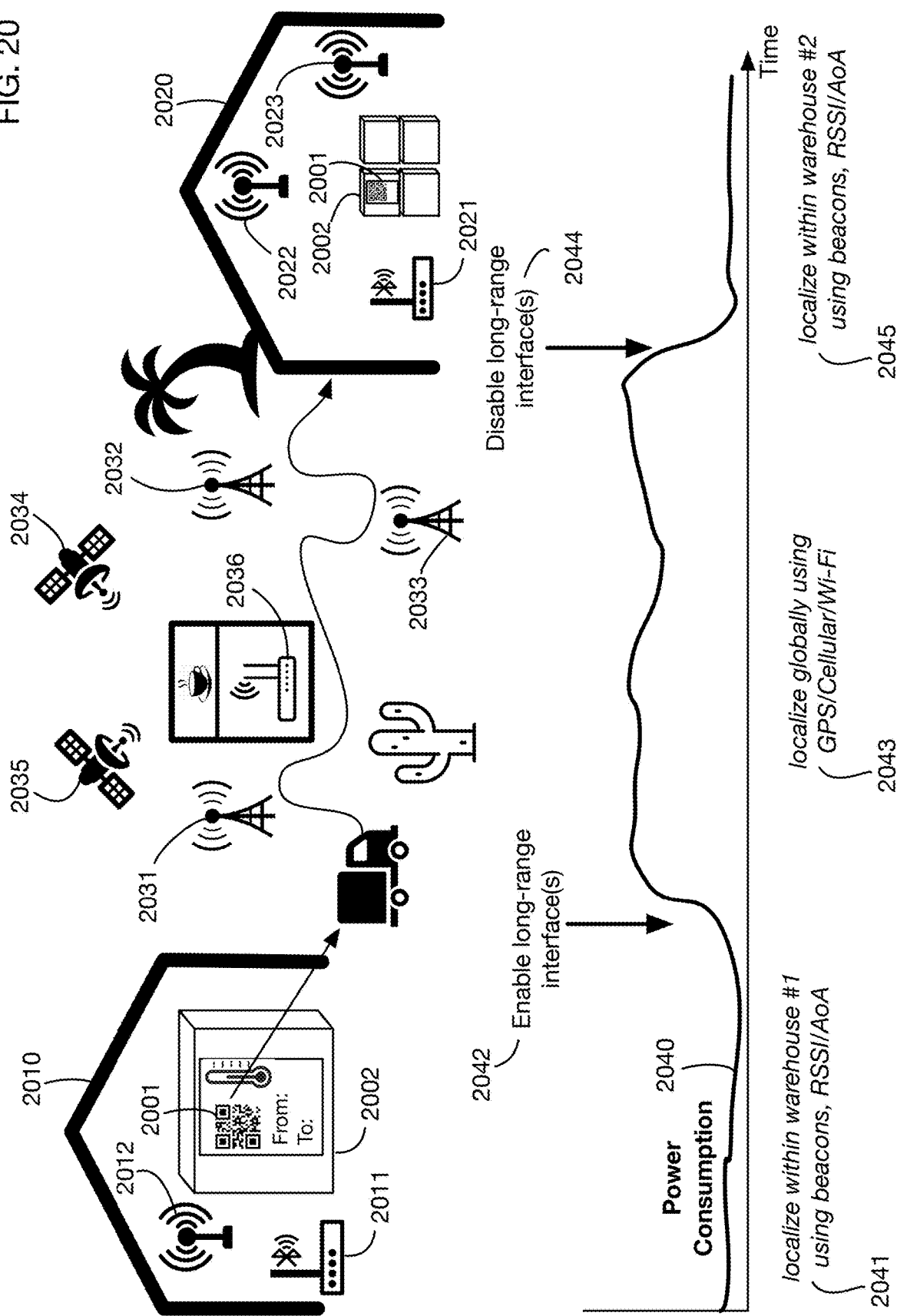
FIG. 20 shows an illustrative scenario for the movement of a tracking label between warehouses, where the long-range communication interfaces are disabled while the tracked item is within the warehouses to reduce power consumption.

Long-range communication interfaces 1910 often consume significant power. Since tracking labels may be power-limited, using for example small batteries or energy harvesting systems, optimizing usage of these long-range interfaces may be important in many applications. Therefore, in one or more embodiments the controller 121 may transmit commands 1911 to enable or disable the long-range communication interfaces 1910 (or one or more of these interfaces) depending on the environment of the tracking label. In particular, when a tracking label is within range of a short-range device that communicates with the label over a short-range communication interface, the tracking label may disable one or more of the long-range interfaces 1910 partially or entirely to conserve power, and may switch location calculations to use only the short-range communication interfaces. This approach is illustrated in FIG. 20 for an illustrative tracking label 2001 on a package 2002. The power consumption 2040 of the label 2001 is shown over time as the label moves between warehouses 2010 and 2020. The label 2001 is initially within a first warehouse 2010, where it is within range of short-range devices such as a Bluetooth gateway 2011 and Bluetooth beacon 2012. Within warehouse 2010, the long-range communication interfaces of the label are disabled to conserve power. The position of the label within the warehouse can be determined using short-range signals from devices 2011 and 2012, for example. For example, the label's controller may use any or all of the RSSI (received signal strength indicator), the AoA (angle of arrival), and the TOF (time of flight) of signals from these devices to triangulate its position. When the package 2002 with label 2001 leaves warehouse 2010, it is no longer within range of these devices. The tracking label 2001 detects that it is no longer in communication with the short-range devices, and it executes step 2042 to enable the long-range communication interfaces. Position tracking of the label then switches to approach 2043 that uses signals received from long-range transmitters such as satellites 2034 and 2035, cellular towers 2031, 2032, and 2033, and possibly from Wi-Fi gateways such as 2036. Power consumption 2040 increases significantly during this time period because the long-range communication interfaces require more power. When tracking label 2001 comes within range of short-range devices in warehouse 2020, such as Bluetooth gateway 2021 and beacons 2022 and 2023, the tracking label performs step 2044 to disable the long-range communication interfaces and it switches its localization approach to 2045, to again use short-range signals to determine the label's position within the second warehouse. Although FIG. 20 illustrates short-range communication within warehouses, any type of localized facility or area may have short-range communication devices, and a tracking label may switch to use short-range tracking within that facility or area when it is within range. These localized areas may include for example, without limitation, warehouses, factories, stores, distribution centers, depots, transit centers, terminals, airports, or more generally any facility or area where items with tracking labels may pass into, out of, or through.

Figure 21:
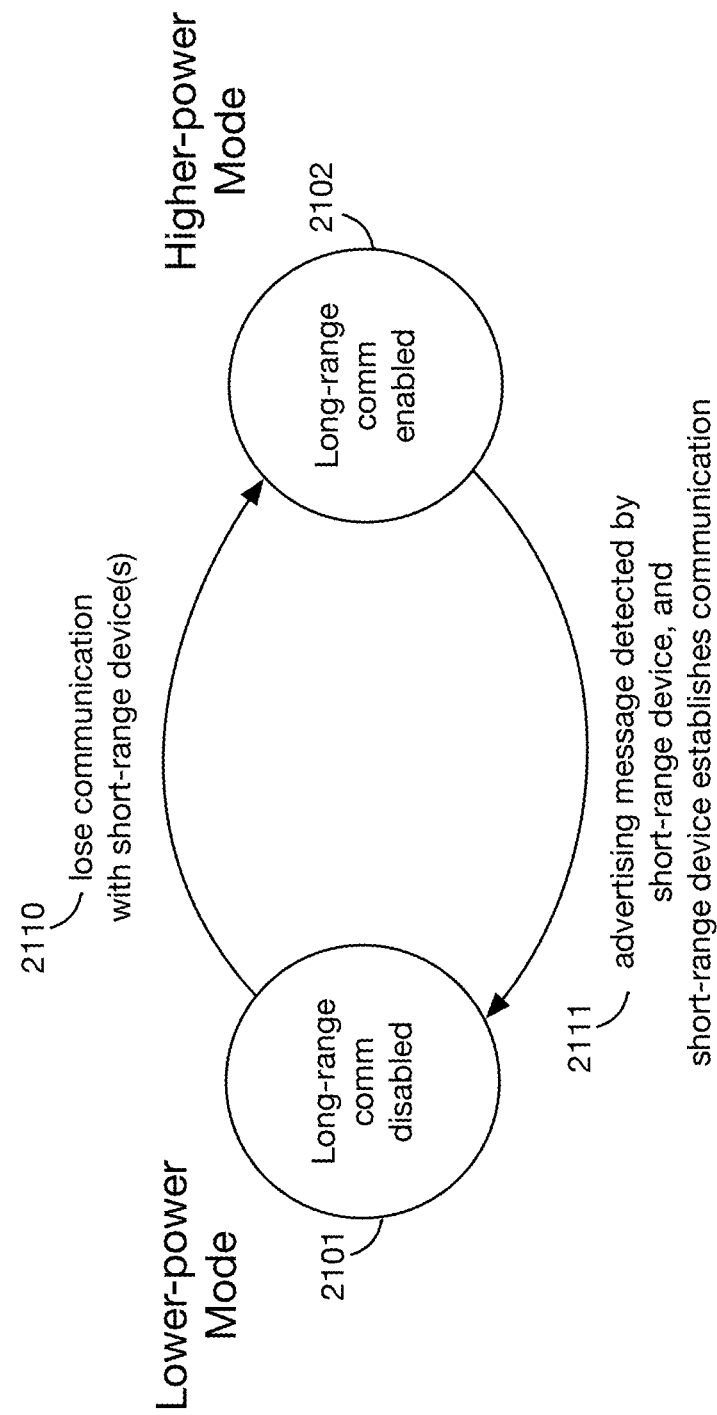
FIG. 21 shows a state transition diagram for a tracking label that enables and disables its long-range communication interfaces based on whether a short-range device is within range.

FIG. 21 shows an illustrative state transition diagram for the tracking label 2001 as it moves from locations with short-range communication available (such as inside warehouses) to locations with only long-range communication available (such as outdoors in transit between warehouses). In state 2101, one or more long-range communication interfaces are disabled (either partially or entirely) so that the label operates in a lower-power mode. When the label determines that event 2110 has occurred where it has lost communication with one or more short-range devices, the state transitions to state 2102 and one or more long-range communication interfaces are enabled. This state 2102 is a higher-power mode. The label continues in state 2102 until event 2111 occurs where for example an advertising message broadcast by the tracking label over a short-range interface is received by a short-range device, and the short-range device establishes communication with the tracking label. A tracking label may transition many times between states 2101 and 2102 as it moves within and out of range of short-range communication devices in various locations.

Figure 22:
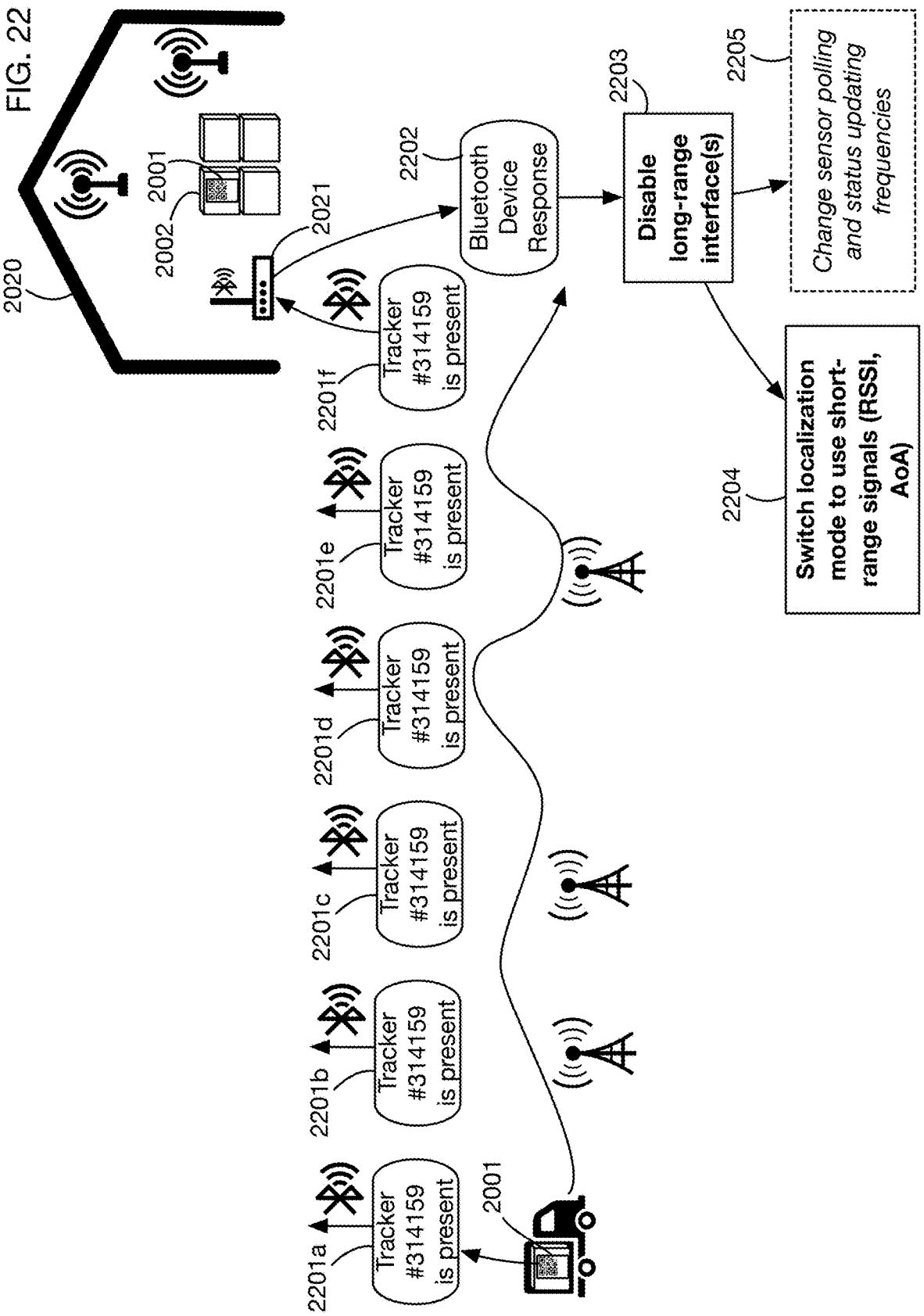
FIG. 22 illustrates a technique that may be used to determine when to disable a long-range communication interface: the tracking label periodically broadcasts an advertising message on a short-term interface, and when it obtains a response, it disables its long-range communication interfaces.
Figure 23:
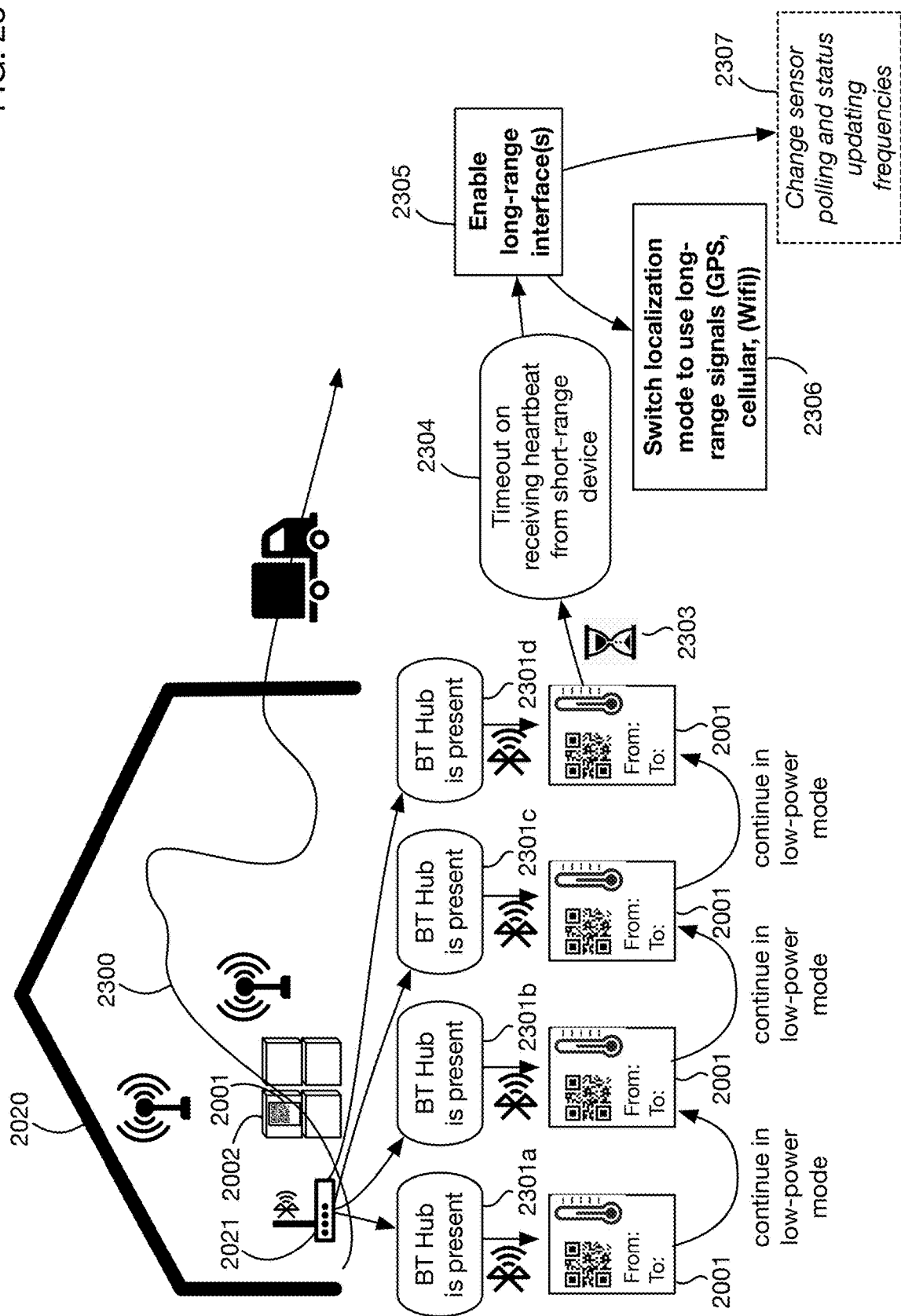
FIG. 23 illustrates a technique that may be used to determine when to re-enable a long-range communication interface: a short-range device (such as a Bluetooth hub) that connects to a tracking label in a local area may broadcast a heartbeat message; when the tracking label loses reception of this heartbeat message, it re-enables its long-range communication interfaces.

FIGS. 22 and 23 show illustrative scenarios for messages that may be transmitted and received to generate the state transitions 2111 and 2110, respectively, between higher-power and lower-power modes of the tracking label. These messages are illustrative; one or more embodiments may use different types of message exchanges to effect the desired state transitions. In FIG. 22, tracking label 2001 is configured to periodically broadcast an advertising message over one of its short-range interfaces, in this example over Bluetooth. The short-range interface is active even when the tracking label is out of range of a short-range device (such as when the package is outside in transit between warehouses). Messages 2201a through 2201e are broadcast while the tracking label is out of range, so there is no response to these messages. When the tracking label enters or approaches warehouse 2020, advertising message 2201f is received by Bluetooth gateway 2021, which responds with a message 2202 to establish communication with the tracking label. When the tracking label receives response 2202, it takes step 2203 to disable one or more of the long-range communication interfaces, and step 2204 to switch the localization method to use short-range signals from devices such as the Bluetooth gateway 2021 or other devices such as beacons in the warehouse. In one or more embodiments, the tracking label may perform additional steps 2205, for example to change the frequency at which sensors on the label or polled, or the frequency at which update messages are transmitted to the server.

In one or more embodiments the approach illustrated in FIG. 22 may be reversed in that the Bluetooth gateway 2021 may broadcast advertising messages, and the tracking label 2001 may respond when it receives an advertising message from the gateway. The steps 2203, 2204, and 2205 may then proceed when the tracking label has established communication with the gateway. Any method of determining when a tracking label is within range of short-range communication devices may be used in one or more embodiments of the invention.

FIG. 23 illustrates tracking label 2001 on package 2002 moving through and out of warehouse 2020. In this illustrative scenario, once communication is established between label 2001 and Bluetooth gateway 2021, the gateway transmits a heartbeat message periodically to the tracking label. Messages 2301a through 2301d are received by label 2001 while it is still within range of gateway 2021. Each time the heartbeat message is received, the tracking label continues in its lower-power state, with the long-range communication interfaces disabled. The tracking label expects to receive a heartbeat message at some regular interval, and it sets a timer 2303 based on this expected interval. If a timeout event 2304 occurs without receipt of a heartbeat message, the tracking label may determine that it has moved out of range of the short-range device 2021, and it may therefore take step 2305 to re-enable the disabled long-range communication interfaces, and step 2306 to switch the localization method to use long-range signals such as GPS or cellular. In one or more embodiments the tracking label may perform additional steps 2307, for example to change the frequency at which sensors on the label or polled, or the frequency at which update messages are transmitted to the server.

In one or more embodiments of the invention, detection of the loss of communication between the tracking label and the short-range device 2021 may be performed by the device 2021 rather than by the tracking label; for example, the device 2021 may fail to receive an advertising message from the tracking label after a timeout period. The device 2021 may then cause a message to be sent to the tracking label telling it to perform steps 2305 and 2306. This message cannot be sent over the short-range communication interface, since the tracking label is no longer within range on that interface. However, there may be other active communication channels, such as a cellular interface operating in a lower-power mode, that may be used to transmit this message.

Figure 24:
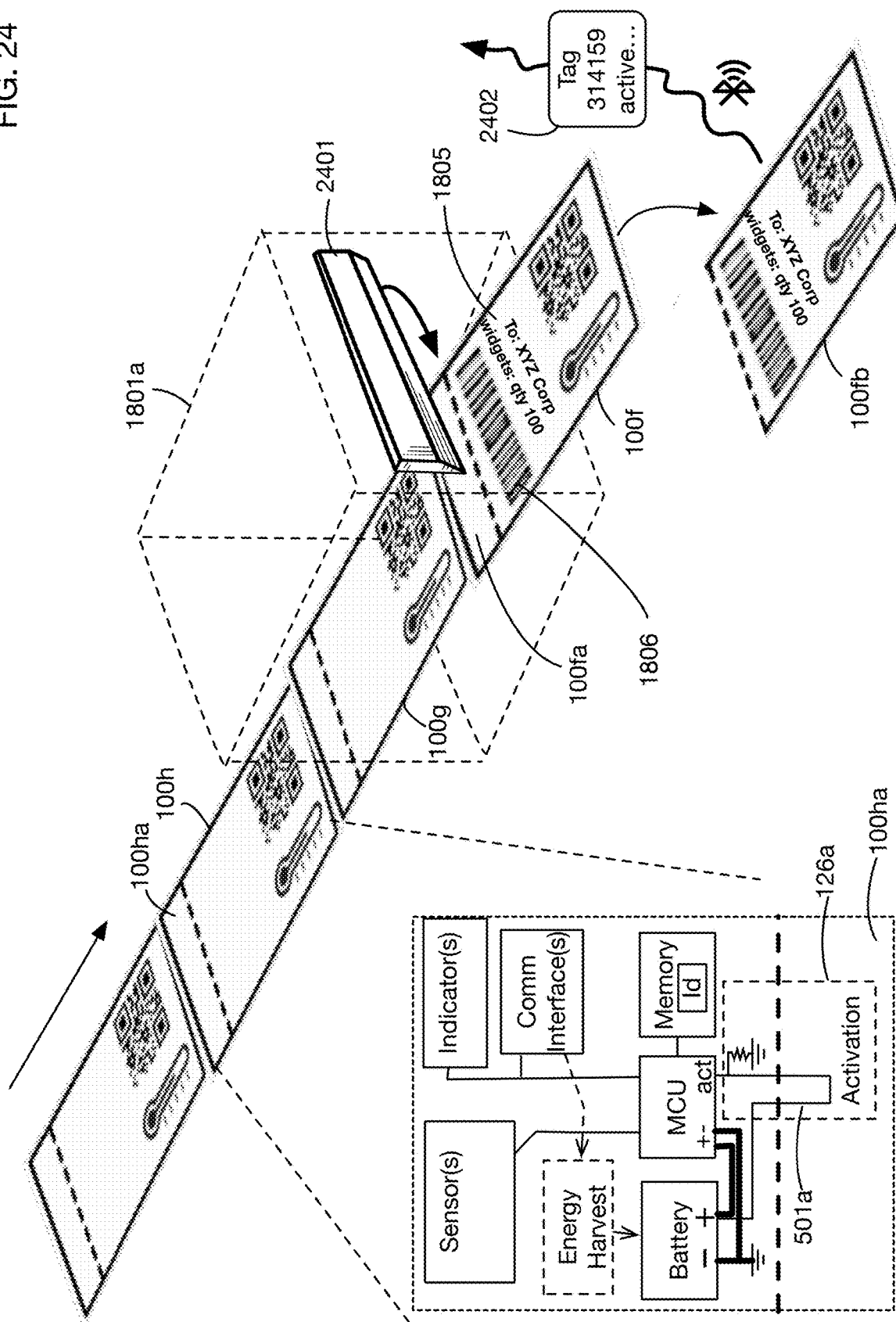
FIG. 24 illustrates an embodiment of a tracking label activation method that activates a label using a printer that cuts off a portion of the label to break an electrical path, thereby activating the tracking label's electronics.

As described with respect to FIG. 5 for illustrative tracking label 126a, one or more embodiments of the invention may include a tracking label with a portion 113 that may be cut off to activate the label. Removing this portion 113 may break an electrical path that is coupled to activation input 127, which modifies the activation input and switches the label's electronics from a hibernation state to an active state. In one or more embodiments the removable label portion 113 may be removed manually; however, in one or more embodiments removal of the portion 113 to activate the label may be incorporated into the process for label printing. By combining label printing and label activation, the process of preparing tracking labels is more automated and robust. FIG. 24 shows an illustrative tracking label printing process that is a variation of the process shown in FIG. 18; this process in FIG. 24 uses a printer with a label cutter to incorporate label activation into the printing process.

FIG. 24 shows a sequence of tracking labels fed into a printer 1801a. When input into the printer the labels may not yet be activated. Any number of labels may be input into the printer, including a single label or a stack or roll of many labels. Labels may contiguous or they may be separated by gaps, for example on a continuous roll with a small space between successive labels. Each tracking label, such as illustrative label 100h, may have a removable portion 100ha that contains part of an electrical circuit that may be broken to activate the label. For example, an electrical path 501a between a reference voltage (such as the high signal from a battery or other power supply or voltage source) and the activation input of the label may be routed through the removable portion 100ha of the label; when this path is broken by removal of the portion 100ha, the signal into the activation input may be pulled down to ground for example through a pulldown resistor. This specific circuit design is illustrative; one or more embodiments of the invention may use any type of activation mechanism that is activated when a portion of the label is removed. The portion of the label that is to be removed for activation may be in any location on the label relative to the electronic circuits and relative to the space for printed text or symbols.

Printer 1801a may have a label cutter 2401 integrated into, attached to, or coupled to the printer. The cutter (or cutters) may be of any size or shape and may be activated in any manner. As tracking labels move through the printer, the printer may print information on the surface of the label and then cut off the removable portion of the label to activate it before ejecting the label. For example, the printer prints information such as address 1805 and barcode 1806 on label 100f, and then uses cutter 2401 to cut off removable portion 100fa of the label. The remaining portion 100fb is output from the printer; this portion contains activated electronics that were activated when the printer cut off removable portion 100fa. The tracking label 100fb may for example begin sending messages such as announcement 2402 over a wireless interface such as Bluetooth once the label is activated. No manual steps may be necessary to activate the label because the printer performs activation during the process of printing the label.

In one or more embodiments of the invention, a printer with a cutter such as printer 1801a may be integrated into a process such as the process shown in FIG. 18, where tracking label information is stored in a server as labels are printed (and activated). A camera such as camera 1804 may be used to read label information; in one or more embodiments some or all of the label information may be obtained instead or in addition from messages 2402 transmitted from the label once it is activated. After labels are printed and activated, they may be placed on items for tracking and tracking data may be collected and managed as described above.

Figure 25:
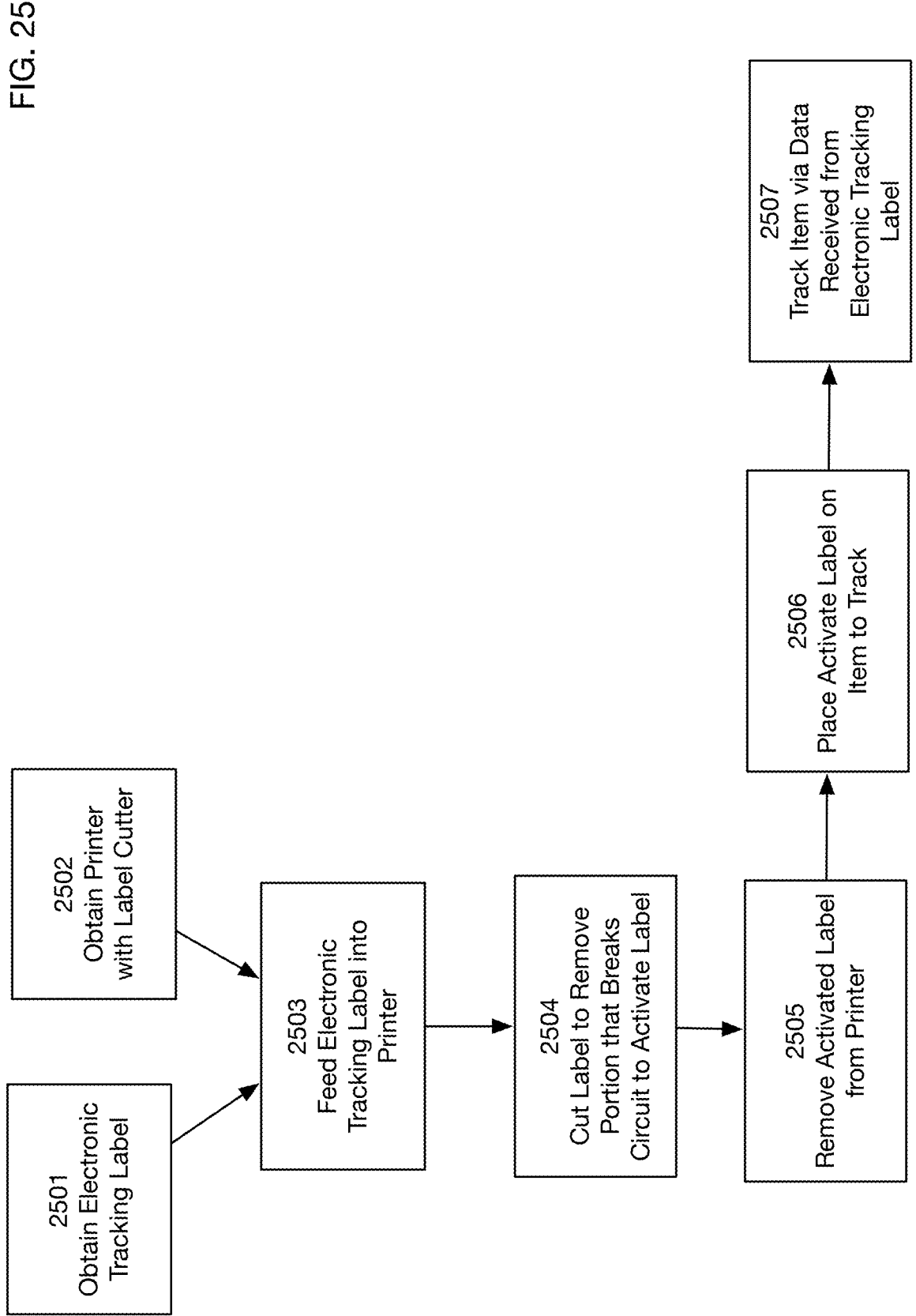
FIG. 25 shows a flowchart of illustrative steps for the method of FIG. 24.

FIG. 25 shows a flowchart of illustrative steps of a process similar to that shown in FIG. 24 that may be enabled by one or more embodiments of the invention. This process may prepare tracking labels using a printer with a cutter, like printer 1801a. Step 2501 obtains an electronic tracking label; this label may have an activation circuit such as circuit 126a of label 100h in FIG. 24. Step 2502 obtains a printer with a label cutter. Step 2503 feeds the electronic tracking label into the printer. The printer may print any desired information on any surface of the label. In step 2504, the printer cuts the label to remove the portion of the label that activates the label when it is removed. In step 2505, the activated label is removed from the printer. An activated tracking label may be used for any application; typically, it is placed in step 2506 on an item to track, and step or steps 2507 then track the item using data received from the activated tracking label on the item.

Figure 26:
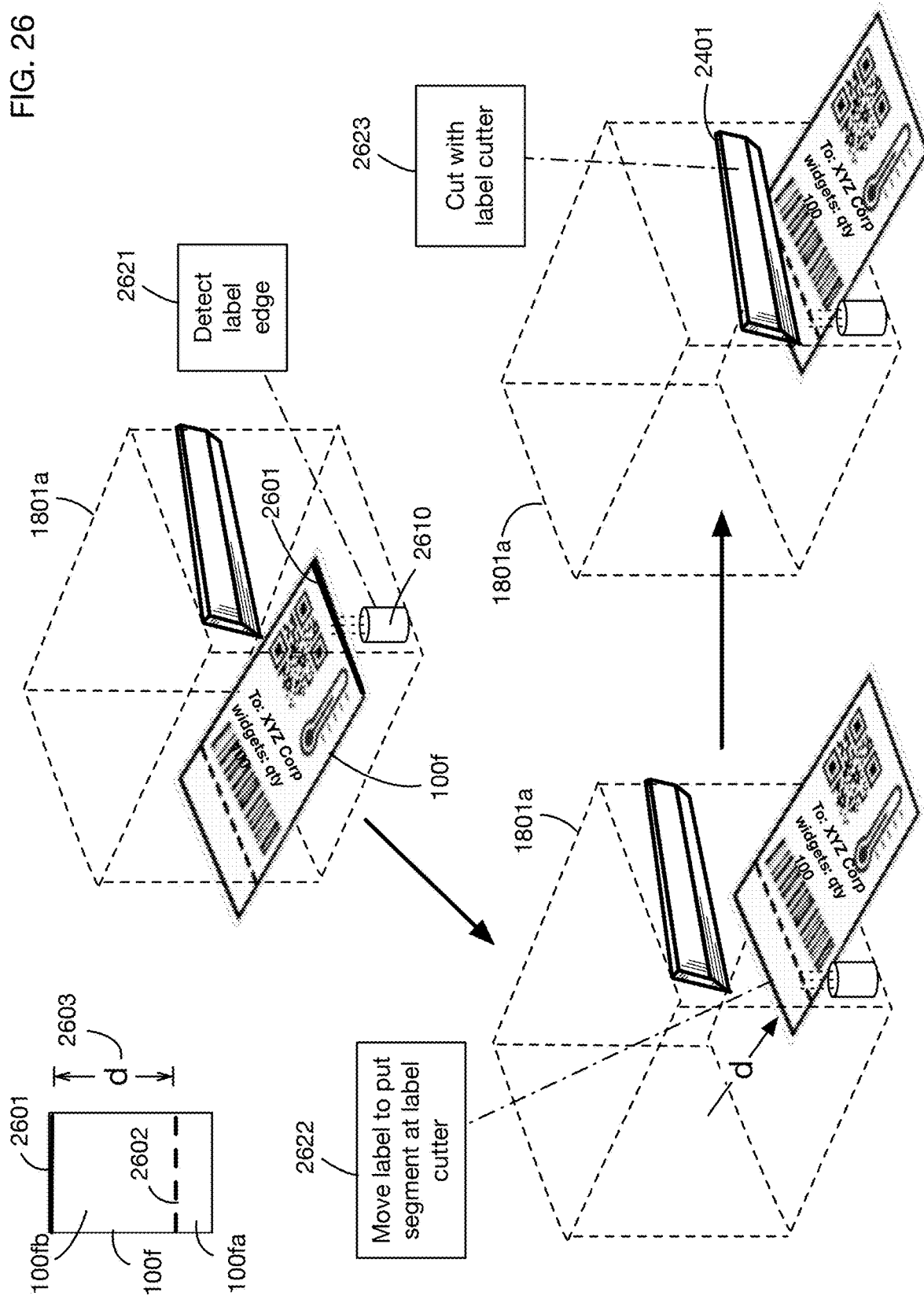
FIG. 26 shows an illustrative technique for label activation that configures a printer with an offset between the label edge and the line segment that needs to be cut to activate the label's electronics.

To activate a label using the method shown in FIG. 25, the printer with the label cutter must cut the label in a relatively precise location to remove the desired removable portion of the label. FIG. 26 shows an illustrative method that may be used in one or more embodiments to enable a printer to make such a cut. In this example, a line segment 2602 at a known distance 2603 from one of the label edges 2601 is the boundary between the removable portion of the label 100fa and the remainder of the label 100fb. The printer must cut along this line segment 2602 (or near it) to activate the label. If the distance 2603 is known, the printer 1801a can be configured to make a cut at the required location. The printer may for example have a sensor 2610 that performs detection 2621 of the label edge. (The detected edge may be for example either a leading or trailing edge of the label as it moves through the printer.) Once edge 2601 is detected, the printer may be programmed to execute step 2622 to move the label (or the blade, or both) to position line segment 2602 next to the cutting blade 2401. If the sensor 2610 and blade 2401 are in the same horizontal location, then this movement may be by precisely the distance 2603; otherwise, the required distance may be calculated based on the offset between the sensor and the cutting blade. Step 2623 then performs the cut once the label is correctly positioned relative to the blade. In one or more embodiments the blade may be moved instead of or in addition to the label to ensure that the blade cuts along the desired line segment. In one or more embodiments of the invention, the printer may be able to detect the line segment 2602 directly (for example using special markings on this segment) and position the segment under the cutting blade accordingly.

An illustrative printer that may be used in one or more embodiments of the invention is a Zebra ZT411 industrial printer. This printer has a media sensor that includes a light source and a light sensor. The media sensor detects the boundary between labels (for example on a roll) by detecting light shining through a gap between labels or shining through a notch or hole. The ZT411 printer also has a label cutter and can be programmed to advance a label through the printer by a specified distance before cutting it.

Figure 27:
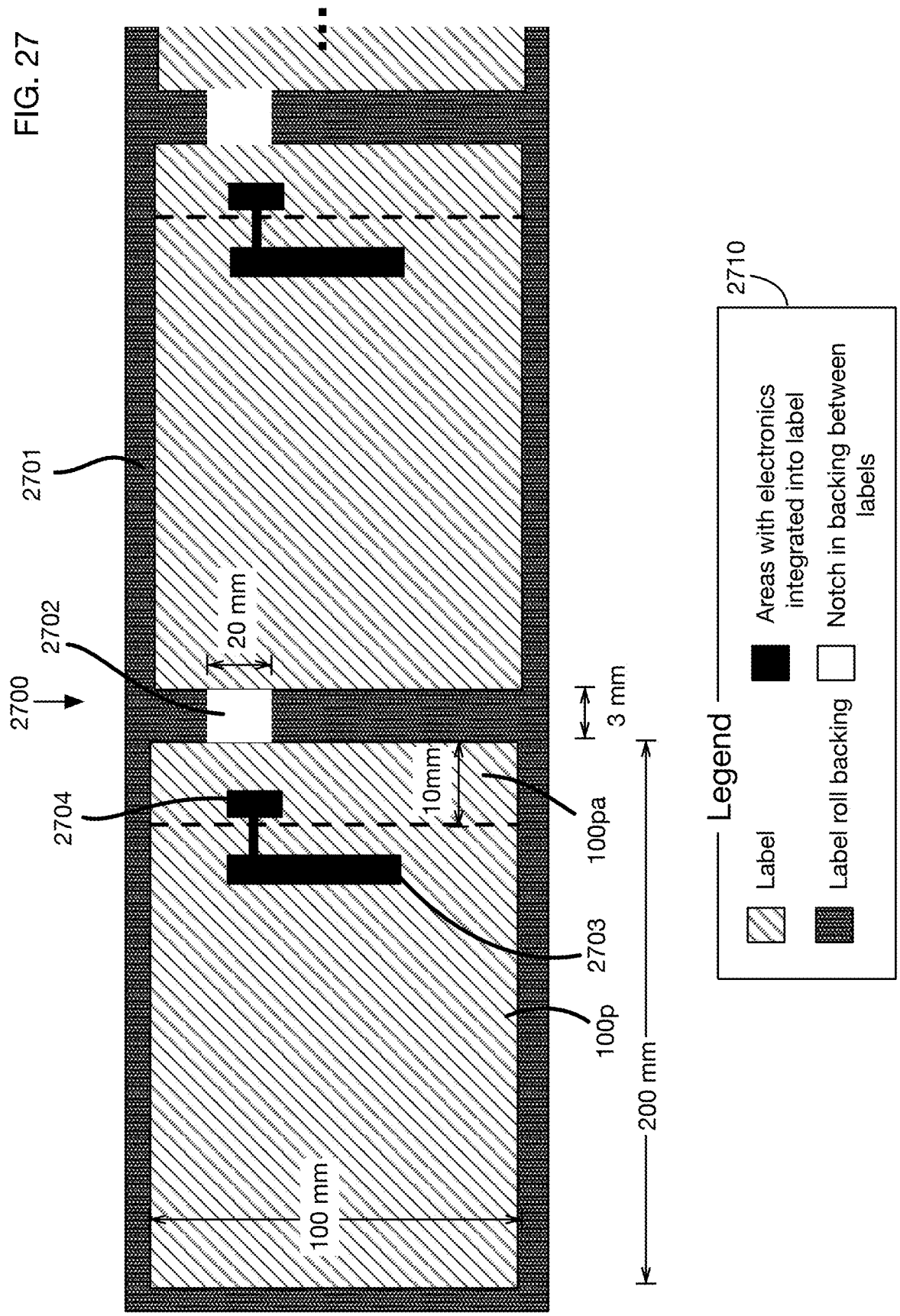
FIG. 27 shows an illustrative layout and illustrative dimensions of a portion of a roll of printable electronic tracking labels that may be fed into a printer with a cutter for printing and activation.

FIG. 27 shows a portion of an illustrative roll of electronic tracking labels 2700 that may be used for example with a Zebra ZT411 printer, or with a similar printer that prints and cuts labels to activate them. Dimensions shown are illustrative. These illustrative labels are each 100 mm by 200 mm; one or more embodiments may use labels of any size and shape. Legend 2710 indicates the materials shown in the drawing. Labels are on a removable backing 2701 that forms a continuous roll of material. A margin of 1.5 mm of backing is around each label, and a 3 mm gap separates labels on the roll. A notch 2702 in the space between labels allows the printer's media sensor to detect the edge of each label when the corresponding light shines through the gap and is detected by the sensor. Illustrative tracking label 100*p* has a removable portion 100*pa* that is 10 mm wide. Label 100*p* has electronic components integrated into the label in area 2703; the electronics are connected to a breakable electrical path that extends into zone 2704 of the removable portion 100*pa*.

Figure 28:
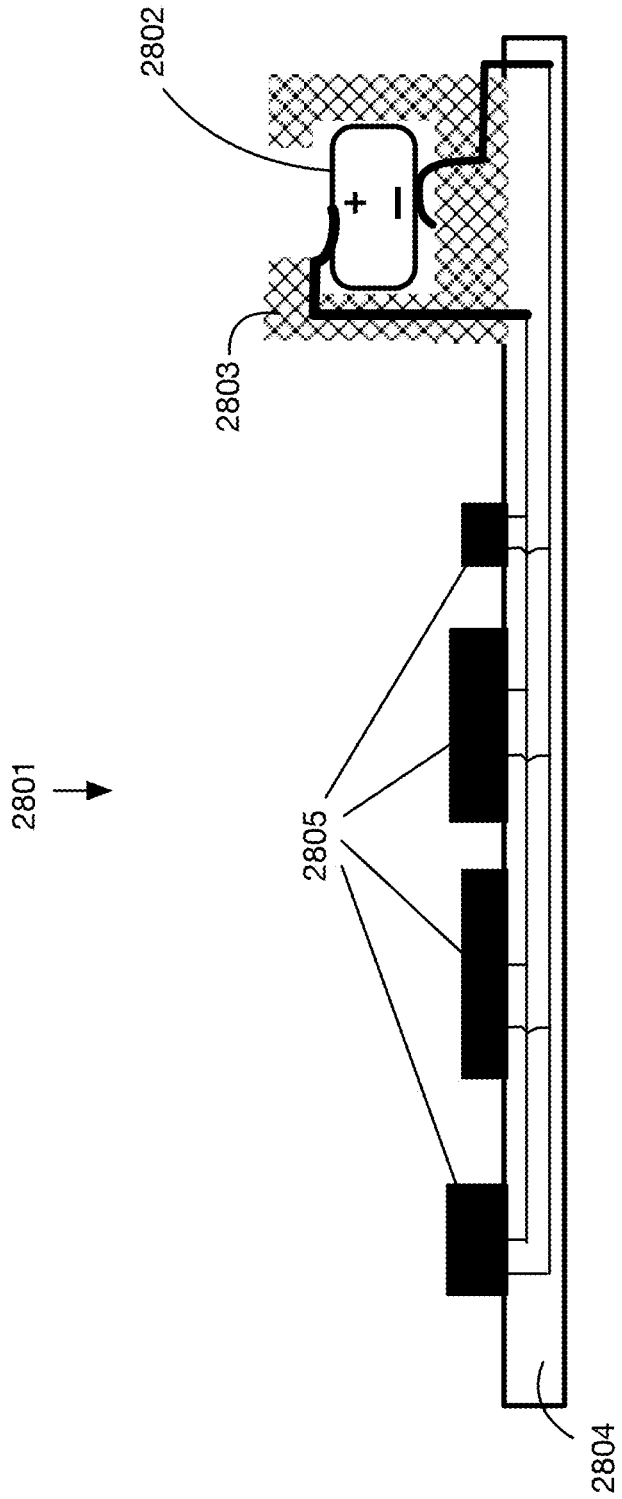
FIG. 28 shows a typical tracker circuit in the prior art that uses a rigid battery holder to secure a battery that powers an electronic circuit.

Tracking labels with integrated electronics are ideally thin and flexible so they can be placed on items like ordinary shipping labels. In addition, it should be possible to feed tracking labels through printers so that information can be printed on top of the label (and potentially so the label can be activated by a printer cutter as described above). Although it is possible to manufacture thin, flexible electronic circuits, a limiting factor in the shape and flexibility of these circuits is typically the need to include a battery in the circuit. Batteries are often thicker and bulkier than other components. Moreover, traditionally batteries are typically attached to a circuit using a battery holder into which the battery is installed. The battery holder adds significant thickness, bulk, rigidity, weight, and cost to the tracking label. FIG. 28 shows a side view of a typical circuit 2801 in the prior art that may be embedded into an electronic tracker, for example. Various components 2805 on a circuit board 2804 are powered by a small battery 2802, such as a coin cell battery for example. Battery 2802 is attached to board 2804 using a battery holder 2803, which may be made of rigid plastic or metal, for example. The battery holder 2803 may be the largest component on the board.

Figure 29:
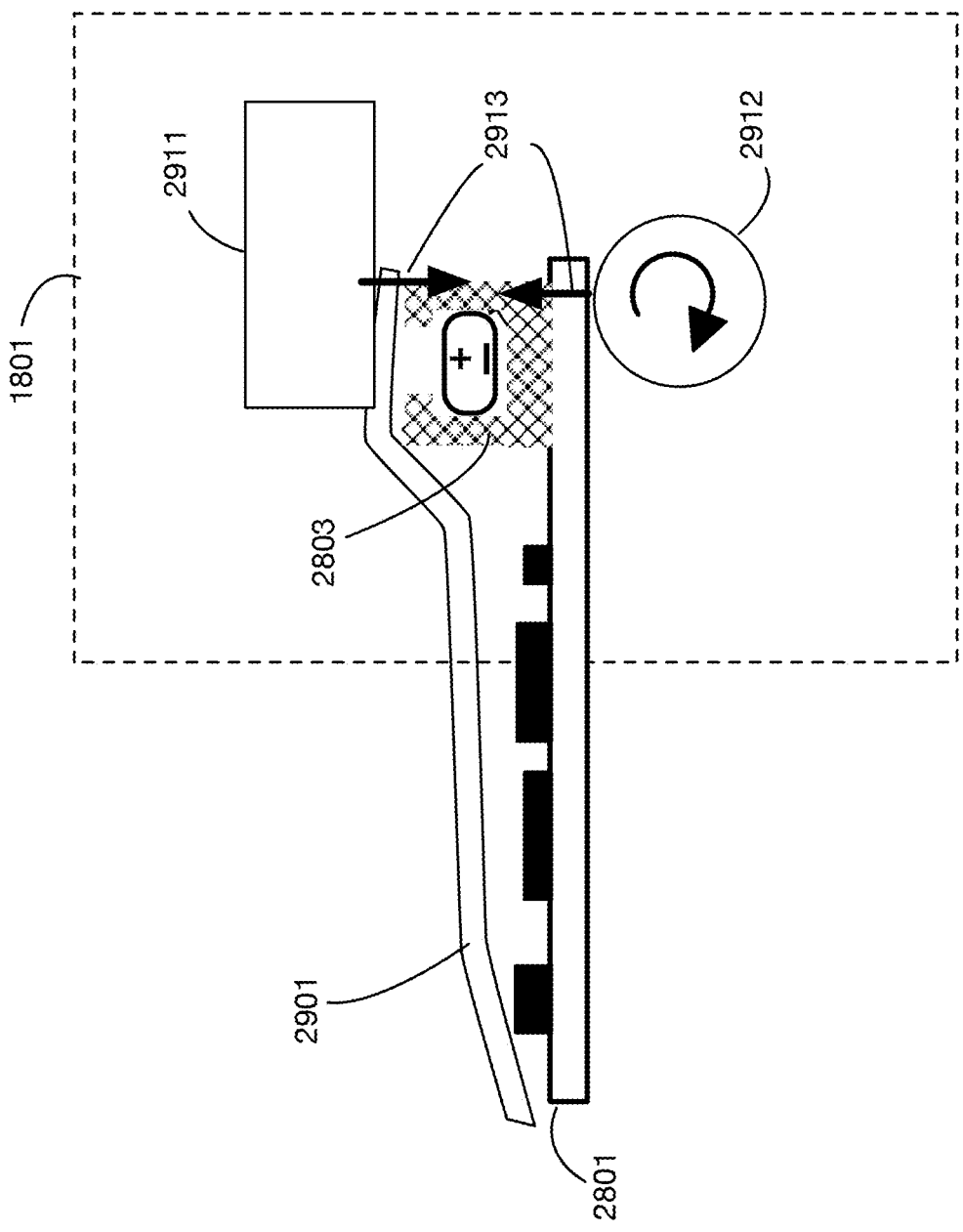
FIG. 29 illustrates a potential problem when a tracker circuit in the prior art with the design of FIG. 28 is input into a printer, since the forces exerted by the printer on the battery holder may damage the circuit or the printer.

A bulky and rigid battery holder may be particularly problematic for an electronic circuit integrated into a label that is to be fed into a printer. As illustrated in FIG. 29, when circuit 2801 is covered with label stock 2901 and fed into a printer 1801, the thickest portion of the label must pass through a potentially narrow opening between the printhead 2911 and the printer roller or platen 2912. Feed guides in the printer may also have narrow openings that are problematic for a thick label. Even if the label is able to pass through the printer, the nip pressure 2913 exerted on the label may damage the electronics, particularly if a rigid battery holder or other rigid battery mount is used to hold the battery (which typically forms the thickest part of the label). These problems may occur with any battery attachment structure that is thick or rigid, including tabs and battery holders as well as attachments via rigid epoxies.

Figure 30:
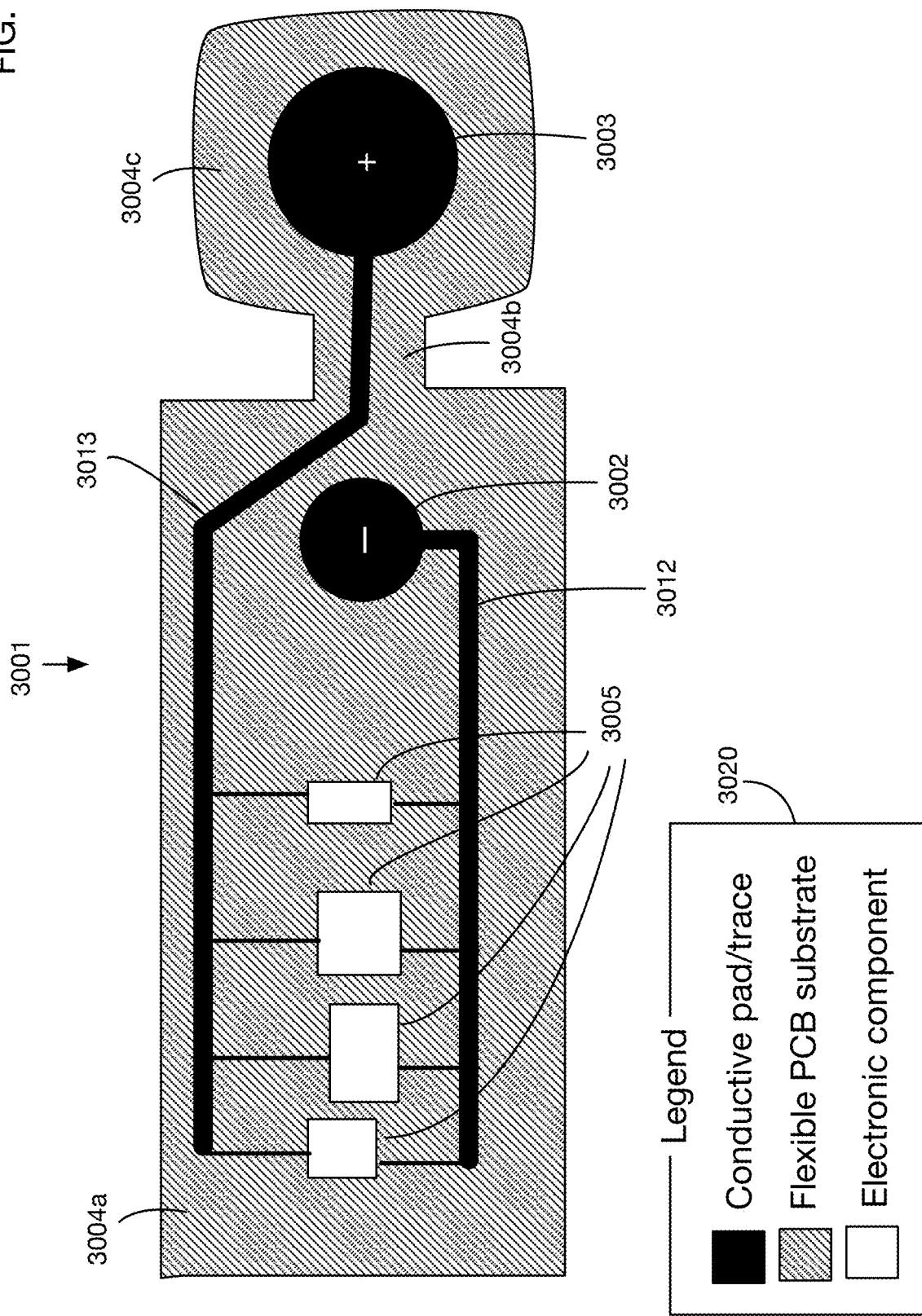
FIG. 30 shows a top view of an illustrative flexible circuit board that may be used in one or more embodiments of the invention; this flexible board can secure a battery without a battery holder by folding over one end of the flexible PCB and sandwiching the battery between two portions of the flexible PCB.

To eliminate the potential problem shown in FIG. 29, one or more embodiments of the invention may attach a battery to the electronics of an electronic tracking label using an innovative fold-over design, as illustrated in FIG. 30. FIG. 30 shows a top view of an unfolded tracking circuit board 3001, prior to installation of a battery. Legend 3020 indicates the shading of the elements of circuit board 3001. The circuit is constructed on a flexible PCB substrate, which may be made of polyimide for example. In this illustrative embodiment the substrate is divided into three regions: region 3004*a* contains a conductive pad 3002 onto which one side of a battery will be attached; region 3004*c* contains another conductive pad 3003 onto which the other side of the battery will be attached; and bendable connecting region 3004*b* lies between and connects the two regions 3004*a* and 3004*c*. The three regions 3004*a*, 3004*b*, and 3004*c* may be constructed from a single sheet of material in one or more embodiments. In one or more embodiments the central bendable region 3004*b* may be narrower than the others; however, regions may be of any size and shape. Any or all of the regions 3004*a*, 3004*b* and 3004*c* may consist of multiple subregions that are not necessarily contiguous in one or more embodiments. One or more electronic components 3005 may be attached to either side 3004*a* or 3004*c* of the flexible substrate; in this illustrative embodiment the components are shown attached to region 3004*a*. These components 3005 may include for example any or all of the components in electronic tracking tag 102 of FIG. 7, including but not limited to controllers, sensors, indicators, communications interfaces, power sources, and activation mechanisms.

A battery may be electrically coupled to pad 3002, and then region 3004*c* may be folded over (by bending the connecting bendable region 3004*b*) so that pad 3003 is coupled to the other side of the battery, as shown in FIGS. 31A through 31D. Alternatively, the battery may be first coupled to pad 3003 and then the assembly of the region 3004*c* with the attached battery may be folded over together to attach the battery to the other pad 3002. Either pad may be coupled to either pole of the battery; for illustration circuit 3001 has pad 3002 coupling to the negative side of the battery and pad 3003 coupling to the positive side of the battery. Conductive power supply traces 3012 and 3013 run from pads 3002 and 3003, respectively, to other components or connections of the circuit board. These traces may be of any size and shape and may be routed to any portions of the flexible circuit. They may be made of copper or some other conductive material. Multiple parallel power supply traces may be connected to either or both of the pads in one or more embodiments. Trace 3013 may pass through bendable region 3004*b* to reach components or other connections in region 3004*a*; the portion of trace 3013 through region 3004*b* may bend when region 3004*c* is folded over to attach the battery.

Figure 31:
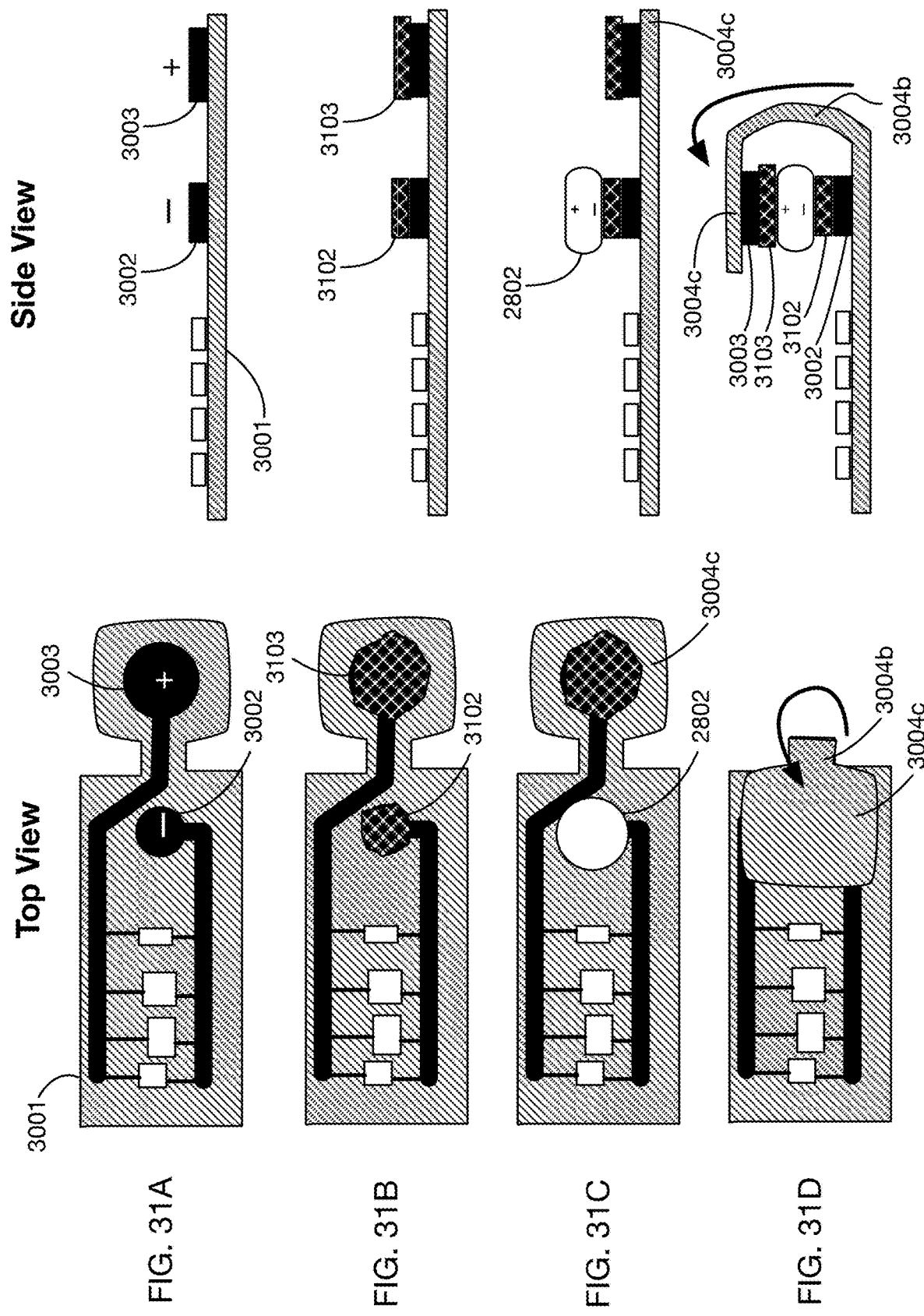
FIGS. 31A through 31D show top views and side views of successive steps of installing a battery into the flexible circuit board of FIG. 30 by folding over one region of the flexible circuit board on top of the battery.

FIGS. 31A through 31D show top views and side views of successive illustrative steps of installing a battery into the circuit of FIG. 30. FIG. 31A shows circuit 3001 as in FIG. 30, prior to installation, with the flexible substrate laid flat. In FIG. 31B portions 3102 and 3103 of a conductive adhesive are added to the conductive pads 3002 and 3003, respectively. This adhesive may be for example a pressure sensitive conductive tape such as 3M 9703 or 9707 tape. In one or more embodiments the adhesive may be a conductive glue or epoxy. In one or more embodiments the adhesive may be added first to the battery instead of the conductive pads, or adhesive may be placed on both the pads and the battery. In FIG. 31C a battery 2802, such as a coin cell battery, is placed onto one of the pads; for illustration the negative side of the battery is placed onto the negative pad 3002 first (with the conductive adhesive 3102 between the pad and the battery). In one or more embodiments the battery may be attached to the pads in any order. An illustrative battery that may be used in one or more embodiments may be for example a Renata 346 battery; the battery may be of any size, shape, and capacity. In FIG. 31D region 3004c of the flexible circuit is folded over, by bending region 3004b by approximately 180 degrees (into a roughly semicircular shape), and pad 3003 is coupled electrically to the positive side of the battery (with conductive adhesive 3103 between the battery and the pad). The battery is sandwiched between the two pads 3002 and 3003 to connect both poles of the battery to the circuit. The battery connection is achieved without the need for a battery holder or any other fixtures or tabs.

Figure 32:
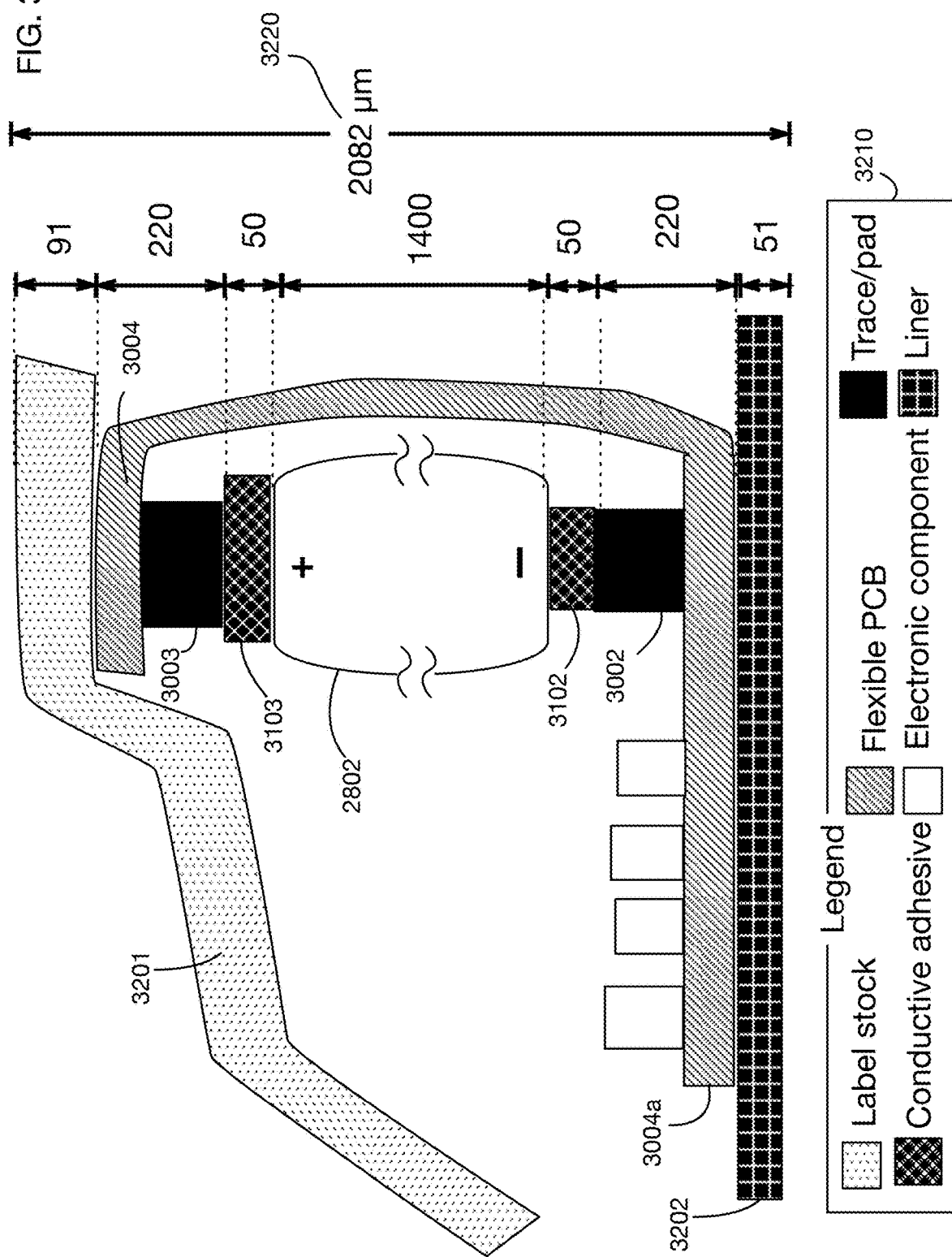
FIG. 32 shows an illustrative stackup (side view) with illustrative layer thicknesses for a tracking label that incorporates the circuit of FIG. 31D.

The complete circuit with the battery attached (as shown for example in FIG. 31D) may then be installed into a label body to form a complete electronic tracking label, as shown in FIG. 32. For example, label stock 3201 may be placed on top of the circuit, and a liner 3202 may be placed below the circuit. (The liner may have a removable backing that exposes an adhesive surface so that the tracking label can be attached to an item, for example.) FIG. 32 shows a side view of a complete tracking label that includes the label stock, electronics, and liner, with individual layers shaded as shown in legend 3210. Illustrative thicknesses for the individual layers are shown (in micrometers). An illustrative maximum total thickness 3220 of this embodiment is 2082 micrometers; this maximum occurs where the battery is sandwiched between the two portions of the flexible PCB (one of which is folded over). Because the maximum thickness is at the battery, the other electronic components are protected when the label assembly is fed through a printer, since the battery area receives the maximum stress.

Figure 33:
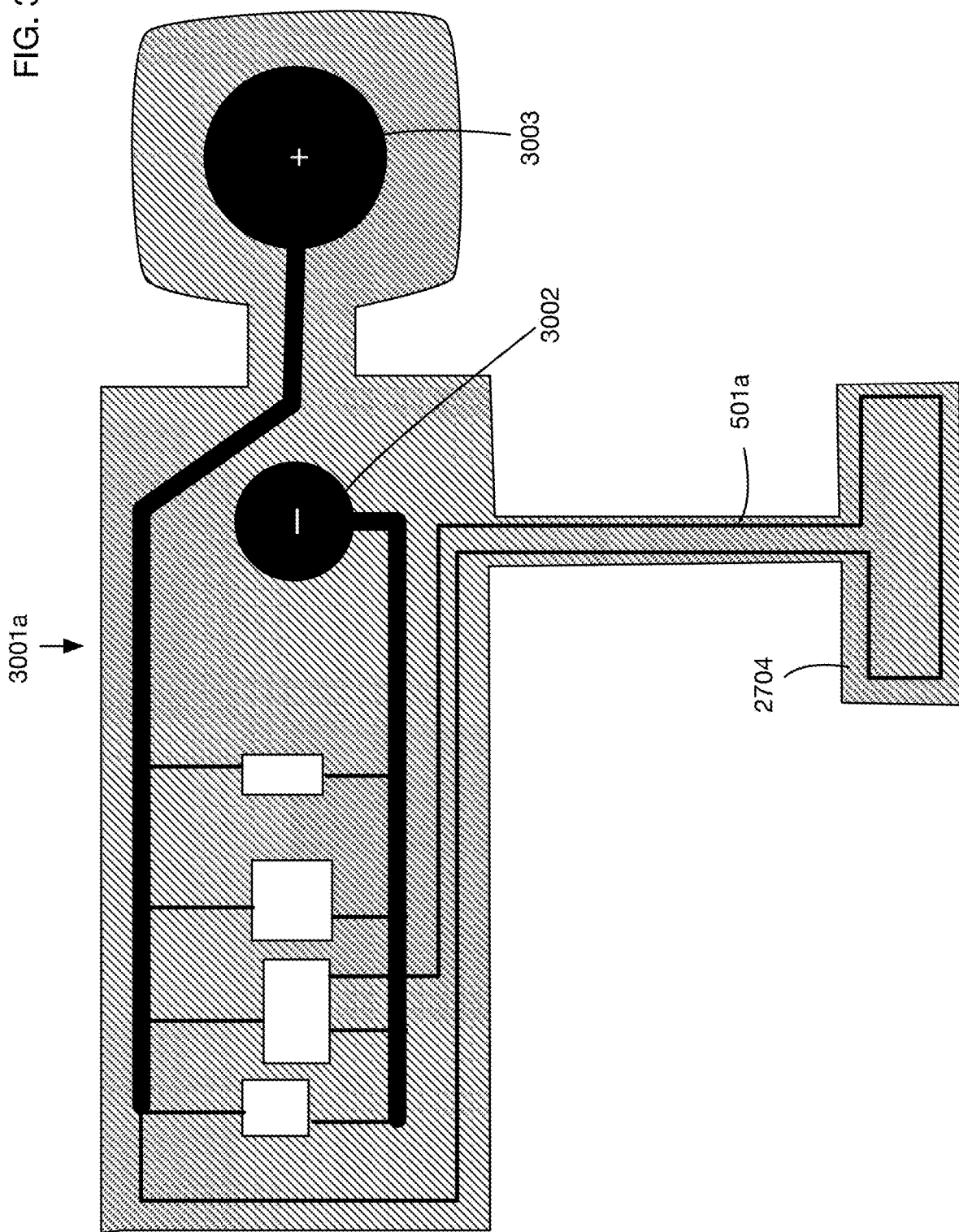
FIG. 33 shows a variation of the flexible circuit board of FIG. 30 that incorporates an activation circuit extending from the other components into a region that is cut off to activate the components.
Figure 34:
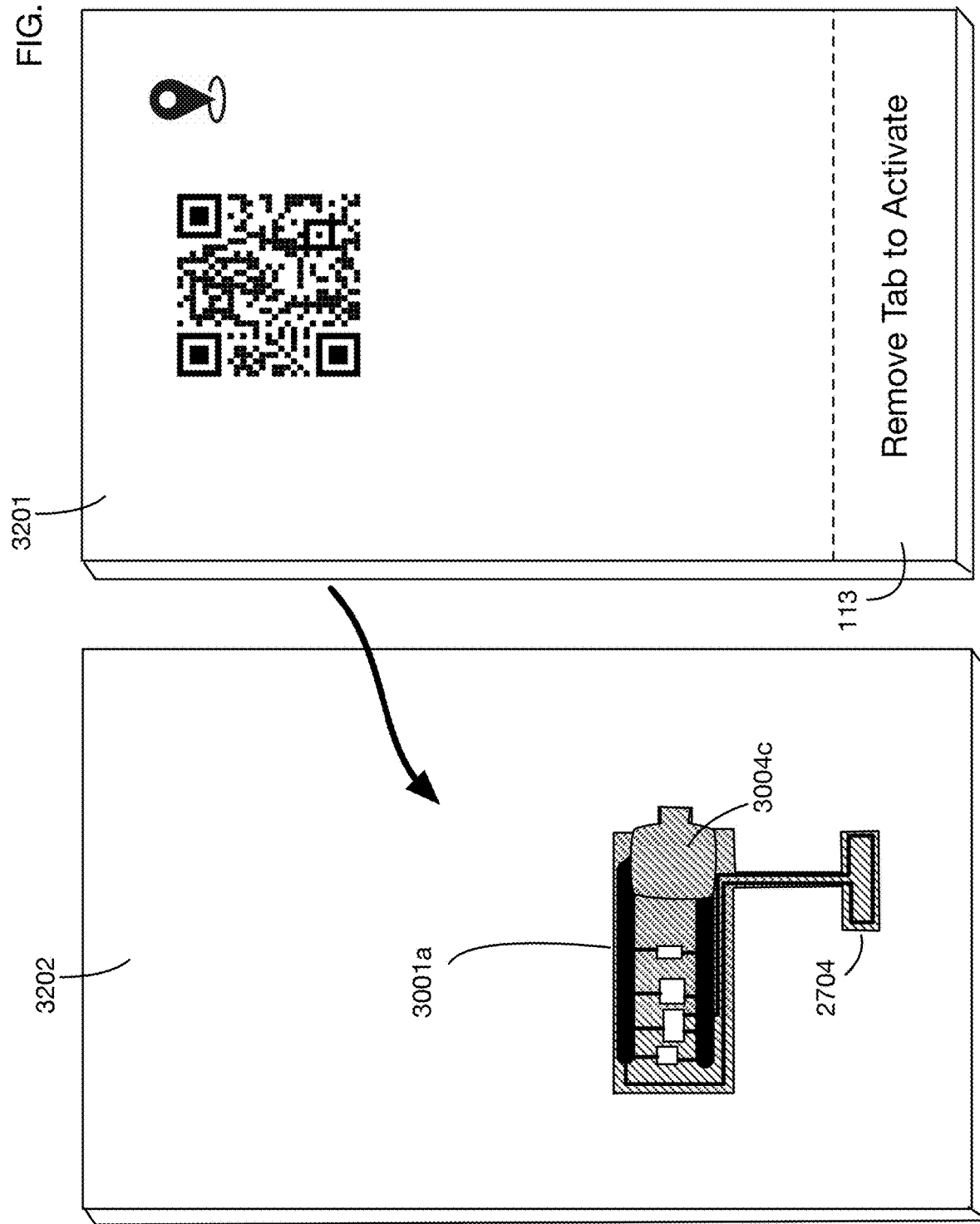
FIG. 34 shows the circuit board of FIG. 33 placed under an illustrative top label, to form an electronic tracking label that can be printed and installed on items for tracking.

As described above for example with respect to FIG. 5, one or more embodiments of electronic tracking tag may include an activation mechanism with an electrical path extending into a region of the label that is removed to activate the circuit. FIG. 33 shows a variation 3001a of the flexible PCB circuit shown in FIG. 30 that incorporates an extended region 2704 of the flexible PCB substrate through which the breakable electrical path 501a passes. The circuit 3001a of FIG. 33 has a fold-over battery attachment as in FIG. 30. This circuit may be embedded in a label with a removable area that may be cut off by a printer for activation during printing, as described above for example with respect to FIG. 27. FIG. 34 shows an illustrative label front 3201 that is placed over circuit 3001a, which is placed on top of liner 3202; a battery (not shown) is installed in circuit 3001a and the region 3004c of the flexible PCB substrate is folded over to secure the battery. The label has a removable zone 113 that contains the region 2704 of the flexible PCB with the breakable electrical path that activates the label's electronics when zone 113 is removed.

Figure 35:
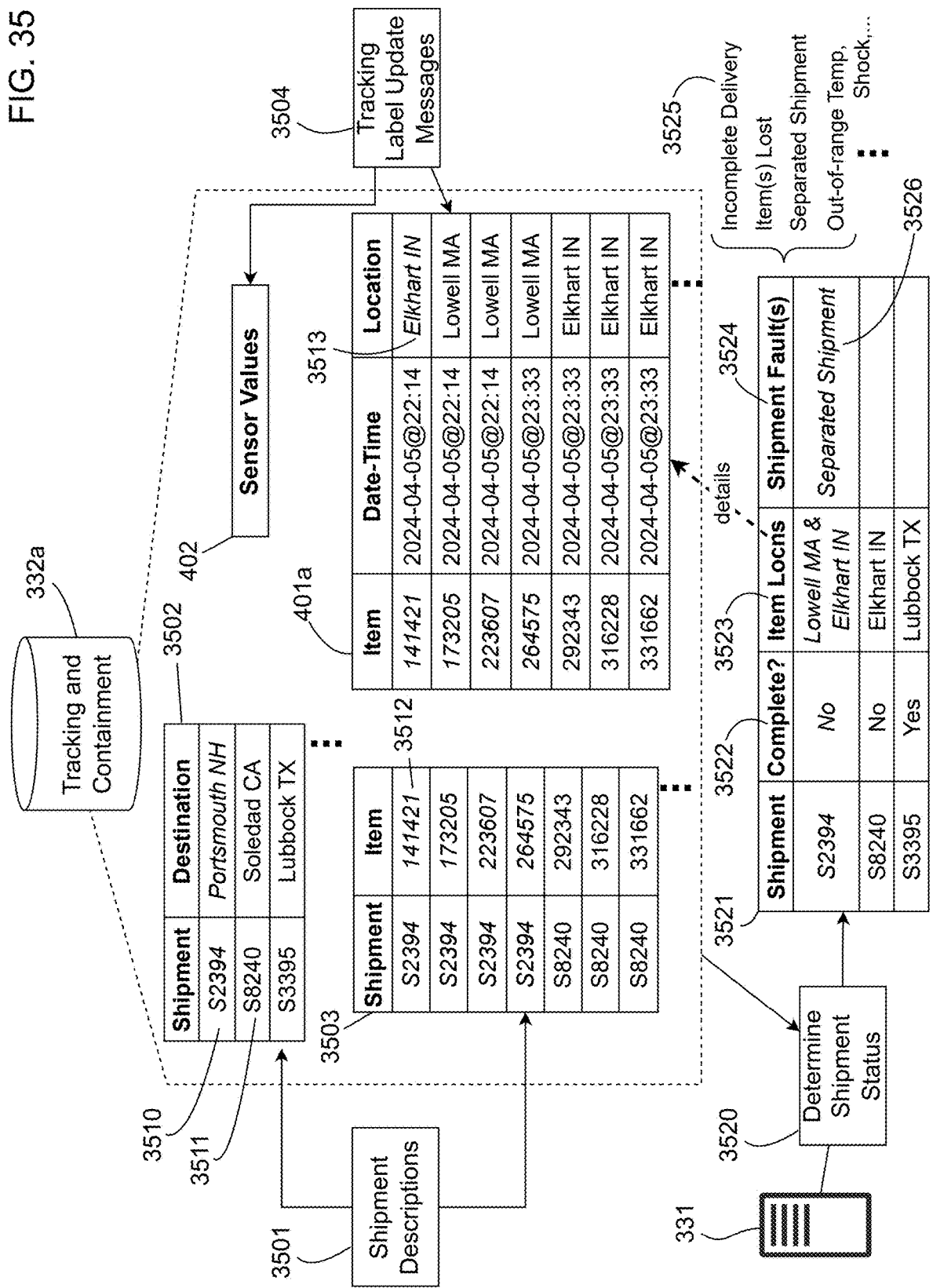
FIG. 35 shows an illustrative embodiment that receives a shipment description defining the items in a shipment, and that analyzes tracking histories for these items to determine whether one or more faults, such as lost items or separated shipments, have occurred during shipping.

In one or more embodiments of the invention, various problems that arise during shipping may be detected and reported. Item tracking data may be analyzed to determine the status of multiple shipments, including potential shipping faults such as a lost item or a separated shipment (where some of the items in a shipment are inadvertently shipped separately from others). FIG. 35 shows an illustrative example of an embodiment that detects shipping faults. In this illustrative embodiment, the system may receive shipment descriptions 3501 that define the contents and destination of a set of shipments. A shipment description may be based for example on a bill of lading (BOL) for the shipment, on an invoice or purchase order, or on any similar documents or records that describe the shipment. Shipment descriptions may be recorded in the tracking and containment database 332a, or in any similar database or data structure. Each shipment may be associated with a shipment identifier, for example. In the example in FIG. 35, shipment descriptions 3501 are recorded using two tables 3502 and 3503 in database 332a. Table 3502 defines a shipment's identifier and its destination. (For ease of illustration, destinations and locations are shown in FIG. 35 as cities; in practice, destinations may be more complete with addresses or geographical coordinates, for example.) Tabel 3503 defines the items associated with each shipment, using an item identifier associated with an electronic tracking label for the item. (Conceptually, table 3503 is similar to the item containment table 1050 described with respect to FIG. 10, except that in table 3503 items are "contained" in shipments without necessarily being physically contained in an enclosing package. Nevertheless, one or more embodiments may use a common approach or common tables to track containment within either shipments or packages.) Illustrative table 3503 shows the items associated with shipments 3510 and 3511. In one or more embodiments, database 332a may contain additional information associated with shipment descriptions 3501, such as an expected or required delivery date, routing information, carriers, etc. Shipment descriptions may also include acceptable ranges during shipment for certain sensor values that may be measured by item tracking labels, such as temperature or shock, for example.

Although tables 3502 and 3503 show only a few shipments and items for ease of exposition, the system may be able to track very large numbers of shipments and items simultaneously. One or more embodiments of the invention may track thousands or millions of shipments and items simultaneously.

Database 332a also receives tracking label update messages 3504 for the items in the shipments, and stores item location information in table 401a, as described above with respect to FIG. 4. (As discussed above, table 401a shows only a small number of items for ease of exposition; however, one or more embodiments of the invention may track many thousands or millions of items with a corresponding number of electronic tracking labels.) Database 332a may also receive and store sensor values from sensors in the tracking labels in sensor values table 402. (Details of sensor values table 402 are not shown in FIG. 35 for simplicity; these are described above with respect to FIG. 4.) The item location table 401a and sensor values table 402 may be analyzed by server 331 (or any other processor) in step 3520 to determine the status of each shipment at any point in time. Illustrative shipment status table 3521 generated by this analysis 3520 may be indexed by the shipment identifier and may include for example: an indicator 3522 of whether the shipment is complete, the location or locations 3523 of the items in the shipment (with details by item available in table 401a), and possibly one or more "shipment faults" 3524 that indicate that the shipment is not proceeding as planned or desired. Illustrative shipment faults 3525 may include for example, without limitation, incomplete delivery when some items are at the destination but others have not arrived, item(s) lost when tracking has been lost for some period of time for one or more items in a shipment, separated shipment when some items in a shipment have been located on a different truck (or other transport vehicle) from others in the shipment, and out-of-range sensor values when one or more items have reported sensor values (such as temperature or shock) that are outside the specified acceptable range (which may be included in the shipment description, for example). For temperature-sensitive products, items may have electronic tracking labels that include temperature sensors, and an out of temperature range shipping fault may indicate that one or more items reported a temperature that is outside the acceptable range in the shipment description, suggesting that an item may have been damaged during shipment. For shock-sensitive products, items may have electronic tracking labels that include shock sensors (such as accelerometers), and an out of shock range shipping fault may indicate that one or more items reported a shock that is outside the acceptable range in the shipment description, also suggesting that an item may have been damaged during shipment. Other shipment faults may be appropriate for certain applications, such as late delivery, behind schedule in transportation, route diverted, shipment stalled at an intermediate location, etc.

For the illustrative data shown in FIG. 35, item 3512 of shipment 3510 reports that it is at location 3513, whereas other items in the shipment are at a different location. This data suggests that item 3512 has been separated during shipping from the rest of the shipment, and a separated shipment fault 3526 is reported for this shipment. In some situations, a shipment may be purposely split into parts that are shipped on different vehicles; in these situations, the shipment descriptions 3501 would include this information, and a shipment fault would not be reported if the items were on the correct vehicles.

As described above with respect to FIG. 13, for hierarchical labelling with item labels inside a package with a package label, it may be advantageous to provide only short-range communication capabilities (e.g., Bluetooth) in individual item labels, and to provide both short-range and long-range (e.g., cellular) communications capabilities in package labels. The package label may then obtain status from item labels over a short-range interface and report this data to the server via its long-range interface. A similar approach may be used in one or more embodiments for items contained in a shipment, even if they are not physically contained in a common package with a package label. A shipment may include both the items, with short-range communication in their item labels, and a tracking gateway with short-range and long-range communication. This tracking gateway may or may not be physically coupled to one or more of the items, but it may be shipped with the items as part of the overall shipment, by being placed in or on the shipping vehicle or shipping container that contains the shipment's items. The tracking gateway may communicate periodically with the item labels of the items in the shipment to obtain their data and confirm their presence, and then forward item data to the server using the long-range communications interface. (It may also receive configuration commands or other instructions from the server and forward this information to the item labels over the short-range communications interface.) A benefit of separating the long-range communications capability into a dedicated gateway is that the individual item labels may be smaller and less expensive, and they may use less power so they can have a much longer lifetime with a very small battery. The gateway may be larger and more expensive, with a larger battery, but its size and cost may be less important because there is only a single gateway per shipment.

Figure 36:
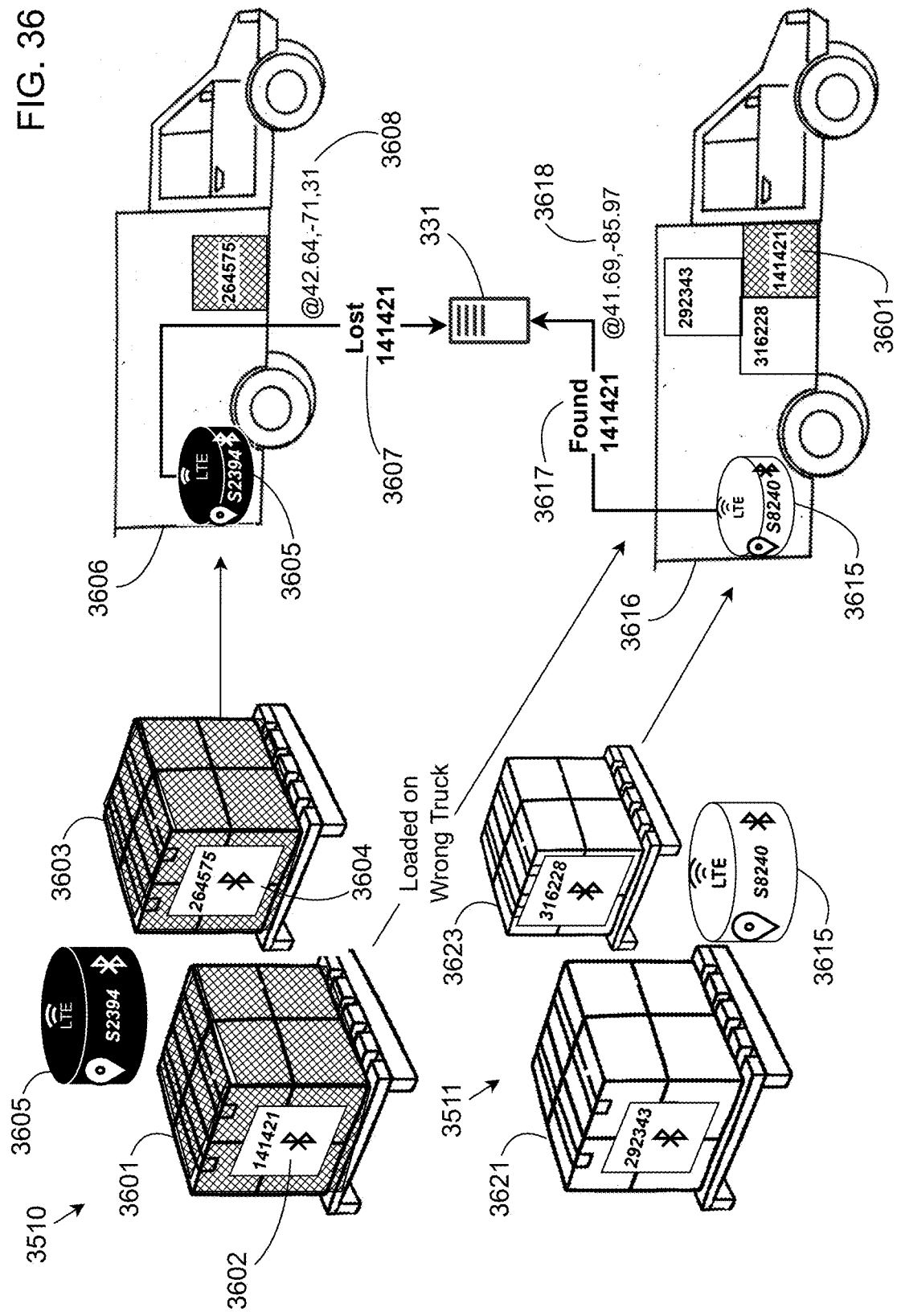
FIG. 36 shows an illustrative example of a separated shipment, where a pallet belonging to one shipment is mistakenly shipped on the wrong truck with a different shipment. A gateway included with each shipment detects any items in the vicinity of the gateway, allowing misrouted items to be tracked.

FIG. 36 illustrates the use of tracking gateways, and it also illustrates the example of FIG. 35 where a separated shipment fault is reported based on item tracking data. Only two shipments and two items per shipment are shown in FIG. 36 for ease of exposition. In this example, electronic item tracking labels are placed on pallets. Other labels may be placed for example on boxes within pallets and on individual items within boxes, in a hierarchical containment approach as described above, but this example focuses on tracking electronic labels on the pallets. Shipment 3510 contains two pallets 3601 and 3603, with electronic tracking labels 3602 and 3604, respectively. Each of these labels 3602 and 3604 is equipped with a Bluetooth communications interface. Shipment 3511 also contains two pallets 3621 and 3623, each with electronic tracking labels with Bluetooth communications. Each shipment also includes a tracking gateway: gateway 3605 is included with shipment 3510, and gateway 3615 is included with shipment 3511. Each tracking gateway has a Bluetooth interface for communication with item tracking labels, and a long-range interface (such as cellular) to communicate with server 331. In one or more embodiments, a shipment tracking gateway may also be configured with information about the shipment, such as the shipment identifier and the list of items in the shipment. In one or more embodiments, the tracking gateways may include (or may be connected to) locating capabilities, such as GPS, cellular triangulation, or communications with GPS of the associated truck. The gateways 3605 and 3615 may be physically attached to one of the pallets in the shipment, or included in a box in a pallet, or simply shipped along with the pallets in the same vehicle or container.

In the example of FIG. 36, shipment 3510 is supposed to be shipped on truck 3606, but pallet 3601 is inadvertently loaded onto truck 3616 along with shipment 3511. This error may happen for example during initial loading, or during transfer along the shipment routes. During shipping, the gateways 3605 and 3615 loaded onto trucks 3606 and 3616, respectively, periodically broadcast to receive messages from any Bluetooth tracking labels within their local regions. The gateways are not limited to receiving messages from the item labels for items in their associated shipments; this capability allows gateways to locate any items in their area, which may assist for example in locating lost or misplaced items. For example, tracking gateway 3605 may transmit message 3607 to server 331 indicating that it cannot locate tracking label 3602. This message alone would result in an "item lost" shipping fault. However, tracking gateway 3615 for shipment 3511, on truck 3616, obtains a response from electronic tracking label 3602 on pallet 3601 (in addition to obtaining responses from the labels on pallets 3621 and 3623). It therefore transmits message 3617 to the server indicating that it has found label 3602. This message causes the system to report an "separated shipment" fault since pallet 3601 is now known to be on truck 3616, instead of being lost. The tracking gateways 3605 and 3615 may also report their locations 3608 and 3618, respectively, which allows the system to identify the specific locations of the different pallets 3601 and 3603 of shipment 3510.

Figure 37:
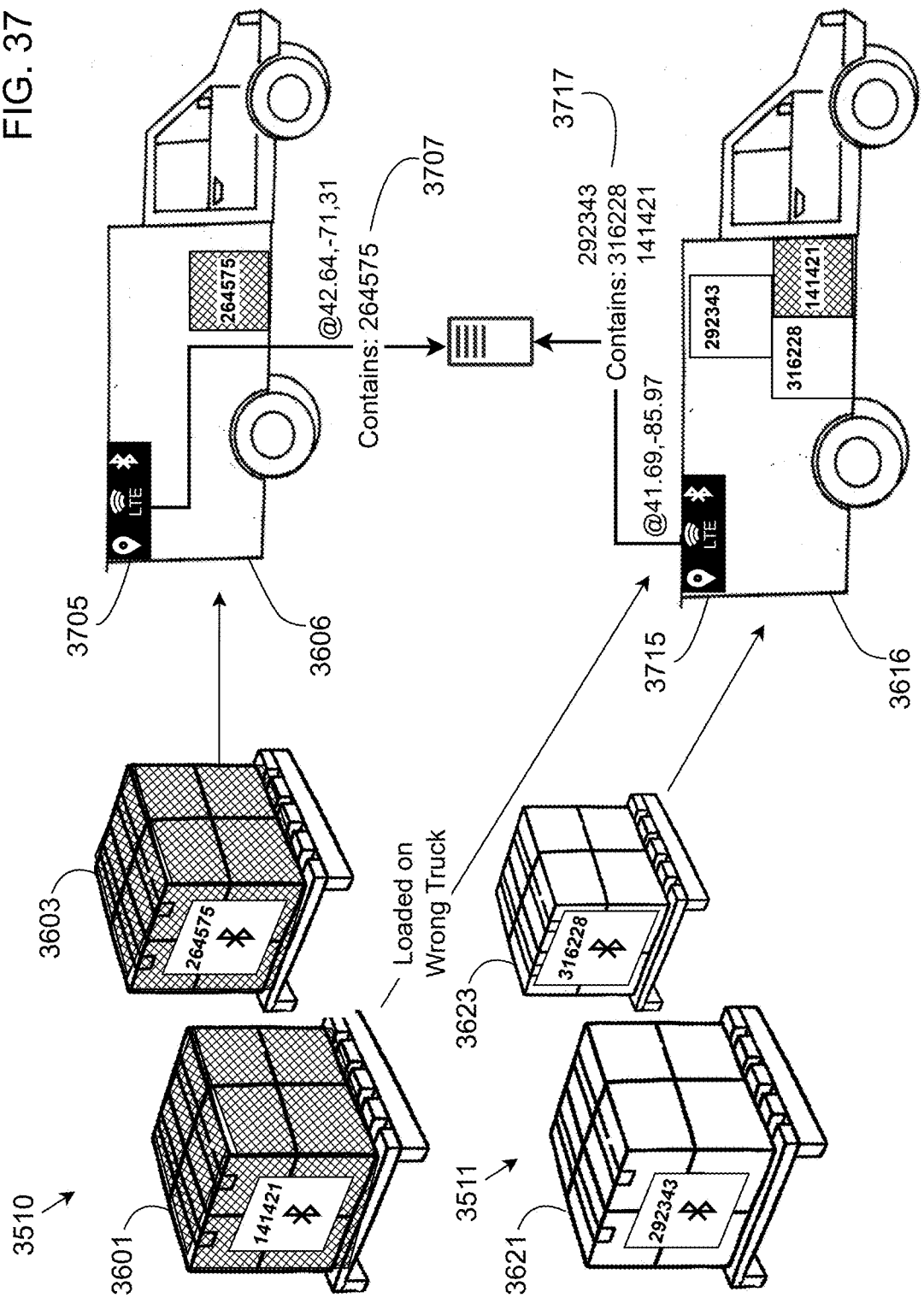
FIG. 37 shows a variation of the example of FIG. 36, where the gateway is integrated into each truck.

In one or more embodiments of the invention, tracking gateways may be coupled to or incorporated directly into transportation equipment (such as vehicles or containers), which may eliminate or reduce the need to send separate tracking gateways along with each shipment. This scenario is illustrated in FIG. 37, which is almost identical to the scenario of FIG. 36 except that gateway 3705 is integrated into truck 3606, and gateway 3715 is integrated into truck 3616.

In this scenario, the gateways 3705 and 3715 are not configured with shipment-specific information; instead, each gateway simply reports on the electronic tracking labels it finds in its associated truck. Therefore gateway 3705 transmits message 3707 indicating that it has discovered pallet 3603 on truck 3606, and gateway 3715 transmits message 3717 indicating that it has discovered pallets 3601, 3621, and 3623 on truck 3616. The server may then determine that shipment 3510 is separated using the shipment definition item lists associated with each shipment.

Figure 38:
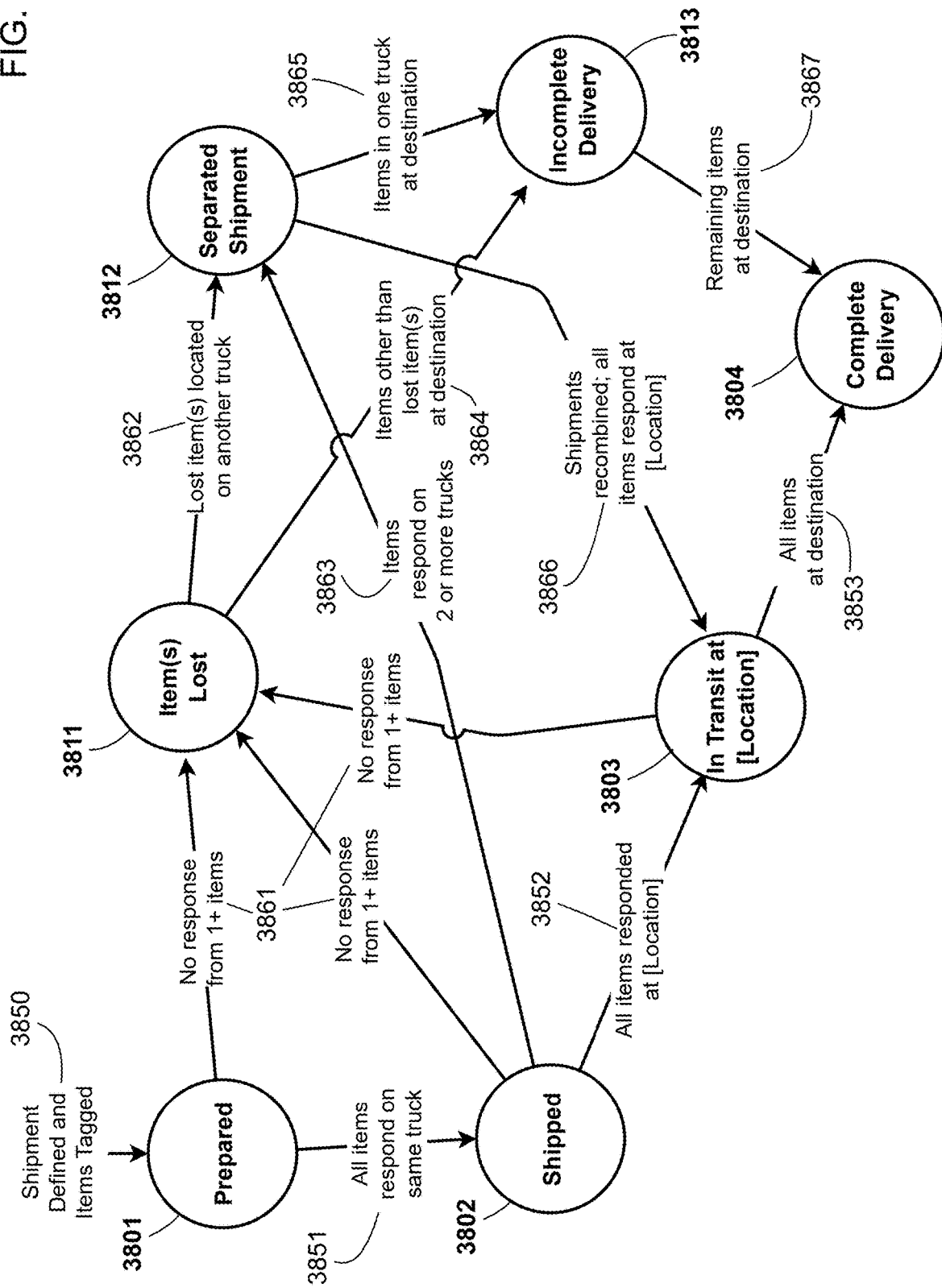
FIG. 38 shows a state transition diagram for illustrative states of a shipment that evolve as item tracking data is received.

As the system tracks the status of shipments, including potential shipment faults, it may update the status as new item tracking information is received. FIG. 38 shows an illustrative state-transition diagram for changes in the status of a shipment for certain illustrative events. (One or more embodiments of the invention may define and use additional states, or subsets of these states, and additional events, or subsets of these events.) Shipment faults due to sensor values being out-of-range are not included for simplicity of exposition. Initial event 3850 is the receipt of a shipment definition and the activation of tracking labels attached to the items associated with a shipment. This event generates Prepared state 3801. Following first a "normal shipment" scenario without shipment faults, when event 3851 occurs indicating that all of the items in the shipment are loaded onto the same truck, the shipment enters a Shipped state 3802. During shipment, when a gateway or similar device reports event 3852 that all of the shipment's items are at a common location, the shipment is in an In Transit state 3803 with an associated location. When the items all report in event 3853 that they are at the shipment's destination, the shipment state transitions to Complete Delivery state 3804.

The additional states 3811, 3812, and 3813 in FIG. 38 indicate different types of shipment faults. The Item(s) Lost state 3811 is entered if event 3861 occurs when one or more items do not respond; this can occur from many different states, included Prepared, Shipped, or In Transit. If all items respond, but in two or more vehicles, then event 3863 occurs and the shipment status transitions to the Separated Shipment state 3812. Event 3862 can occur if an item thought to be lost is located on another vehicle, again entering the Separated Shipment state 3812. If separated shipments are recombined, event 3866 occurs and the status reenters an In Transit state 3803. From the Item(s) Lost state, 3811 event 3864 occurs when the items other than the lost item(s) arrive at the destination; this transitions to an Incomplete Delivery state 3813. A Separated Shipment state 3812 may also transition to Incomplete Delivery if event 3865 occurs when the items in at one of the vehicles arrive at the destination. If remaining (lost or separated) items arrive at the destination in event 3867, the Incomplete Delivery state 3813 transitions to Complete Delivery state 3804.

The states and events shown in FIG. 38 are illustrative; other embodiments or applications may use additional states, may use states with more or less granularity, and may define other transitions between states based on reported item tracking information or other data. Any embodiment that tracks shipment state using data received from electronic tracking labels is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. An item tracking system with electronic tracking labels containing sensors, comprising:
 a multiplicity of tracking labels, each tracking label of said multiplicity of tracking labels comprising
  a label configured to be attached to an item;
  a flexible electronic circuit attached to or integrated into said label, said flexible electronic circuit comprising
   a controller;
   a power source;
   a wireless communications interface;
   one or more sensors;
   a unique identifier; and
   an activation mechanism configured to modify an activation input when a user or an activation device performs an activation action;
  wherein
   said flexible electronic circuit switches to an active state when said activation mechanism modifies said activation input;
 a database comprising a tracking history associated with each tracking label of said multiplicity of tracking labels;
 a server coupled to said database, wherein said server is configured to
  receive one or more tracking label update messages associated with said each tracking label, wherein each tracking label update message of said one or more tracking label update messages comprises
   said unique identifier of said each tracking label;
   a time;
   a location of said each tracking label at said time; and
   one or more sensor values captured by at least one of said one or more sensors of said each tracking label; and,
  add contents of said each tracking label update message to said tracking history associated with said each tracking label.

2. The item tracking system of claim 1, wherein said each tracking label comprises a plurality of layers comprising
 a liner layer;
 an adhesive layer above said liner layer;
 a label bottom layer above said adhesive layer;
 a conductive traces layer above said label bottom layer;
 an electronic components layer above said conductive traces layer; and,
 a label top layer above said electronic components layer.

3. The item tracking system of claim 2, wherein
 a maximum thickness of said each tracking label is less than or equal to 1.5 millimeters.

4. The item tracking system of claim 1, wherein
 said activation mechanism comprises an electrical path coupling said power source to said activation input; and,
 said activation action breaks said electrical path, changing said activation input.

5. The item tracking system of claim 4, wherein
 said each tracking label comprises a portion of said each tracking label that said electrical path passes through; and,
 removal of said portion of said each tracking label breaks said electrical path.

6. The item tracking system of claim 5, wherein said portion of said each tracking label comprises one or both of
 a tab of said each tracking label configured to be torn off or cut off;
 a conductive sheet configured to be peeled off.

7. The item tracking system of claim 1, wherein
said activation mechanism comprises an electrical path coupling a near-field communication receiver to said activation input; and,
said activation action comprises transmission of electromagnetic energy to said near-field communication receiver.

8. The item tracking system of claim 1, wherein said power source comprises one or both of
a battery; and,
an energy harvesting circuit that receives power from an environment of said each tracking label.

9. The item tracking system of claim 1, wherein said one or more sensors comprise one or more of
a temperature sensor;
a humidity sensor;
a light sensor;
a motion sensor;
a pressure sensor;
a shock sensor;
a sensor that measures peeling or bending;
a sensor that detects opening of a container or breaking of a seal.

10. The item tracking system of claim 1, wherein said flexible electronic circuit further comprises one or more indicators.

11. The item tracking system of claim 10, wherein said one or more indicators comprise one or more of
an LED;
a display.

12. The item tracking system of claim 1, wherein said wireless communications interface comprises one or more of
a Bluetooth interface;
a Wi-Fi interface;
a cellular network interface;
a sub-Gigahertz wireless interface.

13. The item tracking system of claim 1, wherein
said wireless communications interface comprises an interface to a cellular network; and,
said location of said each tracking label is determined via triangulation via said cellular network.

14. The item tracking system of claim 1, wherein
said flexible electronic circuit associated with said each tracking label further comprises a GPS receiver; and,
said controller of said each tracking label is configured to obtain said location of said each tracking label from said GPS receiver.

15. The item tracking system of claim 14, wherein
said wireless communications interface comprises an interface to a cellular network; and,
when said controller of said each tracking label does not receive said location of said each tracking label from said GPS receiver, said controller determines said location of said each tracking label via triangulation via said cellular network.

16. The item tracking system of claim 1, wherein
said wireless communications interface of said each tracking label is configured to connect to a local device in a vicinity of said each tracking label at said time;
said local device is coupled to said server via a network connection; and,
said local device is configured to transmit said each tracking label update message to said server.

17. The item tracking system of claim 16, wherein said location of said each tracking label at said time comprises a location of said local device.

18. The item tracking system of claim 1, wherein said server is further configured to transmit a settings update message to one or more of said multiplicity of tracking labels.

19. The item tracking system of claim 18, wherein said settings update message comprises one or more sensor data collection rules.

20. The item tracking system of claim 19, wherein said one or more sensor data collection rules comprise one or more of
an interval at which a sensor of said one or more sensors should collect data;
a range that triggers an alert said data from said sensor is within said range.

* * * * *